(12) United States Patent
He et al.

(10) Patent No.: US 12,141,796 B2
(45) Date of Patent: Nov. 12, 2024

(54) BLOCKCHAIN-BASED DATA PROCESSING METHOD, DEVICE, AND MEDIUM

(71) Applicant: Huawei Technologies Co., Ltd., Shenzhen (CN)

(72) Inventors: Wei He, Singapore (SG); Shuang Wu, Singapore (SG); Tsz Hon Yuen, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 503 days.

(21) Appl. No.: 17/366,969

(22) Filed: Jul. 2, 2021

(65) Prior Publication Data
US 2021/0334796 A1 Oct. 28, 2021

Related U.S. Application Data

(63) Continuation of application No. PCT/SG2019/050001, filed on Jan. 3, 2019.

(51) Int. Cl.
*G06Q 20/38* (2012.01)

(52) U.S. Cl.
CPC ....... *G06Q 20/3825* (2013.01); *G06Q 20/389* (2013.01); *G06Q 2220/00* (2013.01)

(58) Field of Classification Search
CPC ............. G06Q 20/3825; G06Q 20/389; G06Q 2220/00; G06Q 20/3829; G06F 21/64; H04L 9/3247; H04L 9/3297; H04L 9/50; H04L 9/3239
See application file for complete search history.

(56) References Cited

U.S. PATENT DOCUMENTS

| 2018/0060860 | A1 | 3/2018 | Tian et al. |
| 2018/0293557 | A1 | 10/2018 | Kim et al. |
| 2018/0294977 | A1* | 10/2018 | Uhr .................. G06F 21/33 |
| 2018/0343175 | A1* | 11/2018 | Bathen .............. G06F 16/1834 |

(Continued)

FOREIGN PATENT DOCUMENTS

| CN | 107330681 A | 11/2017 |
| CN | 107330787 A * | 11/2017 |

(Continued)

OTHER PUBLICATIONS

Ryan Fox, Hashed Time-Locked Contract, Aug. 2018, GitHub (Year: 2018).*

(Continued)

*Primary Examiner* — Neha Patel
*Assistant Examiner* — Chunling Ding
(74) *Attorney, Agent, or Firm* — Leydig, Voit & Mayer, Ltd.

(57) ABSTRACT

Embodiments of this application provide a blockchain-based data processing method, a device, and a medium. The method includes: sending a first channel closing message on a chain-off channel; receiving a second signature in a second state and a second channel closing message that are sent on the off-chain channel, where the second signature is obtained by signing the second channel closing message; and signing a third channel closing message to obtain a first signature in (Continued)

the second state, and sending the first signature. This application can ensure transaction security and improve a transaction processing capability.

20 Claims, 23 Drawing Sheets

(56) References Cited

U.S. PATENT DOCUMENTS

| | | | | |
|---|---|---|---|---|
| 2019/0095879 A1* | 3/2019 | Eyal | ............... | G06Q 20/223 |
| 2019/0164153 A1* | 5/2019 | Agrawal | ............... | G06Q 20/065 |
| 2019/0334719 A1* | 10/2019 | Naqvi | ............... | G06F 21/602 |
| 2020/0082405 A1* | 3/2020 | Li | ............... | H04L 9/3247 |
| 2020/0098042 A1* | 3/2020 | Hoshizuki | ............... | H04L 9/50 |
| 2020/0126070 A1* | 4/2020 | Joseph | ............... | G06Q 20/02 |
| 2022/0051235 A1* | 2/2022 | Ohashi | ............... | G06Q 20/027 |

FOREIGN PATENT DOCUMENTS

| | | |
|---|---|---|
| CN | 108475457 A | 8/2018 |
| CN | 108924092 A | 11/2018 |
| WO | 2017192220 A1 | 11/2017 |
| WO | 2018020389 A2 | 2/2018 |
| WO | WO-2018229632 A1 * 12/2018 ............. G06F 9/542 |

OTHER PUBLICATIONS

Frontz, Contract, Nov. 2018, Bitcoin Wiki (Year: 2018).*
Joseph Poon, The Bitcoin Lightning Network: Scalable Off-Chain Instant Payments, Jan. 2016 (Year: 2016).*
Andrew Miller, Sprites and State Channels: Payment Networks that Go Faster than Lightning, Nov. 2017 (Year: 2017).*
Jehan Tremback, Universal Payment Channels, Nov. 2015 (Year: 2015).*
Mustafa Al-Bassam, Airtnt: Fair Exchange Payment for Outsourced Secure Enclave Computations, May 2018. (Year: 2018).*
Herlihy, "Atomic Cross-Chain Swaps," arXiv:1801.09515v4 [cs.DC], total 10 pages (May 18, 2018).
Nakamoto et al., "Bitcoin: A Peer-to-Peer Electronic Cash System," total 9 pages (2008).
Poon et al., "The Bitcoin Lightning Network: Scalable Off-Chain Instant Payments," Draft Version 0.5.9.2, total 59 pages (Jan. 14, 2016).
Wood, "Ethereum: a Secure Decentralised Generalised Transaction Ledger," Final Draft—Under Review, total 29 pages (2014).
Tremback et al., "Universal Payment Channels," v0.5, total 18 pages (Nov. 2015).
Fox et al., "Hashed Time-Locked Contract," BSIP: 0044, total 12 pages, https://github.com/bitshares/bsips/blob/master/bsip-0044.md. (Aug. 22, 2018).

* cited by examiner

BLOCKCHAIN-BASED DATA PROCESSING METHOD, DEVICE, AND MEDIUM

CROSS-REFERENCE TO RELATED APPLICATIONS

This application is a continuation of International Application No. PCT/SG2019/050001, filed on Jan. 3, 2019, the disclosure of which is hereby incorporated by reference in its entirety.

TECHNICAL FIELD

This application relates to blockchain technologies, and in particular, to a blockchain-based data processing method, a device, and a medium.

BACKGROUND

A core blockchain technology originates from a bitcoin system that is proposed by Satoshi Nakamoto in 2008 based on a peer-to-peer network (P2P network). In the core blockchain technology, a chain-type data structure is formed by connecting blocks including transaction data sequentially in a time order.

With the rise of blockchain applications, a large quantity of distributed applications attached to, for example, the Ethereum or an enterprise operating system (EOS) blockchain platform are developed. Transaction expansion of a blockchain is always one of major problems hindering large-scale application of the blockchain. Existing transaction expansion solutions mainly include block expansion, consensus algorithm improvement, architecture innovation, and the like. However, the block expansion impairs a distributed feature, the consensus algorithm improvement has a limited impact on performance improvement, the architecture innovation is limited by high technical difficulty and complexity and is incompatible with an existing blockchain architecture. In these solutions, three key requirements: decentralization, scalability, and security cannot be all considered.

Therefore, how to improve a transaction processing capability in a large scale while security is ensured is currently one of key problems in applying the blockchain.

SUMMARY

Embodiments of this application provide a blockchain-based data processing method, a device, and a medium, to improve a transaction processing capability while transaction security is ensured.

According to a first aspect, an embodiment of this application provides a blockchain-based data processing method, including:
  sending, by a first client device, a first channel closing message in a second state to a second client device on an off-chain channel, so that the second client device switches a fund status from a first state to the second state based on fund information in the second state, where the first channel closing message in the second state includes the fund information in the second state and a first hash lock in the second state, and the first hash lock in the second state is a hash lock of the first client device in the second state;
  receiving, by the first client device, a second signature in the second state and a second channel closing message in the second state that are sent by the second client device on the off-chain channel, where the second signature in the second state is obtained by signing the second channel closing message in the second state by the second client device based on a private key of the second client device, the second channel closing message in the second state includes the fund information in the second state, the first hash lock in the second state, and a second hash lock in the second state, and the second hash lock in the second state is a hash lock of the second client device in the second state; and
  signing, by the first client device, a third channel closing message in the second state based on a private key of the first client device, to obtain a first signature in the second state; and sending the first signature in the second state to the second client device, where the third channel closing message in the second state includes the fund information in the second state, the first hash lock in the second state, and the second hash lock in the second state.

In the method, the first client device may send the first channel closing message in the second state to the second client device on the off-chain channel in a process of performing transaction with the second client device, so that the second client device updates the fund status without performing communication by using a main chain of a blockchain. In this way, a fast transaction between client devices is implemented. In addition, in the transaction process, each of the first client device and the second client device exchanges, with the other client device on the off-chain channel, the signature of the client device for the channel closing message sent by the other client device in the second state, thereby ensuring transaction fairness and transaction security of the two parties on the off-chain channel. Therefore, in the method, a large-scale transaction processing capability can be effectively improved while transaction security is ensured.

In an implementation, as shown above, before the first client device sends a status update message to the second client device on the off-chain channel, the method further includes:
  creating, by the first client device and the second client device, the off-chain channel in the first state; and
  sending, by the first client device, a channel creation message to a blockchain node device, so that the blockchain node device processes the channel creation message according to a preset channel creation smart contract, and determines that a fund status of the off-chain channel on a blockchain is the first state.

In the method, when the off-chain channel is created, the channel creation message may be sent to the blockchain node device, so that the blockchain node device processes the channel creation message according to the preset channel creation smart contract. In this way, the smart contract on the blockchain may be used to bind the off-chain channel. In addition, it is determined that the fund status of the off-chain channel on the blockchain is the first state, and a relationship between the off-chain channel and the fund status on the blockchain is created, thereby effectively ensuring transaction security on the off-chain channel.

In another implementation, as shown above, the creating, by the first client device and the second client device, the off-chain channel in the first state may include:
  generating, by the first client device, information required for creating the off-chain channel in the first state, where the information required for creating the off-chain channel includes at least fund information in the first state;

generating, by the first client device, the channel creation message based on the fund information in the first state; and sending, by the first client device to the second client device, the information required for creating the off-chain channel, so that the second client device generates a channel creation message based on the fund information in the first state.

In still another implementation, as shown above, the creating, by the first client device and the second client device, the off-chain channel in the first state further includes:

signing, by the first client device, the channel creation message based on the private key of the first client device, to obtain a signature of the first client device for the channel creation message; and sending the signature of the first client device for the channel creation message to the second client device; and receiving, by the first client device, a signature that is of the second client device for the channel creation message generated by the second client device and that is sent by the second client device.

In yet another implementation, as shown above, the creating, by the first client device and the second client device, the off-chain channel in the first state further includes:

sending, by the first client device, the signature of the first client device for the channel creation message and the signature of the second client device for the channel creation message to the blockchain node device.

In the method, the first client device further sends the signature of the first client device for the channel creation message and the signature of the second client device for the channel creation message to the blockchain node device. In this way, in the process of creating the off-chain channel, the blockchain node device verifies identities of the first client device and the second client device according to the preset channel creation smart contract, thereby ensuring security of the off-chain channel and further ensuring transaction security on the off-chain channel.

In yet another implementation, as shown above, the information required for creating the off-chain channel further includes a first hash lock in the first state, and the first hash lock in the first state is a hash lock of the first client device in the first state.

As shown above, the creating, by the first client device and the second client device, the off-chain channel in the first state further includes:

receiving, by the first client device, a first channel closing message in the first state and a signature of the second client device for the first channel closing message in the first state that are sent by the second client device, where the first channel closing message in the first state includes the fund information in the first state, the first hash lock in the first state, and a second hash lock in the first state, and the second hash lock in the first state is a hash lock of the second client device in the first state; and signing, by the first client device, a second channel closing message in the first state based on the private key of the first client device, to obtain a signature of the first client device for the second channel closing message in the first state; and sending the signature of the first client device for the second channel closing message in the first state to the second client device.

The second channel closing message in the first state includes the fund information in the first state, the first hash lock in the first state, and the second hash lock in the first state.

In the method in this embodiment, in the process in which the first client device and the second client device create the off-chain channel, each of the first client device and the second client device exchanges, with the other client device, the signature of the client device in the first state for the channel closing message of the other client device, thereby ensuring transaction security of the two parties.

In yet another implementation, as shown above, the creating, by the first client device and the second client device, the off-chain channel in the first state further includes:

sending, by the first client device, the second channel closing message in the first state to the second client device.

In yet another implementation, as shown above, the creating, by the first client device and the second client device, the off-chain channel in the first state further includes:

signing, by the first client device, the first channel closing message in the first state based on the private key of the first client device, to obtain a signature of the first client device for the first channel closing message in the first state.

In yet another implementation, the first channel closing message in the first state further includes a time lock, and the second channel closing message in the first state further includes a time lock.

In yet another implementation, before the sending, by a first client device, a first channel closing message to a second client device on an off-chain channel, the method may further include:

generating, by the first client device, information required for creating the second state, where the information required for creating the second state includes the fund information in the second state, a time lock, and the first hash lock in the second state.

In yet another implementation, the first channel closing message in the second state further includes a time lock.

The second channel closing message in the second state further includes a time lock, and the third channel closing message in the second state further includes a time lock.

In yet another implementation, the method may further include:

further sending, by the first client device, the third channel closing message in the second state to the second client device.

In yet another implementation, the method may further include:

signing, by the first client device, the second channel closing message in the second state based on the private key of the first client device, to obtain a signature of the first client device for the second channel closing message in the second state.

In yet another implementation, the method further includes:

sending, by the first client device, a hash lock preimage of the first client device in the first state to the second client device, and receiving a hash lock preimage that is of the second client device in the first state and that is sent by the second client device.

In the method, in the process in which the first client device and the second client device perform transaction on the off-chain channel, each of the first client device and the second client device exchanges the hash lock preimage of the client device in an old state with the other client device, to indicate that the old state is abandoned. Once one party sends a channel closing message in the old state, to punish the initiator of the channel closing message of the old state, a fund quota of the initiator in the first state is transferred to a fund address of the other party on the blockchain. In this way, the two parties can initiate the channel closing messages in a new state as much as possible, which avoids abnormal exit and ensures transaction security of the two parties. Therefore, in the method, a large-scale transaction processing capability can be effectively improved while transaction security is ensured.

In yet another implementation, the method further includes:
  generating, by the first client device, a channel exit message, where the channel exit message includes the hash lock preimage of the second client device in the first state;
  signing, by the first client device, the channel exit message based on the private key of the first client device and a fund address of the first client device on the blockchain; and
  sending, to the blockchain node device by the first client device, a monitoring request that includes the channel exit message and a signature of the first client device for the channel exit message, so that the blockchain node device monitors a channel closing message sent by the second client device.

In the method, the first client device may send the monitoring request to the blockchain node device, to monitor a channel closing message initiated by the peer client device, thereby ensuring transaction security on the off-chain channel.

According to a second aspect, an embodiment of this application further provides a blockchain-based data processing method, including:
  receiving, on an off-chain channel by a second client device, a first channel closing message that is in a second state and that is sent by a first client device, and switching a fund status from a first state to the second state based on fund information in the second state, where the first channel closing message in the second state includes the fund information in the second state and a first hash lock in the second state, and the first hash lock in the second state is a hash lock of the first client device in the second state;
  signing, by the second client device, a second channel closing message in the second state based on a private key of the second client device, to obtain a second signature in the second state; and sending the second signature in the second state and the second channel closing message in the second state to the first client device on the off-chain channel, where the second channel closing message in the second state includes the fund information in the second state, the first hash lock in the second state, and a second hash lock in the second state, and the second hash lock in the second state is a hash lock of the second client device in the second state; and
  further receiving, on the off-chain channel by the second client device, a first signature that is in the second state and that is sent by the first client device, where the first signature in the second state is a signature obtained by signing a third channel closing message in the second state by the first client device based on a private key of the first client device, and the third channel closing message in the second state includes the fund information in the second state, the first hash lock in the second state, and the second hash lock in the second state.

In an implementation, as shown above, before the second client device receives, on the off-chain channel, a status update message sent by the first client device, the method further includes:
  creating, by the first client device and the second client device, the off-chain channel in the first state.

In another implementation, as shown above, the creating, by the first client device and the second client device, the off-chain channel in the first state includes:
  receiving, by the second client device, information that is required for creating the off-chain channel and that is sent by the first client device, where the information required for creating the off-chain channel includes fund information in the first state; and
  generating, by the second client device, a channel creation message based on the fund information in the first state; signing the channel creation message based on the private key of the second client device, to obtain a signature of the second client device for the channel creation message; and sending the signature of the second client device for the channel creation message to the first client device, where a second hash lock in the first state is a hash lock of the second client device in the first state.

In still another implementation, as shown above, the creating, by the first client device and the second client device, the off-chain channel in the first state further includes:
  signing, by the second client device, a first channel closing message in the first state based on the private key of the second client device, to obtain a signature of the second client device for the first channel closing message in the first state, where the first channel closing message in the first state includes the fund information in the first state, a first hash lock in the first state, and a second hash lock in the first state, and the second hash lock in the first state is a hash lock of the second client device in the first state;
  sending, by the second client device, the first channel closing message in the first state and the signature of the second client device for the first channel closing message in the first state to the first client device; and
  receiving, by the second client device, a second channel closing message in the first state and a signature of the first client device for the second channel closing message in the first state that are sent by the first client device, where the signature of the first client device for the second channel closing message in the first state is a signature obtained by signing the second channel closing message in the first state by the first client device based on the private key of the first client device, and the second channel closing message in the first state includes the fund information in the first state, the first hash lock in the first state, and the second hash lock in the first state.

In yet another implementation, the creating, by the first client device and the second client device, the off-chain channel in the first state further includes:
  signing, by the second client device, the second channel closing message in the first state based on the private key of the second client device, to obtain the signature of the second client device for the second channel closing message in the first state.

In yet another implementation, the first channel closing message in the first state further includes a time lock, and the second channel closing message in the first state further includes a time lock.

In yet another implementation, the first channel closing message in the second state further includes a time lock.

The second channel closing message in the second state further includes a time lock, and the third channel closing message in the second state further includes a time lock.

In yet another implementation, the method further includes:
receiving, by the second client device, the third channel closing message that is in the second state and that is sent by the first client device.

In yet another implementation, the method further includes:
signing, by the second client device, the third channel closing message in the second state based on the private key of the second client device, to obtain a signature of the second client device for the third channel closing message in the second state.

In yet another implementation, the method further includes:
receiving, by the second client device, a hash lock preimage that is of the first client device in the first state and that is sent by the first client device, and sending a hash lock preimage of the second client device in the first state to the first client device.

In yet another implementation, the method may further include:
generating, by the second client device, a channel exit message, where the channel exit message includes the hash lock preimage of the first client device in the first state;
signing, by the second client device, the channel exit message based on the private key of the second client device and a fund address of the second client device on the blockchain; and
sending, to a blockchain node device by the second client device, a monitoring request that includes the channel exit message and a signature of the second client device for the channel exit message, so that the blockchain node device monitors the channel closing message sent by the first client device.

According to a third aspect, an embodiment of this application may further provide a blockchain-based data processing method, including:
receiving, by a blockchain node device, a first monitoring request sent by a first client device, and monitoring, based on the first monitoring request, a channel closing message sent by a second client device, where the first monitoring request is a monitoring request sent by the first client device after the first client device and the second client device perform transaction on an off-chain channel and the first client device switches a fund status from a first state to a second state; and
receiving, by the blockchain node device, a second monitoring request sent by the second client device, and monitoring, based on the second monitoring request, a channel closing message sent by the first client device, where the second monitoring request is a monitoring request sent by the second client device after the second client device and the first client device perform transaction on the off-chain channel and the second client device switches a fund status from the first state to the second state.

In an implementation, the method may further include:
receiving, by the blockchain node device, a channel closing message that is in the first state and that is sent by the first client device; and
processing, by the blockchain node device, the channel closing message in the first state according to a preset first channel closing smart contract.

In another implementation, that the blockchain node device processes the channel closing message in the first state according to a preset first channel exit smart contract includes:
if the blockchain node device receives, within a time corresponding to a preset time lock, a hash lock preimage that is of the first client device in the first state and that is sent by the second client device, performing a hash operation on the hash lock preimage of the first client device in the first state according to the first channel closing smart contract, to obtain a hash value;
further comparing, by the blockchain node device, the hash value with a first hash lock in the first state according to the first channel closing smart contract; and
if the hash value is the same as the first hash lock in the first state, transferring, by the blockchain node device, a fund quota of the first client device in the first state to a fund address of the second client device on a blockchain according to the first channel exit smart contract.

In another implementation, that the blockchain node device processes the channel closing message in the first state according to a preset first channel exit smart contract includes:
if the blockchain node has not received, within a time corresponding to a preset time lock, a hash lock preimage that is of the first client device in the first state and that is sent by the second client device, transferring, by the blockchain node device, a fund quota of the first client device in the first state to a fund address of the first client device on a blockchain according to the first channel exit smart contract.

In still another implementation, the method further includes:
receiving, by the blockchain node device, a channel closing message that is in the second state and that is sent by the first client device; and
transferring, by the blockchain node device, a fund quota of the second client device in the second state to the fund address of the second client device on the blockchain according to a preset second channel closing smart contract, and transferring a fund quota of the first client device in the second state to the fund address of the first client device on the blockchain after the time corresponding to the preset time lock is reached.

In yet another implementation, the method further includes:
receiving, by the blockchain node device, a closing request that is sent by the first client device or the second client device and that is obtained after negotiation between the first client device and the second client device, where the closing request includes a channel closing message, a signature of the first client device for the channel closing message, and a signature of the second client device for the channel closing message;
verifying, by the blockchain node device, the signature of the first client device for the channel closing message and the signature of the second client device for the channel closing message according to a preset third channel closing smart contract; and if the verification succeeds, according to the third channel closing smart contract, transferring, to the fund address of the first client device on the blockchain by the blockchain node device, a fund quota that is of the first client device and that is obtained after negotiation between the first client device and the second client device; and transferring, to the fund address of the second client device on the blockchain, a fund quota that is of the second client device and that is obtained after negotiation between the first client device and the second client device.

According to a fourth aspect, an embodiment of this application may further provide an apparatus on a first client device side. The apparatus may be a first client device, or may be a chip in the first client device.

The apparatus can implement any function of the first client device in any implementation of the first aspect. The function may be implemented by hardware, or may be implemented by hardware executing corresponding software. The hardware or the software includes one or more units corresponding to the function.

In a possible implementation, when the apparatus is the first client device, the first client device may include a processor and a transceiver. The processor is configured to support the first client device in performing corresponding functions in the foregoing method. The transceiver is configured to support communication between the first client device and a second client device, to send information or an instruction in the foregoing method to the second client device; and is further configured to support communication between the first client device and a blockchain node device, to send information or an instruction in the foregoing method to the blockchain node device. Optionally, the first client device may further include a memory. The memory is configured to be coupled to the processor. The memory stores a program instruction and data that are necessary for the first client device.

In a possible implementation, the apparatus includes a processor, a memory, a transceiver, an antenna, and an input/output apparatus. The processor is mainly configured to control the entire apparatus to execute a computer program instruction, to support the apparatus in performing the operations described in any method embodiment of the first aspect. The memory is mainly configured to store a program instruction and data that are necessary for the first client device. The transceiver is mainly configured to: perform conversion between a baseband signal and a radio frequency signal, and process the radio frequency signal. The antenna is mainly configured to transmit and receive a radio frequency signal in an electromagnetic wave form. The input/output apparatus such as a touchscreen, a display, or a keyboard, is mainly configured to: receive data input by a user, and output data to the user.

In a possible implementation, when the apparatus is a chip in the first client device, the chip includes a processing module and a transceiver module. The processing module may be, for example, a processor. For example, the processor is configured to: generate various messages and signaling, and perform processing such as encoding, modulation, and amplification on various messages resulting from protocol-based encapsulation. The processor may be further configured to perform demodulation, decoding, and decapsulation to obtain the signaling and messages. The transceiver module may be, for example, an input/output interface, a pin, or a circuit on the chip. The processing module may execute a computer execution instruction stored in the storage unit to support the first client device in executing a corresponding function in the foregoing method. Optionally, the storage unit may be a storage unit in the chip, such as a register or a buffer, or the storage unit may be a storage unit in the first client device but outside the chip, such as a read-only memory (ROM), another type of static storage device capable of storing static information and instructions, or a random access memory (RAM).

Any one of the processors mentioned anywhere above may be a general-purpose central processing unit (CPU), a microprocessor, an application-specific integrated circuit (ASIC), or one or more integrated circuits for controlling program execution of the blockchain-based data processing method in the first aspect.

According to a fifth aspect, an embodiment of this application may further provide an apparatus on a second client device side. The apparatus may be a second client device, or may be a chip in the second client device.

The apparatus can implement any function of the second client device in any implementation of the second aspect. The function may be implemented by hardware, or may be implemented by hardware executing corresponding software. The hardware or the software includes one or more units corresponding to the function.

In a possible implementation, when the apparatus is the second client device, the second client device may include a processor and a transceiver. The processor is configured to support the second client device in performing corresponding functions in the foregoing method. The transceiver is configured to support communication between a first client device and the second client device, to send information or an instruction in the foregoing method to the first client device; and is further configured to support communication between the second client device and a blockchain node device, to send information or an instruction in the foregoing method to the blockchain node device. Optionally, the second client device may further include a memory. The memory is configured to be coupled to the processor. The memory stores a program instruction and data that are necessary for the second client device.

In a possible implementation, the apparatus includes a processor, a memory, a transceiver, an antenna, and an input/output apparatus. The processor is mainly configured to control the entire apparatus to execute a computer program instruction, to support the apparatus in performing the operations described in any method embodiment of the second aspect. The memory is mainly configured to store a program instruction and data that are necessary for the second client device. The transceiver is mainly configured to: perform conversion between a baseband signal and a radio frequency signal, and process the radio frequency signal. The antenna is mainly configured to transmit and receive a radio frequency signal in an electromagnetic wave form. The input/output apparatus such as a touchscreen, a display, or a keyboard, is mainly configured to: receive data input by a user, and output data to the user.

In a possible implementation, when the apparatus is a chip in the second client device, the chip includes a processing module and a transceiver module. The processing module may be, for example, a processor. For example, the processor is configured to generate various messages and signaling, and perform processing such as encoding, modulation, and amplification on various messages resulting from protocol-based encapsulation. The processor may be further configured to perform demodulation, decoding, and decapsulation to obtain the signaling and messages. The transceiver module may be, for example, an input/output interface, a pin, or a circuit on the chip. The processing module may execute a computer execution instruction stored in the storage unit to support the second client device in executing a corresponding function in the foregoing method. Optionally, the storage unit may be a storage unit in the chip, for example, a register or a cache, or the storage unit may be a storage unit in the second client device but outside the chip, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the blockchain-based data processing method in the second aspect.

According to a sixth aspect, an embodiment of this application may further provide an apparatus on a blockchain node device side. The apparatus may be a blockchain node device, or may be a chip in the blockchain node device.

The apparatus can implement any function of the blockchain node device in any implementation of the third aspect. The function may be implemented by hardware, or may be implemented by hardware executing corresponding software. The hardware or the software includes one or more units corresponding to the function.

In a possible implementation, when the apparatus is the blockchain node device, the blockchain node device may include a processor and a transceiver. The processor is configured to support the blockchain node device in performing corresponding functions in the foregoing method. The transceiver is configured to support communication between the blockchain node device and a first client device, to receive information or an instruction that is sent by the first client device in the foregoing method; and is further configured to support communication between the blockchain node device and a second client device, to receive information or an instruction that is sent by the second client device in the foregoing method. Optionally, the blockchain node device may further include a memory. The memory is configured to be coupled to the processor. The memory stores a program instruction and data that are necessary for the blockchain node device.

In a possible implementation, the apparatus includes a processor, a memory, a transceiver, an antenna, and an input/output apparatus. The processor is mainly configured to control the entire apparatus to execute a computer program instruction, to support the apparatus in performing the operations described in any method embodiment of the third aspect. The memory is mainly configured to store a program instruction and data that are necessary for the blockchain node device. The transceiver is mainly configured to: perform conversion between a baseband signal and a radio frequency signal, and process the radio frequency signal. The antenna is mainly configured to transmit and receive a radio frequency signal in an electromagnetic wave form. The input/output apparatus such as a touchscreen, a display, or a keyboard, is mainly configured to: receive data input by a user, and output data to the user.

In a possible implementation, when the apparatus is a chip in the blockchain node device, the chip includes a processing module and a transceiver module. The processing module may be, for example, a processor. For example, the processor is configured to: generate various messages and signaling, and perform processing such as encoding, modulation, and amplification on various messages resulting from protocol-based encapsulation. The processor may be further configured to perform demodulation, decoding, and decapsulation to obtain the signaling and messages. The transceiver module may be, for example, an input/output interface, a pin, or a circuit on the chip. The processing module may execute a computer execution instruction stored in the storage unit to support the blockchain node device in executing a corresponding function in the foregoing method. Optionally, the storage unit may be a storage unit in the chip, for example, a register or a cache, or the storage unit may be a storage unit in the second device but outside the chip, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the blockchain-based data processing method in the third aspect.

According to a seventh aspect, an embodiment of this application further provides a computer-readable storage medium. The computer-readable storage medium stores an instruction. The instruction may be executed by one or more processors in a processing circuit. When the instruction is run on a computer, the computer is enabled to perform the blockchain-based data processing method in any possible implementation of any aspect of the first aspect, the second aspect, or the third aspect.

According to an eighth aspect, an embodiment of this application provides a computer program product including an instruction. When the computer program product is run on a computer, the computer is enabled to perform the blockchain-based data processing method in any possible implementation of any aspect of the first aspect, the second aspect, or the third aspect.

According to a ninth aspect, an embodiment of this application may further provide a chip system. The chip system includes a processor, configured to support a first client device, a second client device, or a blockchain node device in implementing the functions in the first aspect, the second aspect, or the third aspect, for example, generating or processing data and/or information in the foregoing aspects. In a possible design, the chip system further includes a memory. The memory is configured to store a program instruction and data that are necessary for a data sending device. The chip system may include a chip, or may include a chip and another discrete device.

According to a tenth aspect, an embodiment of this application may further provide a network system, including a first client device and a second client device. The first client device is the first client device described in any one of the foregoing implementations, and the second client device is the second client device described in any one of the foregoing implementations. Optionally, the network system may further include a blockchain node device, and the blockchain node device may be the blockchain node device described in any one of the foregoing implementations.

The embodiments of this application provide the blockchain-based data processing method, the device, and the medium. The first client device may send the first channel closing message in the second state to the second client device on the off-chain channel. The first channel closing message in the second state includes the fund information in the second state and the first hash lock in the second state, so that the second client device switches the fund status from the first state to the second state based on fund quota information in the second state. The first client device further receives the second signature in the second state and the second channel closing message in the second state that are sent by the second client device on the off-chain channel.

The second signature in the second state is a signature obtained by signing the second channel closing message by the second client device based on the private key of the second client device. The first client device further signs the third channel closing message based on the private key of the first client device, to obtain the first signature in the second state; and sends the first signature in the second state to the second client device. In the method, the first client device may send the first channel closing message in the second state to the second client device on the off-chain channel in a process of performing transaction with the second client device, so that the second client device updates the fund status without performing communication by using a main chain of the blockchain. In this way, a fast transaction between client devices is implemented. In addition, in the transaction process, each of the first client device and the second client device exchanges, with the other client device on the off-chain channel, the signature of the client device for the channel closing message sent by the other client device in the second state, so that the other client must exit by using the channel closing message in the newest state, that is, the second state, thereby avoiding abnormal exit and ensuring transaction fairness and transaction security of the two parties on the off-chain channel. Therefore, in the method, a large-scale transaction processing capability can be effectively improved while transaction security is ensured.

DESCRIPTION OF EMBODIMENTS

The blockchain-based data processing method, the device, and medium provided in the embodiments of this application may be applied to any blockchain platform that supports a Turing complete smart contract, for example, a public chain platform or a consortium chain platform. The public chain platform may be, for example, the Ethereum, the NEO, or the Cardano. The consortium chain platform may be, for example, a hyperledger fabric.

For ease of solution understanding, technologies related to this application are first explained below.

Figure 1:
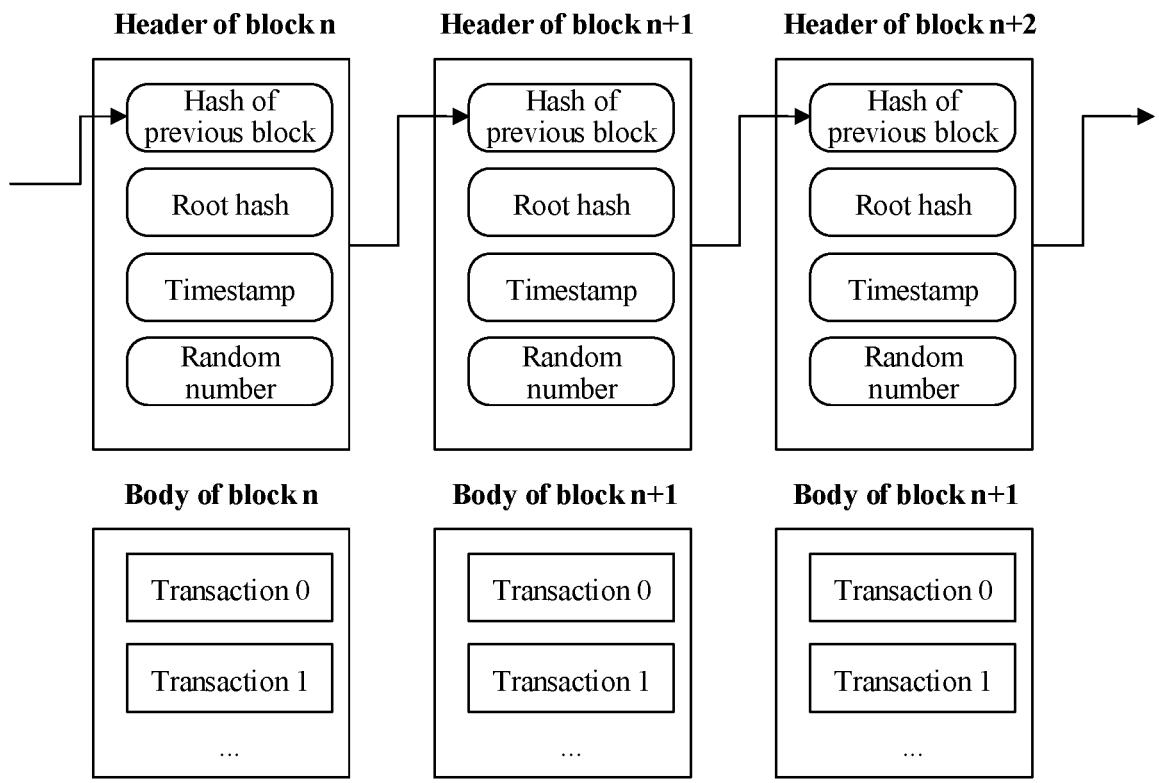
FIG. 1 is a schematic diagram of a data structure of a blockchain according to an embodiment of this application.

A blockchain is a chain data structure that includes blocks that are formed by transaction data and that are sequentially arranged in a time order. In this structure, it is ensured based on cryptology that a ledger cannot be tempered or forged. FIG. 1 is a schematic diagram of a data structure of a blockchain according to an embodiment of this application.

The blockchain is maintained by a blockchain node device also referred to as a miner node device. As shown in FIG. 1, miner devices of an entire network package received transaction requests in a specific time period, and a block packaged by a miner device winning in a competition may be used as a block acknowledged by the entire network and be connected to a main chain. Each block on the main chain may include a block header and a block body. Core data of the block header includes a hash value of a previous block header (pre-block hash), a time stamp of package of a current block, a root hash, and a random number (nonce). The block body mainly includes a hash value, packaged in the block body, of at least one transaction.

A programming language that can simulate a Turing machine is referred to as a Turing complete programming language, and can be used to complete calculation tasks of any calculable problem. A smart contract is code that is written with preset logic and that can be executed in a distributed and trusted manner in a blockchain system. The Turing complete smart contract is a blockchain smart contract that can be used to complete calculation of any calculable problem, and can be used to implement any logic. The smart contract in the embodiments of this application may be deployed on a blockchain node device, for example, on a miner node device or an agent miner node device.

Figure 2A:
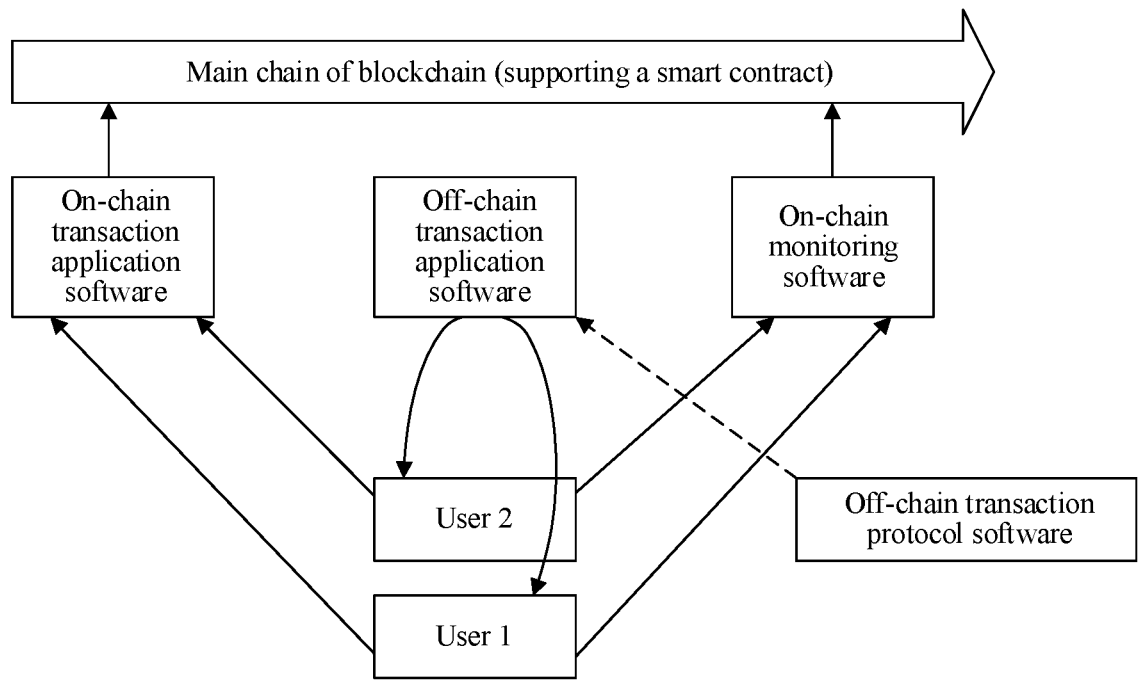
FIG. 2A is a schematic diagram of an application system architecture to which an embodiment of this application is applicable.

The following describes an application system architecture to which the embodiments of this application are applicable. FIG. 2A is a schematic diagram of an application system architecture to which an embodiment of this application is applicable. As shown in FIG. 2A, a user 1 and a user 2 may separately interact, by using on-chain transaction application software, with a main chain of a blockchain supporting a smart contract; or may perform transaction with each other on an off-chain channel by using off-chain transaction application software; or may monitor a main chain of a blockchain by using on-chain monitoring software. The on-chain transaction application software, the off-chain transaction application software, and the on-chain monitoring software each may be a function module of a client application program, or an application program.

The off-chain transaction application software is a software development kit (SDK) compiled based on an off-chain transaction protocol.

Figure 2B:
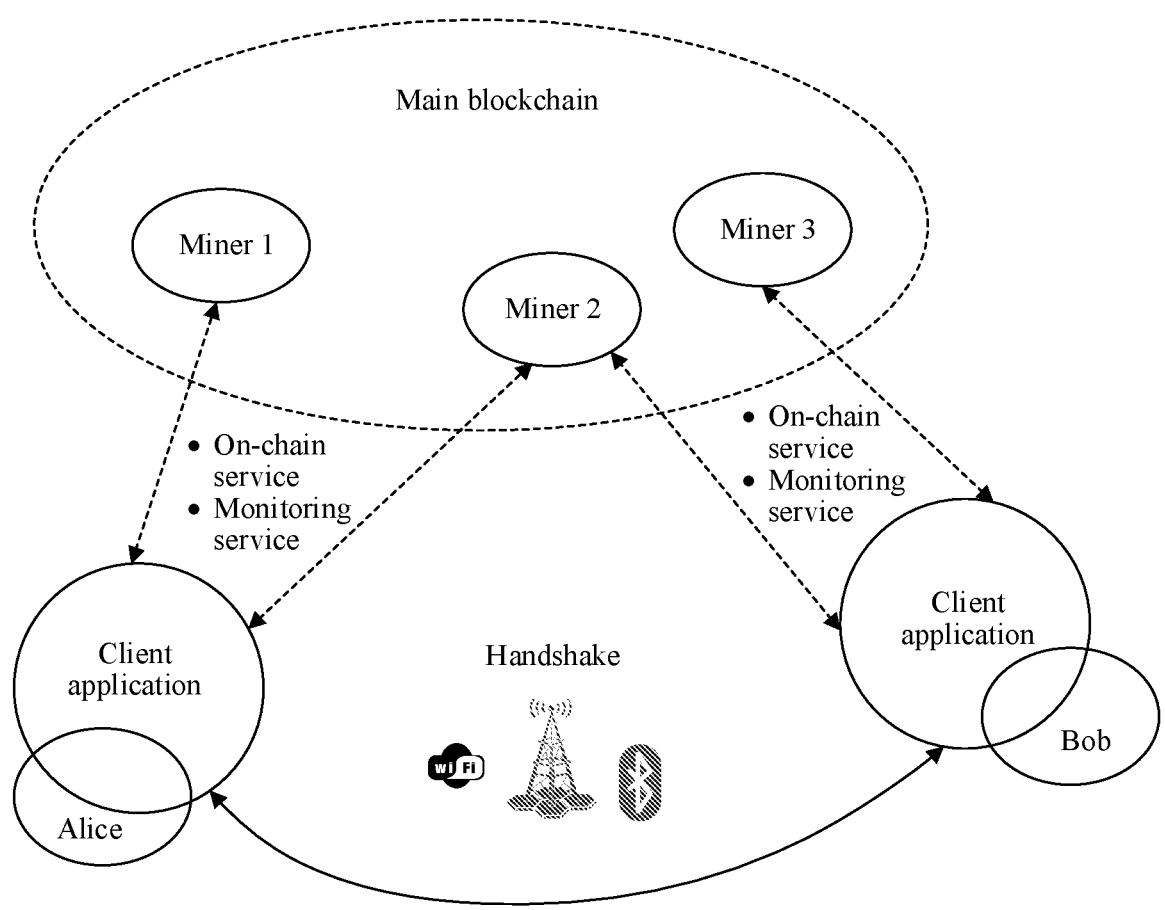
FIG. 2B is a first schematic diagram of an application scenario according to an embodiment of this application.

The following describes an example of an application scenario of an embodiment of this application. FIG. 2B is a first schematic diagram of an application scenario according to an embodiment of this application. In the application scenario shown in FIG. 2B, a client application (Client app) may be separately installed on a first client device Alice and a second client device Bob. The client application may include the on-chain transaction application software, the off-chain transaction application software, and the on-chain monitoring software shown in FIG. 2A. When the first client device Alice and the second client device Bob have a transaction requirement, the first client device Alice and the second client device Bob may trigger creation of an off-chain channel between the two client devices by using the on-chain transaction application software in the client application installed on the two client devices, so that a blockchain node device determines a fund status of the off-chain channel on the blockchain. In this way, creation and a lock operation are implemented for a fund pool of the transaction between the first client device and the second client device on the off-chain channel. The first client device Alice and the second client device Bob may further perform transaction on the created off-chain channel by using the off-chain transaction application software in the client application installed on the two client devices, to update a fund status. In each transaction process, each of the first client device Alice and the second client device Bob may further trigger a monitoring service of the blockchain node device by using the on-chain monitoring software in the client application installed on the client device, to monitor a channel exit message initiated by the other client device. In the entire process, the first client device Alice and the second client device Bob may be separately connected to a plurality of blockchain node devices, for example, miner nodes shown in FIG. 2B, to avoid a case in which the monitoring service is unavailable when a single miner node is faulty, thereby ensuring transaction security on the off-chain channel. The first client device Alice and the second client device Bob may trigger closing of the off-chain channel at any time by using a fast channel closing protocol.

Figure 2C:
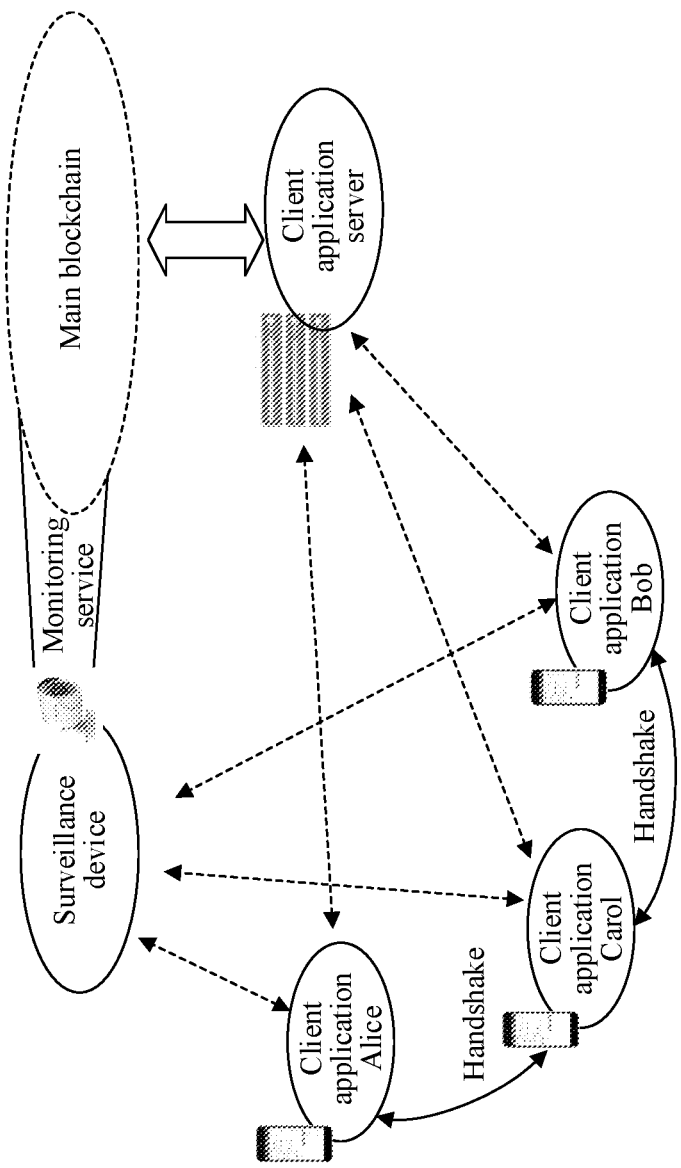
FIG. 2C is a second schematic diagram of an application scenario according to an embodiment of this application.

FIG. 2C is a second schematic diagram of an application scenario according to an embodiment of this application. In the application scenario shown in FIG. 2C, a client application (Client app) may be separately installed on a first client device Alice, a second client device Bob, and a third client device Carol. The client application may include the on-chain transaction application software, the off-chain transaction application software, and the on-chain monitoring software shown in FIG. 2A.

When the first client device Alice and the second client device Bob have a transaction need, the first client device Alice and the third client device Carol may trigger creation of an off-chain channel between the first client device Alice and the third client device Carol by using the on-chain transaction application software in the client application installed on the two client devices, and the third client device Carol and the second client device Bob may trigger creation of an off-chain channel between the third client device Carol and the second client device Bob by using the on-chain transaction application software in the client application installed on the two client devices.

The first client device Alice and the third client device Carol may perform transaction on the off-chain channel between the first client device Alice and the third client device Carol by using the off-chain transaction application software in the client application installed on the two client devices, to update a fund status. The third client device Carol and the second client device Bob may perform transaction on the off-chain channel between the third client device Carol and the second client device Bob by using the off-chain transaction application software in the client application installed on the two client devices, to update a fund status. In this way, an off-chain transaction is implemented between the first client device Alice and the second client device Bob.

In each transaction process, each of the first client device Alice, the second client device Bob, and the third device Carol may further trigger a monitoring service of a monitoring device by using the on-chain monitoring software in the client application installed on the client device, to monitor a channel exit message initiated by another one of the three client devices. The first client device Alice and the third client device Carol may trigger closing of the off-chain channel at any time by using a fast channel closing protocol, and the third client device Carol and the second client device Bob may trigger closing of the off-chain channel at any time by using the fast channel closing protocol.

The solutions in the embodiments of this application may be applied to a high-frequency transaction scenario. Typical scenarios include, for example, a blockchain-based micropayment scenario in an Internet of things (IoT) environment or a mobile terminal environment. Miner node devices may be deployed for banks to create a blockchain and maintain the blockchain. Application software may be separately downloaded by a merchant and a user. An off-chain channel may be created between a user and a merchant or between merchants, so that a handshake transaction is performed on the off-chain channel. In this way, micropayment operations in frequent transactions are completed.

Figure 3:
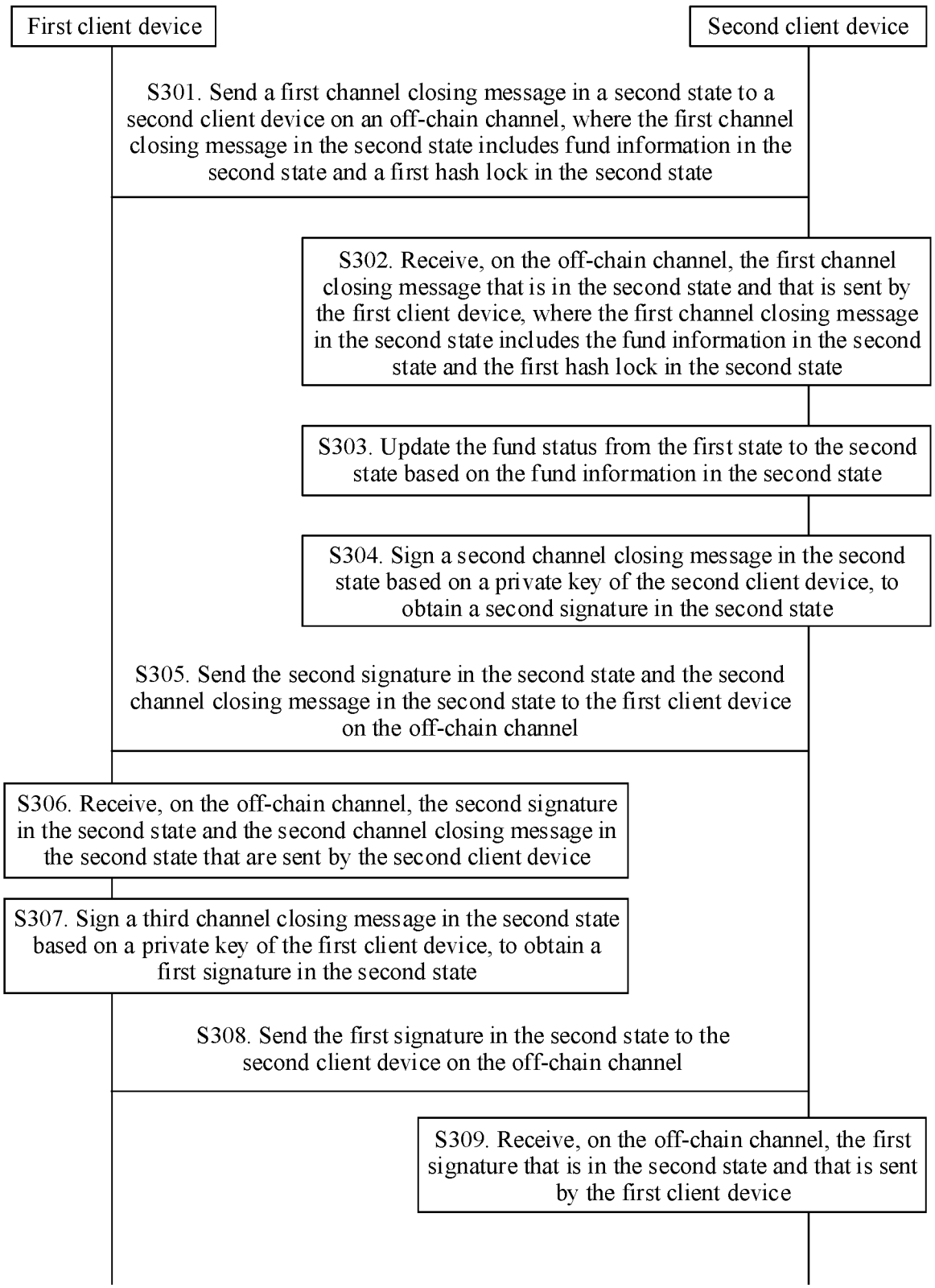
FIG. 3 is a flowchart of a blockchain-based data processing method according to an embodiment of this application.

With reference to a plurality of examples, the following describes the blockchain-based data processing method provided in the embodiments of this application. FIG. 3 is a flowchart of a blockchain-based data processing method according to an embodiment of this application. The method may be interactively performed by two client devices. The client device may be a terminal device on which a client application program is installed. The terminal device may be any device of, for example, a desktop computer, a notebook computer, a personal digital assistant (PDA), a smartphone, a tablet computer, or a mobile payment device. The client application program may be the application program in the application system architecture shown in FIG. 2A. As shown in FIG. 3, the blockchain-based data processing method may include the following steps.

S301. A first client device sends a first channel closing message in a second state to a second client device on an off-chain channel, where the first channel closing message in the second state includes fund information in the second state and a first hash lock in the second state.

The first channel closing message in the second state is used by the second client device to switch a fund status from a first state to the second state based on the fund information in the second state. The first hash lock in the second state may be a hash lock of the first client device in the second state.

The off-chain channel is an off-chain transaction channel other than a main chain of a blockchain between the first client device and the second client device. The first client device and the second client device may perform off-chain transaction on the off-chain channel. The first client device does not communicate with the main chain of the blockchain. In the process of the off-chain transaction, the first client device may be used as a transaction initiator and initiate a fund transferring transaction, and send the first channel closing message in the second state to the second client device on the off-chain channel based on the fund transferring transaction to update the fund status.

In an example, the off-chain channel may be a channel between the first client device and the second client device, and the first client device may directly send the first channel closing message in the second state to the second client device on the off-chain channel.

In another example, the off-chain channel may include a channel between the first client device and another client device and a channel between the another client device and the second client device, and the first client device may send the first channel closing message in the second state to the second client device on the off-chain channel by using the another client device. In other words, the first client device may send the first channel closing message in the second state to the another client device by using the channel between the first client device and the another client device in the off-chain channel, and the another client device sends the first channel closing message in the second state to the second client device by using the channel between the another client device and the second client device in the off-chain channel.

Regardless of a form of the off-chain channel, the first client device sends the first channel closing message in the second state to the second client device on the off-chain channel by using any wireless bidirectional communication technology such as wireless fidelity (WiFi), Bluetooth, or infrared.

The fund information in the second state may include fund quota information of the first client device in the second state, and fund quota information of the second client device in the second state. Alternatively, the fund information in the second state may include a ratio of a fund quota of the first client device in the second state to a fund quota of the second client device in the second state. Certainly, the fund information in the second state may include another fund representation form of the first client device and the second client device in the second state.

For example, the first client device is Alice, the second client device is Bob, the second state may be represented as $\beta1$, a fund quota of the first client device in the second state may be represented as a1, and a fund quota of the second client device in the second state may be represented as b1. In this case, the fund information in the second state may include a1 and b1.

The fund in this embodiment of this application may be a fund in a bitcoin form, or may be a digital currency or a digital asset in another form.

The first hash lock in the second state is a hash lock of the first client device in the second state. The first hash lock in the second state is hashlockA1.

The first client device and the second client device may perform transaction on the off-chain channel for a plurality of times. Therefore, to specify a transaction between the first client device and the second client device, a fund status corresponding to the transaction, and the like, the first client device further determines a transaction index corresponding to the second state. The first channel closing message that is in the second state and that is sent by the first client device to the second client device also includes the transaction index. The transaction index may also be referred to as a transaction sequence number.

Before the first client device sends the first channel closing message in the second state to the second client device on the off-chain channel, the method may include:
  generating, by the first client device, information required for creating the second state, where the information required for creating the second state includes the fund information in the second state, a time lock, and the first hash lock in the second state.

For example, the first client device may determine the fund information in the second state based on fund information corresponding to a preset transaction or a transaction corresponding to a received selection operation instruction input by a user.

Optionally, the first channel closing message that is in the second state and that is sent by the first client device to the second client device may further include a time lock.

The method further includes:
  updating, by the first client device, the fund status from the first state to the second state based on the fund information in the second state, where the first state is a fund status before the second state.

S302. The second client device receives, on the off-chain channel, the first channel closing message that is in the second state and that is sent by the first client device, where the first channel closing message in the second state includes the fund information in the second state and the first hash lock in the second state.

S303. The second client device updates the fund status from the first state to the second state based on the fund information in the second state.

After receiving the first channel closing message in the second state, the second client device may first save the fund information in the second state, and update the fund status from the first state to the second state based on the fund information in the second state to update the fund status.

If a fund quota of the first client device in the first state $\beta_0$ is a0, and a fund quota of the second client device in the first state $\beta_0$ is b0, the first state $\beta_0$ may be represented as $\beta_0$: [Alice=>a0;Bob=>b0]. If a fund transaction $TX_0$ initiated by the first client device is transferring a fund x to the second client device, the fund transaction $TX_0$ may be represented as $TX_0$: [Alice=>Bob: x]. The second state $\beta_1$ is a fund status obtained after the transaction is completed. The second state $\beta_1$ may be represented as $\beta_1$: [Alice=>a1; Bob=>b1]. Herein, a fund quota of the first client device in the second state $\beta_1$ is a1, and a fund quota of the second client device in the second state $\beta_1$ is b1. If the fund quota of the first client device in the second state $\beta_1$ meets a1=a0−x, and the fund quota of the second client device in the second state $\beta_1$ meets b1=b0+x.

S304. The second client device signs a second channel closing message in the second state based on a private key of the second client device, to obtain a second signature in the second state.

The second channel closing message in the second state includes the fund information in the second state, the first hash lock in the second state, and a second hash lock in the second state. The second hash lock in the second state is a hash lock of the second client device in the second state.

When receiving the first channel closing message in the second state, the second client device may generate the channel closing message in the second state, that is, the second channel closing message in the second state based on the fund information in the second state, the first hash lock in the second state, and the second hash lock in the second state; and sign the second channel closing message in the second state by using the private key of the second client device, to obtain the second signature in the second state.

Optionally, the second channel closing message in the second state may further include a time lock.

The first client device is Alice, the second client device is Bob, and the signature of the second client device for the second channel closing message in the second state may be represented as SigAB1.

For example, in this embodiment, the second client device may generate the channel closing message of the first client device in the second state, for example, the second channel closing message MA_Close1 in the second state based on the time lock Timelock, the first hash lock hashlockA1 in the second state, the second hash lock hashlockB1 in the second state, the fund quota a1 of the first client device in the second state, and the fund quota b1 of the second client device in the second state; and sign the second channel closing message MA_Close1 in the second state based on the private key of the second client device, to obtain the signature SigAB1 of the second client device for the second channel closing message in the second state.

The second channel closing message MA_Close1 in the second state may include a preset character string "Alice-CloseTx1" for indicating that a message type is a channel closing message; further include a preset channel message such as a character string "channel1" for indicating the off-chain channel; and further include the time lock Timelock, the hash lock hashlockA1 of the first client device in the second state, the hash lock hashlockB1 of the second client device in the second state, the fund quota a1 of the first client device in the second state, and the fund quota b1 of the second client device in the second state. The second channel closing message MA_Close1 in the second state may be represented as Msg("AliceCloseTx1", channel1, 0, Timelock, hashlockA1, hashlockB1, a1, b1).

The signature SigAB1 of the second client device for the second channel closing message in the second state may be represented as Sign(SKB, (HA1, Counter+1)). Herein, SKB is the private key of the second client device; HA1 is a hash value of the second channel closing message MA_Close1 in the second state, and HA1 may be represented as Hash (MA_Close1); and Counter is a preset count value.

S305. The second client device sends the second signature in the second state and the second channel closing message in the second state to the first client device on the off-chain channel.

After generating the second signature in the second state, the second client device may send the second signature in the second state to the first client device, so that the first client device saves the second signature in the second state after receiving the second signature in the second state. The second client device further sends the second channel closing message in the second state to the first client device, so that the first client device obtains the second hash lock in the second state.

The second signature in the second state is used by the first client device to initiate a channel closing message in the second state. The second signature in the second state is a license signature from the second client device for the first client device to initiate the channel closing message in the second state.

If the first client device may be represented as Alice, the second client device may be represented as Bob, and the second state may be represented as β1, the second signature in the second state is SigAB1.

S306. The first client device receives, on the off-chain channel, the second signature in the second state and the second channel closing message in the second state that are sent by the second client device.

The first client device may save the second signature in the second state after receiving the second signature in the second state.

S307. The first client device signs a third channel closing message in the second state based on a private key of the first client device, to obtain a first signature in the second state.

The third channel closing message in the second state includes the fund information in the second state, the first hash lock in the second state, and the second hash lock in the second state.

The first client device may generate the channel closing message in the second state, that is, the third channel closing message in the second state based on the fund information in the second state, the first hash lock in the second state, and the second hash lock in the second state; and sign the third channel closing message in the second state by using the private key of the first client device, to obtain the first signature in the second state.

In other words, the first signature in the second state is a signature of the first client device for the channel closing message that is of the second client device in the second state and that is generated by the first client device.

Optionally, as shown above, the third channel closing message in the second state may further include a time lock.

The first client device is Alice, the second client device is Bob, and the signature of the first client device for the third channel closing message in the second state is SigBA1.

For example, in this embodiment, the first client device may generate the channel closing message of the second client device in the second state, for example, the third channel closing message MB_Close1 in the second state based on the time lock Timelock, the first hash lock hashlockA1 in the second state, the second hash lock hashlockB1 in the second state, the fund quota a1 of the first client device in the second state, and the fund quota b1 of the second client device in the second state; and sign the third channel closing message MB_Close1 in the second state based on the private key of the first client device, to obtain the signature SigBA1 of the first client device for the third channel closing message in the second state.

The third channel closing message MB_Close1 in the second state may include a preset character string "BobCloseTx1" for indicating that a message type is a channel closing message; further include a preset channel message such as a character string "channel1" for indicating the off-chain channel; and further include the time lock Timelock, the hash lock hashlockA1 of the first client device in the second state, the hash lock hashlockB1 of the second client device in the second state, the fund quota a1 of the first client device in the second state, and the fund quota b1 of the second client device in the second state. The third channel closing message MB_Close1 in the second state may be represented as Msg("BobCloseTx1", channel1, 1, Timelock, hashlockA1, hashlockB1, a1, b1).

The signature SigBA1 of the first client device for the third channel closing message in the second state may be represented as Sign(SKA, (HB1, Counter+1)). Herein, SKA is the private key of the first client device; HB1 is a hash value of the third channel closing message MB_Close1 in the second state, and HB1 may be represented as Hash(MB_Close1); and Counter is a preset count value.

S308. The first client device sends the first signature in the second state to the second client device on the off-chain channel.

After generating the first signature in the second state, the first client device may send the first signature in the second state to the second client device, so that the second client device saves the first signature in the second state after receiving the first signature in the second state.

The first signature in the second state is used by the second client device to initiate the channel closing message in the second state. The first signature in the second state is a license signature from the first client device for the second client device to initiate the channel closing message in the second state.

If the first client device may be represented as Alice, the second client device may be represented as Bob, and the second state may be represented as β1, the first signature in the second state is SigBA1.

Steps S305 and S308 are performed. Therefore, each of the first client device and the second client device may exchange, with the other client device, the signature generated by the client device in the second state, so that the other client device is allowed to initiate the channel closing message in the second state.

Optionally, when sending the first signature in the second state to the second client device, the first client device further sends the third channel closing message in the second state to the second client device, so that the second client device verifies the first signature in the second state.

S309. The second client device receives, on the off-chain channel, the first signature that is in the second state and that is sent by the first client device.

The second client device may save the first signature in the second state when receiving the first signature in the second state.

When the first client device and the second client device perform transaction on the off-chain channel, S305 and S308 may be further performed, so that each of the second client device and the first client device exchanges, with the other client device, the signature generated by the client device in the second state.

Optionally, the second client device further receives the third channel closing message that is in the second state and that is sent by the first client device.

It should be noted that the first client device and the second client device may perform transaction on the off-chain channel for a plurality of times. For example, switching is performed from the second state to a third state, from the third state to a fourth state, and the like until the off-chain channel is closed. For each state switching of the first client device and the second client device, steps S301 to S309 may be performed. The closing of the off-chain channel may be triggered by the channel closing message initiated by the first client device, or may be triggered by the channel closing message initiated by the second client device, or may be triggered by the channel closing message initiated by the first client device and the second client device after negotiation.

The first client device and the second client device perform transaction on the off-chain channel. The first client device and the second client device may separately send a notification to the blockchain node device according to a preset cycle, to instruct the blockchain node device to update fund statuses of the first client device and the second client device on the blockchain. Alternatively, the first client device and the second client device may send the channel closing messages to the blockchain node device when the off-chain channel is closed, to instruct the blockchain node device to update fund statuses of the first client device and the second client device on the blockchain.

In the blockchain-based data processing method this embodiment of this application, the first client device may send the first channel closing message in the second state to the second client device on the off-chain channel. The first channel closing message in the second state includes the fund information in the second state and the first hash lock in the second state, so that the second client device switches the fund status from the first state to the second state based on the fund information in the second state. The first client device further receives the second signature in the second state and the second channel closing message in the second state that are sent by the second client device on the off-chain channel. The second signature in the second state is a signature obtained by signing the second channel closing message in the second state by the second client device based on the private key of the second client device. The first client device further signs the third channel closing message in the second state based on the private key of the first client device, to obtain the first signature in the second state, and sends the first signature in the second state to the second client device. In the method, the first client device may send the first channel closing message in the second state to the second client device on the off-chain channel in a process of performing transaction with the second client device, so that the second client device updates the fund status without performing communication by using a main chain of the blockchain. In this way, a fast transaction between client devices is implemented. In addition, in the transaction process, each of the first client device and the second client device exchanges, with the other client device on the off-chain channel, the signature of the client device for the channel closing message sent by the other client device in the second state, thereby ensuring transaction fairness and transaction security of the two parties on the off-chain channel. Therefore, in the method, a large-scale transaction processing capability can be effectively improved while transaction security is ensured.

Figure 4:
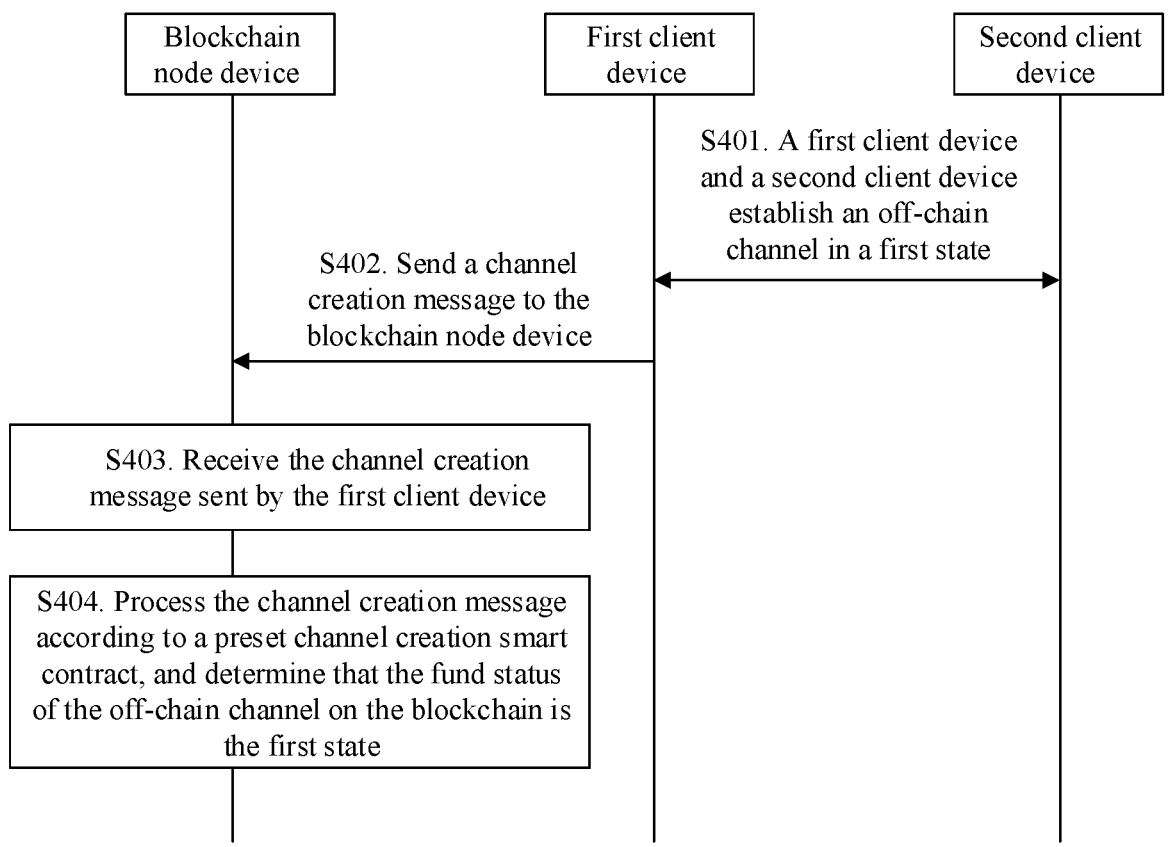
FIG. 4 is a first flowchart of a method for creating an off-chain channel in a blockchain-based data processing method according to an embodiment of this application.

Based on the blockchain-based data processing method, the embodiments of this application may further provide a blockchain-based data processing method. By using examples, the embodiments may describe a process of creating an off-chain channel in the foregoing method. FIG. 4 is a first flowchart of a method for creating an off-chain channel in a blockchain-based data processing method according to an embodiment of this application. As shown in FIG. 4, the method may be performed before S301 in which the first client device sends the first channel closing message in the second state to the second client device on the off-chain channel. The method may further include the following steps.

S401. A first client device and a second client device create an off-chain channel in a first state.

S402. The first client device sends a channel creation message (M_Create) to a blockchain node device.

The channel creation message is used by the blockchain node device to process the channel creation message according to a preset channel creation smart contract and to determine that a fund status of the off-chain channel on a blockchain is the first state.

The first client device may generate the channel creation message in the process of creating the off-chain channel.

The blockchain node device may be a device that can access or be connected to the blockchain, for example, a miner device or an agent miner device. The first client device may send the channel creation message to the blockchain by using the blockchain node device, so that the blockchain node device invokes the preset channel creation smart contract based on the channel creation message to process the channel creation message according to the channel creation smart contract and to determine that the fund status of the off-chain channel on the blockchain is the first state, thereby creating an association between the off-chain channel and the fund status on the blockchain.

After the off-chain channel is created, the first client device and the second client device may perform transaction on the off-chain channel. However, ledgers of the first client device and the second client device on the blockchain are maintained by the blockchain node device. In this case, the first client device may send the channel creation message to the blockchain node device to complete the creation of the off-chain channel.

S403. The blockchain node device receives the channel creation message sent by the first client device.

S404. The blockchain node device processes the channel creation message according to the preset channel creation smart contract, and determines that the fund status of the off-chain channel on the blockchain is the first state.

The channel creation smart contract may be deployed on the blockchain node device. Therefore, in the process of creating the off-chain channel, the blockchain node device processes the channel creation message sent by the first client device.

The blockchain node device may determine a type of a received message; if the message type is a channel creation type, invoke the preset channel creation smart contract and verify the channel creation message according to the channel creation smart contract; and after the verification succeeds, determine that the fund status of the off-chain channel on the blockchain is the first state. The first state $\beta_0$ may be represented as $\beta_0$: [Alice=>a0;Bob=>b0].

Optionally, the channel creation message may include message type indication information. The message type indication information may be, for example, a preset character string "CreatTx". The blockchain node device may determine the type of the received message based on the message type indication information included in the channel creation message.

The fund status of the off-chain channel on the blockchain is fund statuses of the first client device and the second client device in the process of creating the off-chain channel.

That the blockchain node device determines that the fund status of the off-chain channel on the blockchain is the first state may include the following content:

The blockchain node device takes corresponding funds from fund addresses of the first client device and the second client device on the blockchain based on the first state according to the preset channel creation smart contract, and creates a fund pool of the off-chain channel.

If a fund quota of the first client device in the first state is a0, and a fund quota of the second client device in the first state is b0, the blockchain node device may create a fund pool with a fund quota of (a0+b0) based on the first state, so that the first client device and the second client device perform transaction on the off-chain channel. In the first state, that is, in an initial state of creating the off-chain channel, the fund quota of the first client device may be the same as that of the second client device. In other words, a0 may be equal to b0.

In the blockchain-based data processing method in this embodiment of this application, when the off-chain channel is created, the channel creation message may be sent to the blockchain node device, so that the blockchain node device processes the channel creation message according to the preset channel creation smart contract. In this way, the smart contract on the blockchain may be used to bind the off-chain channel. In addition, it is determined that the fund status of the off-chain channel on the blockchain is the first state, and a relationship between the off-chain channel and the fund status on the blockchain is created, thereby effectively ensuring transaction security on the off-chain channel.

Figure 5:
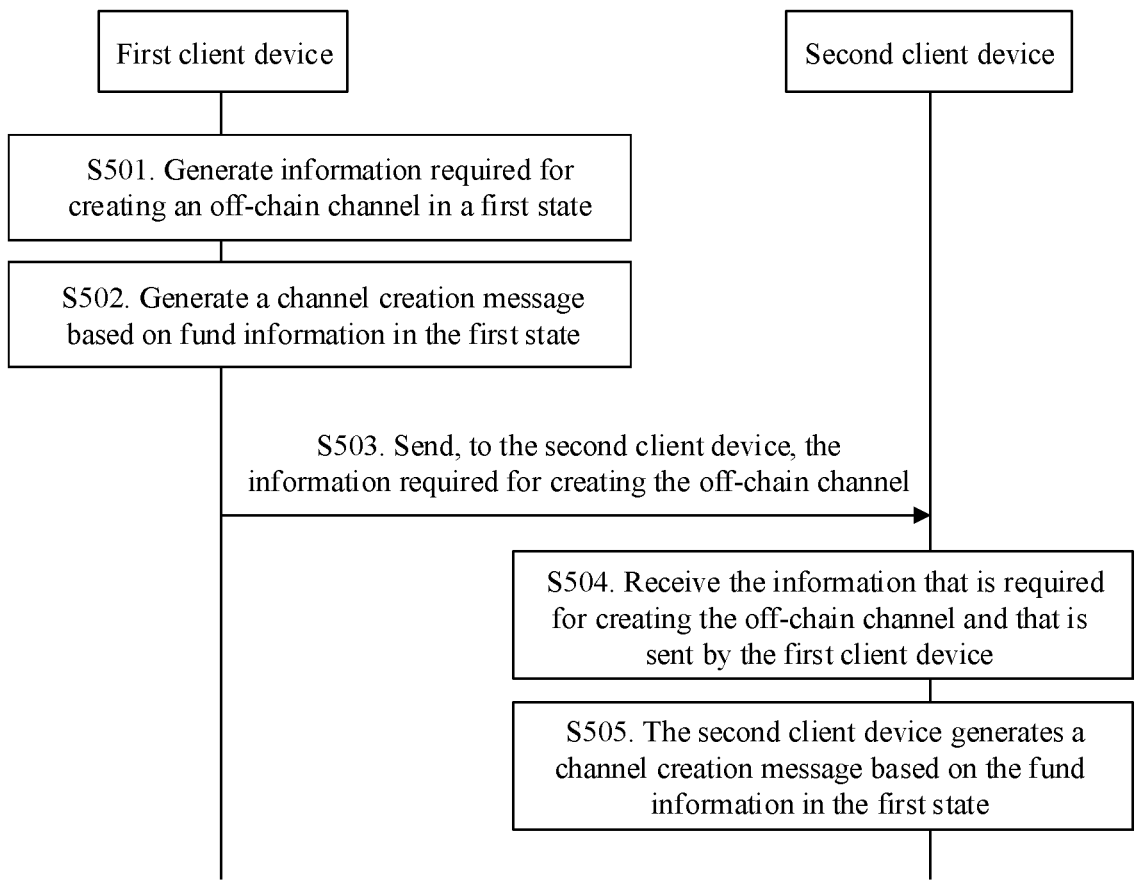
FIG. 5 is a second flowchart of a method for creating an off-chain channel in a blockchain-based data processing method according to an embodiment of this application.

Based on the blockchain-based data processing method shown in FIG. 3, the embodiments of this application may further provide a blockchain-based data processing method. By using examples, the embodiments may describe a process of creating an off-chain channel in the foregoing method. FIG. 5 is a second flowchart of a method for creating an off-chain channel in a blockchain-based data processing method according to an embodiment of this application. As shown in FIG. 5, the method may be performed when S401 is performed: the first client device and the second client device create the off-chain channel in the first state. The method may include the following steps.

S501. A first client device generates information required for creating an off-chain channel in a first state.

Optionally, the information required for creating the off-chain channel includes fund information in the first state, a time lock (timelock, TL), and a first hash lock in the first state.

The fund information in the first state may include fund information of the first client device in the first state, and fund information of a second client device in the first state. Alternatively, the fund information in the first state may include a ratio of a fund quota of the first client device in the first state to a fund quota of the second client device in the first state. Certainly, the fund information in the first state may include another fund representation form of the first client device and the second client device in the first state.

For example, the first client device may be represented as Alice, the second client device may be represented as Bob, the first state may be represented as $\beta 0$, a fund quota of the first client device in the first state may be represented as a0, and a fund quota of the second client device in the first state may be represented as b0. In this case, the fund information in the first state may include a0 and b0.

The first hash lock in the first state is a hash lock of the first client device in the first state. The first hash lock in the first state may be represented as hashlockA0.

Because the first client device and the second client device may perform transaction on the off-chain channel for a plurality of times, to specify a transaction corresponding to the created off-chain channel, the information that is required for creating the off-chain channel and that is generated by the first client device may further include a transaction index.

S502. The first client device generates a channel creation message based on the fund information in the first state.

The first client device generates the channel creation message (CreatTx) based on the fund information in the first state.

S503. The first client device sends, to the second client device, the information required for creating the off-chain channel.

The information required for creating the off-chain channel is used by the second client device to generate the channel creation message M_Create based on the fund information in the first state. The channel creation message may include a preset character string "CreatTx" and the fund information in the first state, to indicate that a message type is a channel creation message. The fund information in the first state may include, for example, the fund quota a0 of the first client device in the first state and the fund quota b0 of the second client device in the first state.

The channel creation message may further include a preset channel identifier such as a character string "channel1" to indicate the off-chain channel. The channel creation message M_Create may be represented as Msg("CreatTx", channel1, a0, b0).

S504. The second client device receives the information that is required for creating the off-chain channel and that is sent by the first client device.

S505. The second client device generates a channel creation message based on the fund information in the first state.

Specific implementation of S505 may be similar to that of S502. Reference may be made to the foregoing.

It should be noted that S505 and S502 may be simultaneously performed or may be sequentially performed. This is not limited in this embodiment of this application.

Because the first client device and the second client device respectively generate the channel creation messages based on the information required for creating the off-chain channel, the channel creation messages may be a common channel creation message generated by the first client device and the second client device.

Figure 6:
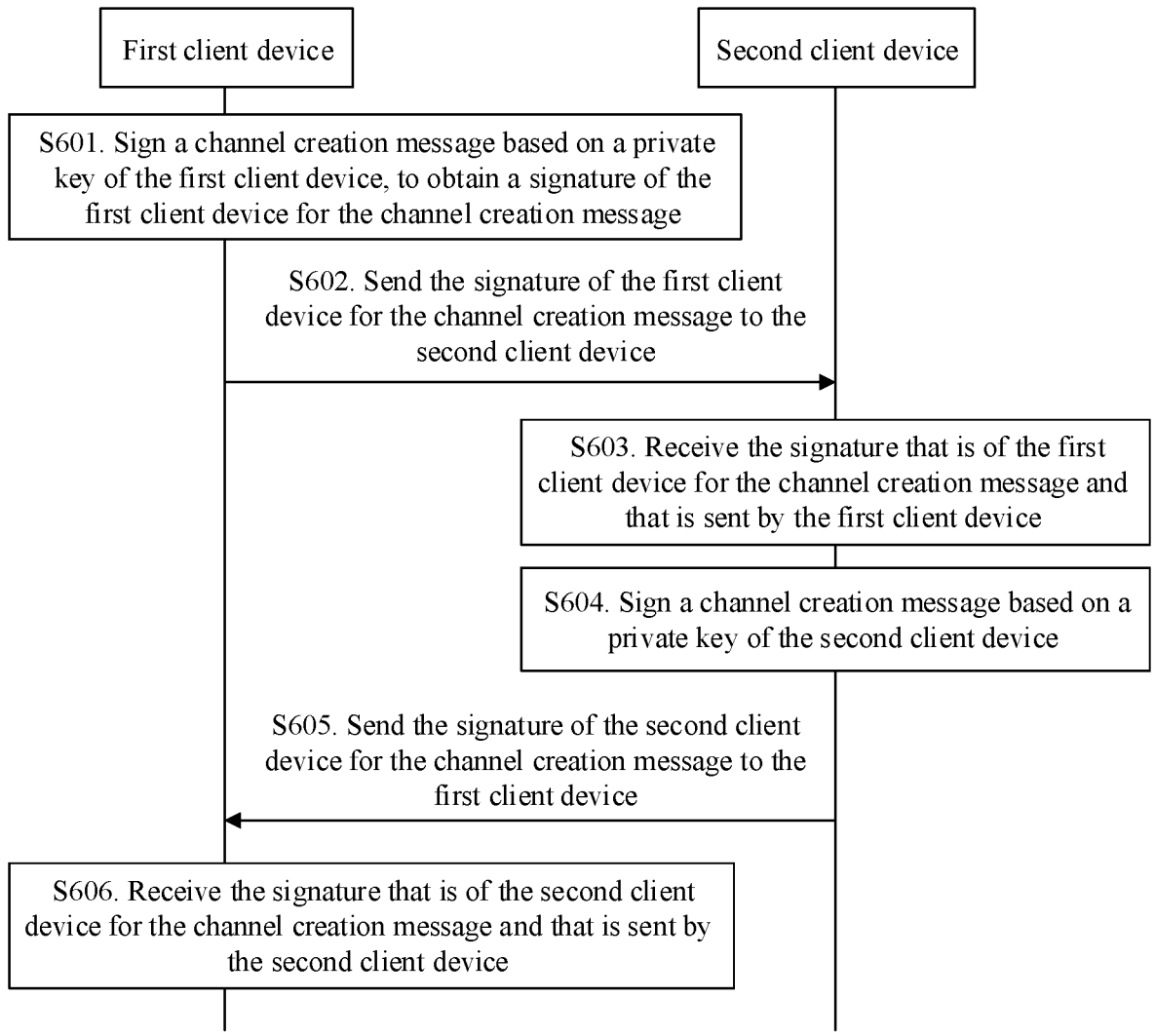
FIG. 6 is a third flowchart of a method for creating an off-chain channel in a blockchain-based data processing method according to an embodiment of this application.

Optionally, based on the blockchain-based data processing method shown in FIG. 5, the embodiments of this application may further provide a blockchain-based data processing method. FIG. 6 is a third flowchart of a method for creating an off-chain channel in a blockchain-based data processing method according to an embodiment of this application. As shown in FIG. 6, the method may be performed when S401 is performed: the first client device and the second client device create the off-chain channel in the first state. The method may further include the following steps.

S601. A first client device signs a channel creation message based on a private key of the first client device, to obtain a signature of the first client device for the channel creation message.

The first client device may sign the channel creation message based on the private key of the first client device. The signature of the first client device for the channel creation message may be represented as SigA.

The signature SigA of the first client device for the channel creation message may be represented as Sign(SKA, (H_Create, Counter). Herein, SKA is the private key of the first client device; H_Create is a hash value of the channel creation message; and Counter is a preset count value.

When the first client device performs S502 to generate the channel creation message, the first client device may perform S506 to obtain the signature of the first client device for the channel creation message.

S602. The first client device sends the signature of the first client device for the channel creation message to the second client device.

After obtaining the signature of the first client device for the channel creation message, the first client device may send the signature to the second client device, and the second client device saves the signature of the first client device for the channel creation message.

S603. The second client device receives the signature that is of the first client device for the channel creation message and that is sent by the first client device.

The second client device may save the signature of the first client device for the channel creation message after receiving the signature of the first client device for the channel creation message.

S604. The second client device signs a channel creation message based on a private key of the second client device.

When the second client device performs S505 to generate the channel creation message, the second client device may sign, based on the private key of the second client device, the channel creation message generated by the second client device, to obtain a signature of the second client device for the channel creation message. The signature of the second client device for the channel creation message may be represented as SigB.

The signature SigB of the second client device for the channel creation message may be represented as Sign(SKB, (H_Create, Counter). Herein, SKB is the private key of the second client device; H_Create is a hash value of the channel creation message; and Counter is a preset count value.

S605. The second client device sends the signature of the second client device for the channel creation message to the first client device.

S606. The first client device receives the signature that is of the second client device for the channel creation message and that is sent by the second client device.

Steps S601 to S606 are performed. Therefore, the first client device and the second client device both have the signature of the first client device for the channel creation message and the signature of the second client device for the channel creation message.

Optionally, S401 in which the first client device and the second client device create the off-chain channel in the first state may further include the following content:

The first client device sends the signature of the first client device for the channel creation message and the signature of the second client device for the channel creation message to a blockchain node device.

When obtaining the signature of the first client device for the channel creation message and the signature of the second client device for the channel creation message, the first client device may further send the channel creation message, the signature of the first client device for the channel creation message, and the signature of the second client device for the channel creation message to the blockchain node device.

The first client device further sends the signature of the first client device for the channel creation message and the signature of the second client device for the channel creation message to the blockchain node device. Therefore, the blockchain node device can verify the signature of the first client device for the channel creation message and the signature of the second client device for the channel creation message according to a preset channel creation smart contract. If the verification succeeds, it can be ensured that a fund status of the off-chain channel on a blockchain is the first state.

In this embodiment, the first client device further sends the signature of the first client device for the channel creation message and the signature of the second client device for the channel creation message to the blockchain node device. In this way, in the process of creating the off-chain channel, the blockchain node device verifies identities of the first client device and the second client device according to the preset channel creation smart contract, thereby ensuring security of the off-chain channel and further ensuring transaction security on the off-chain channel.

Figure 7:
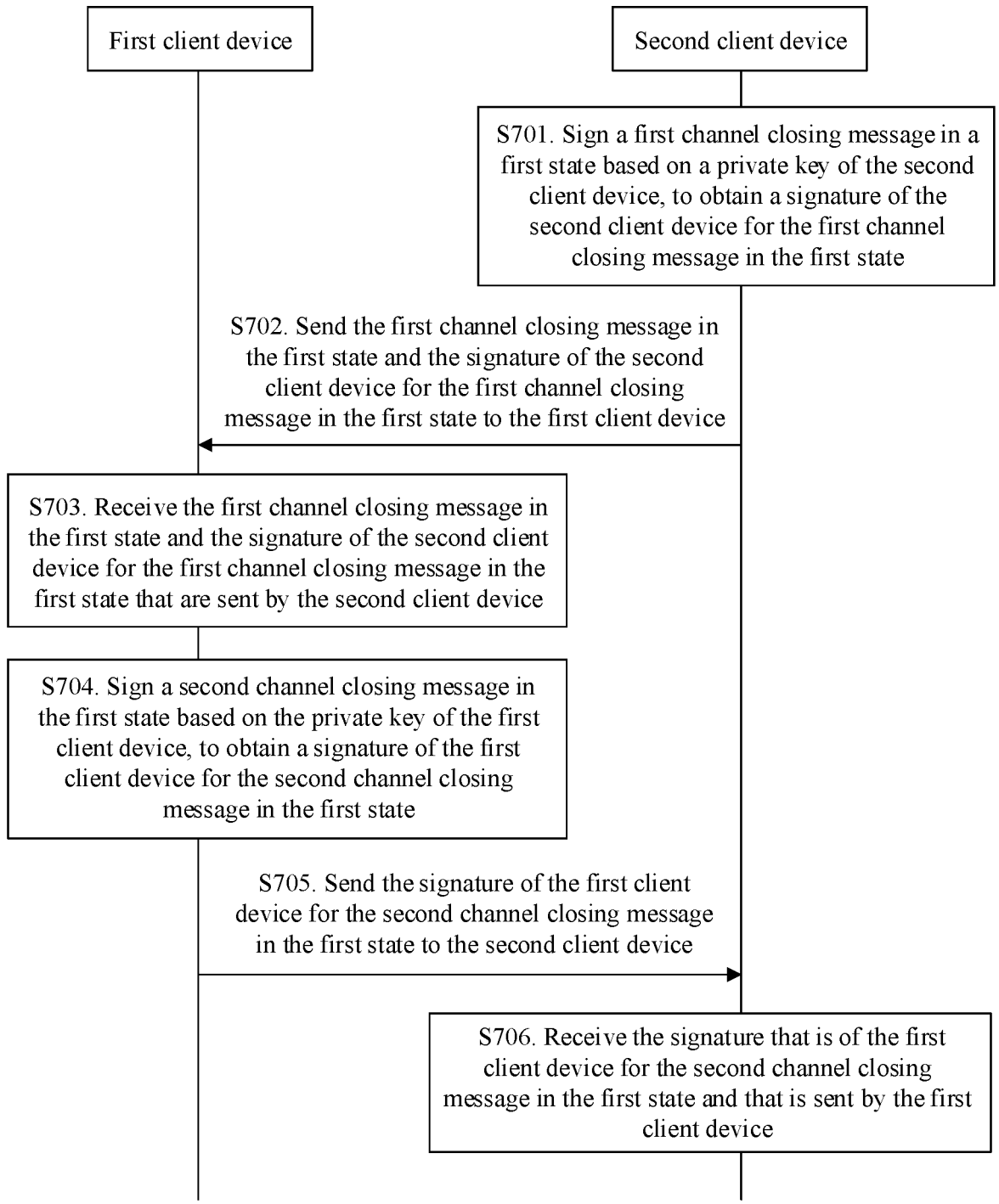
FIG. 7 is a fourth flowchart of a method for creating an off-chain channel in a blockchain-based data processing method according to an embodiment of this application.

Optionally, based on the method shown above, the embodiments of this application may further provide a blockchain-based data processing method. FIG. 7 is a fourth flowchart of a method for creating an off-chain channel in a blockchain-based data processing method according to an embodiment of this application. As shown in FIG. 7, the method may be performed when S401 is performed: the first client device and the second client device create the off-chain channel in the first state. The method may include the following steps.

S701. The second client device signs a first channel closing message in the first state based on the private key of the second client device, to obtain a signature of the second client device for the first channel closing message in the first state.

The first channel closing message in the first state includes fund information in the first state, a first hash lock in the first state, and a second hash lock in the first state. The second hash lock in the first state is a hash lock of the second client device in the first state.

After receiving information required for creating an off-chain channel, the second client device may generate the first channel closing message of the first client device in the first state based on the fund information in the first state, the first hash lock in the first state, and the second hash lock in the first state in the information required for creating the off-chain channel; and sign the first channel closing message in the first state based on the private key of the second client device, to obtain the signature of the second client device for the first channel closing message in the first state.

Optionally, the first channel closing message in the first state may further include a time lock.

The first client device is Alice, the second client device is Bob, and the signature of the second client device for the first channel closing message in the first state may be represented as SigAB0.

For example, in this embodiment, the second client device may generate the channel closing message of the first client device in the first state, for example, the first channel closing message MA_Close0 in the first state based on the time lock Timelock, the first hash lock hashlockA0 in the first state, the second hash lock hashlockB0 in the first state, a fund quota a0 of the first client device in the first state, and a fund quota b0 of the second client device in the first state; and sign the first channel closing message MA_Close0 in the first state based on the private key of the second client device, to obtain the signature SigAB0 of the second client device for the first channel closing message in the first state.

The first channel closing message MA_Close0 in the first state may include a preset character string "AliceCloseTx0" for indicating that a message type is a channel closing message; further include a preset channel message such as a character string "channel1" for indicating the off-chain channel; and further include the time lock Timelock, the hash lock hashlockA0 of the first client device in the first state, the hash lock hashlockB0 of the second client device in the first state, the fund quota a0 of the first client device in the first state, and the fund quota b0 of the second client device in the first state. The first channel closing message MA_Close0 in the first state may be represented as Msg ("AliceCloseTx0", channel1, 0, Timelock, hashlockA0, hashlockB0, a0, b0).

The signature SigAB0 of the second client device for the first channel closing message in the first state may be represented as Sign(SKB, (HA0, Counter+1)). Herein, SKB is the private key of the second client device; HA0 is a hash value of the first channel closing message MA_Close0 in the first state, and HA0 may be represented as Hash(MA_Close0); and Counter is a preset count value.

S702. The second client device sends the first channel closing message in the first state and the signature of the second client device for the first channel closing message in the first state to the first client device.

For example, the first client device may be represented as Alice, and the second client device may be represented as Bob. In this embodiment, the second client device may send the first channel closing message MA_Close0 in the first state and the signature SigAB0 of the second client device for the first channel closing message in the first state to the first client device.

It should be noted that the second client device may further generate the first channel closing message in the first state before S504 is performed.

Optionally, S401 in which the first client device and the second client device create the off-chain channel in the first state may further include the following steps.

S703. The first client device receives the first channel closing message in the first state and the signature of the second client device for the first channel closing message in the first state that are sent by the second client device.

S704. The first client device signs a second channel closing message in the first state based on the private key of the first client device, to obtain a signature of the first client device for the second channel closing message in the first state.

The second channel closing message in the first state includes the fund information in the first state, the first hash lock in the first state, and the second hash lock in the first state.

When receiving the first channel closing message that is in the first state and that is sent by the second client device, the first client device may obtain the second hash lock in the first state based on the first channel closing message in the first state; generate the second channel closing message of the second client device in the first state based on the fund information in the first state, the first hash lock in the first state, and the second hash lock in the first state; and sign the second channel closing message in the first state based on a private key of the first client device, to obtain a signature of the first client device for the second channel closing message in the first state. Optionally, the second channel closing message in the first state may further include a time lock.

The first client device is Alice, the second client device is Bob, and the signature of the first client device for the second channel closing message in the first state is SigBA0.

For example, in this embodiment, the first client device may generate the channel closing message of the second client device in the first state, for example, the second channel closing message MB_Close0 in the first state based on the time lock Timelock, the first hash lock in the first state hashlockA0, the second hash lock in the first state hashlockB0, the fund quota a0 of the first client device in the first state, and the fund quota b0 of the second client device in the first state; and sign the second channel closing message MB_Close0 in the first state based on the private key of the first client device, to obtain the signature SigBA0 of the first client device for the second channel closing message in the first state.

The second channel closing message MB_Close0 in the first state may include a preset character string "BobCloseTx0" for indicating that a message type is a channel closing message; further include a preset channel message such as a character string "channel1" for indicating the off-chain channel; and further include the time lock Timelock, the hash lock hashlockA0 of the first client device in the first state, the hash lock hashlockB0 of the second client device in the first state, the fund quota a0 of the first client device in the first state, and the fund quota b0 of the second client device in the first state. The second channel closing message MB_Close0 in the first state may be represented as Msg ("BobCloseTx0", channel1, 1, Timelock, hashlockA0, hashlockB0, a0, b0).

The signature SigBA0 of the first client device for the second channel closing message in the first state may be represented as Sign(SKA, (HB0, Counter+1)). Herein, SKA is the private key of the first client device; HB0 is a hash value of the second channel closing message MB_Close0 in the first state, and HB0 may be represented as Hash(MB_Close0); and Counter is a preset count value.

S705. The first client device sends the signature of the first client device for the second channel closing message in the first state to the second client device.

Steps S705 and S602 may be simultaneously performed. In other words, the first client device may simultaneously send the signature SigA of the first client device for the channel creation message and the signature SigBA0 of the first client device for the second channel closing message in the first state to the second client device.

In the method in this embodiment, in the process in which the first client device and the second client device create the off-chain channel, each of the first client device and the second client device exchanges, with the other client device, the signature of the client device in the first state for the channel closing message of the other client device, thereby ensuring transaction security of the two parties.

Optionally, the first client device further sends the second channel closing message of the first client device in the first state to the second client device, so that the second client device signs the signature and performs verification.

S706. The second client device receives the signature that is of the first client device for the second channel closing message in the first state and that is sent by the first client device.

Correspondingly, the second client device may further receive the second channel closing message that is in the first state and that is sent by the first client device.

Optionally, for the first client device, as shown above, S401 in which the first client device and the second client device create the off-chain channel in the first state may further include that the following content:

The first client device signs the first channel closing message of the first client device in the first state based on the private key of the first client device, to obtain the signature of the first client device for the first channel closing message in the first state.

The first channel closing message in the first state includes the fund information in the first state, the first hash lock in the first state, and the second hash lock in the first state.

The first client device may generate the first channel closing message in the first state based on the fund information in the first state, the first hash lock in the first state, and the second hash lock in the first state; and sign the first channel closing message in the first state based on the private key of the first client device, to obtain the signature of the first client device for the first channel closing message in the first state.

The first client device is Alice. The signature of the first client device for the first channel closing message in the first state is SigAA0 and may be represented as Sign(SKA, (HA0, Counter+1)). Herein, SKA is the private key of the first client device; HA0 is a hash value of the first channel closing message MA_Close0 in the first state, and HA0 may be represented as Hash(MA_Close0); and Counter is a preset count value. For detailed description of the first channel closing message MA_Close0 in the first state, refer to the description of S701. Details are not described herein again.

Optionally, for the second client device, as shown above, S401 in which the first client device and the second client device create the off-chain channel in the first state may further include the following content:

The second client device signs the second channel closing message of the second client device in the first state based on the private key of the second client device, to obtain the signature of the second client device for the second channel closing message in the first state.

The second channel closing message in the first state includes the fund information in the first state, the first hash lock in the first state, and the second hash lock in the first state.

The second client device may generate the second channel closing message in the first state based on the fund information in the first state, the first hash lock in the first state, and the second hash lock in the first state; and sign the second channel closing message in the first state based on the private key of the second client device, to obtain the signature of the second client device for the second channel closing message in the first state.

The second client device is Bob. The signature SigBB0 of the second client device for the second channel closing message in the first state may be represented as Sign(SKB, (HB0, Counter+1)). Herein, SKB is the private key of the second client device; HB0 is a hash value of the second channel closing message MB_Close0 in the first state, and HB0 may be represented as Hash(MB_Close0); and Counter is a preset count value. For detailed description of the second channel closing message MB_Close0 in the first state, refer to the description of S704. Details are not described herein again.

The first client device and the second client device create the off-chain channel in the first state. In the process of creating the off-chain channel, the first client device and the second client device separately generate a common channel creation message M_Create. In the process of creating the off-chain channel, the first channel closing message MA_Close0 of the first client device in the first state and the second channel closing message MB_Close0 of the second client device in the first state are generated for the common channel creation message M_Create. Any one of the first channel closing message MA_Close0 of the first client device and the second channel closing message MB_Close0 of the second client device is sent to a blockchain node device, so that the blockchain node device can trigger closing of the off-chain channel according to a blockchain smart contract. The first channel closing message MA_Close0 of the first client device in the first state may be triggered by the first client device, and the second channel closing message MB_Close0 of the second client device in the first state may be triggered by the second client device.

Figure 8:
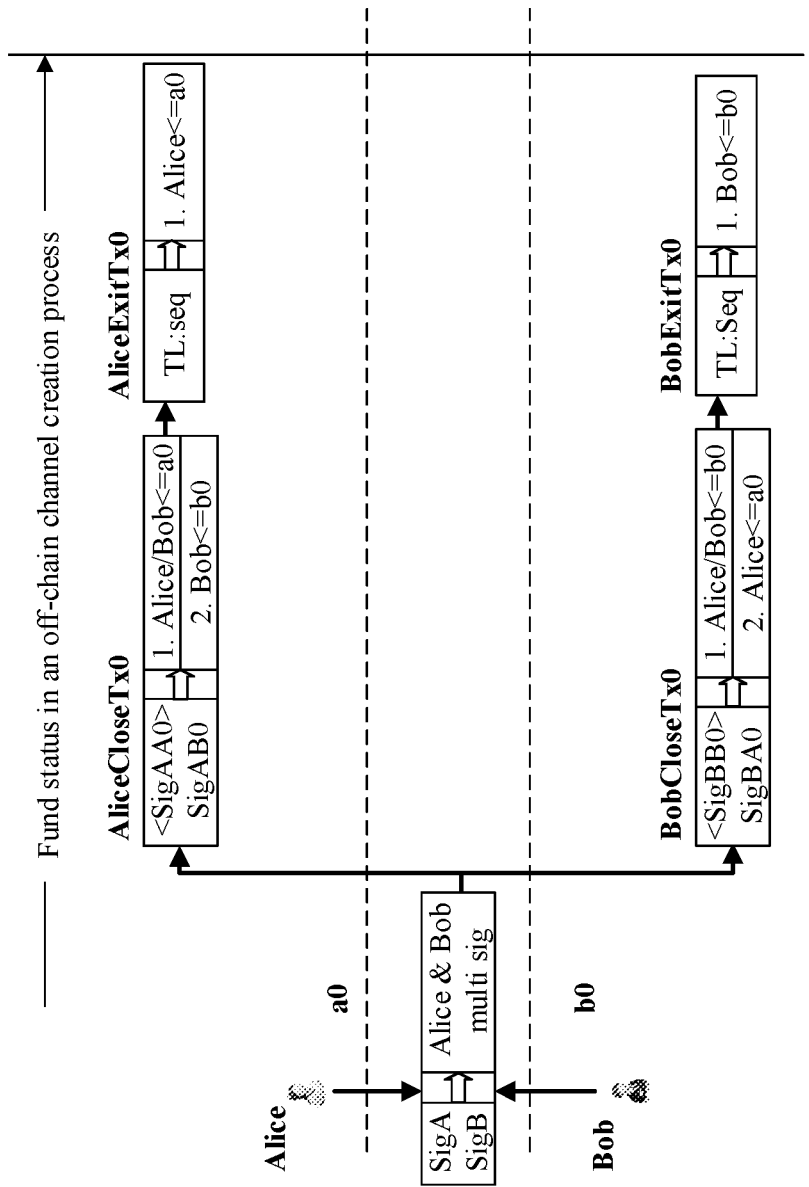
FIG. 8 is a schematic diagram of a fund status in a process in which a first client device and a second client device create an off-chain channel in a method according to an embodiment of this application.

FIG. 8 is a schematic diagram of a fund status in a process in which a first client device and a second client device create an off-chain channel in a method according to an embodiment of this application. For example, the first client device is Alice, and the second client device is Bob. In this case, the first client device may generate a channel creation message M_Create in the process of creating the off-chain channel, and sign the channel creation message M_Create based on a private key of the first client device to obtain a signature SigA of the first client device for the channel creation message. The first client device further receives a signature SigB that is of the second client device for a channel creation message and that is sent by the second client device.

The first client device further generates a signature SigAA0 of the first client device for a first channel closing message MA_Close0 in the first state, and further receives a signature SigAB0 that is of the second client device for the first channel closing message MA_Close0 in the first state and that is sent by the second client device. The second client device further generates a signature SigBB0 of the second client device for a second channel closing message MB_Close0 in the first state, and further receives a signature SigBA0 that is of the first client device for the second channel closing message MB_Close0 in the first state and that is sent by the first client device.

In this way, the first client device can have SigAA0 and SigAB0 for MA_Close0, and the second client device can have SigBB0 and SigBA0 for MB_Close0. Herein, MA_Close0 includes a character string "AliceCloseTx0", and MB_Close0 includes a character string "BobCloseTx0".

Herein, any one of MA_Close0 including "AliceCloseTx0" and MB_Close0 including "BobCloseTx0" may be triggered. Herein, MA_Close0 including "AliceCloseTx0" may be triggered by the first client device. The first client device may trigger, by using SigAA0 and SigAB0, MA_Close0 including "AliceCloseTx0". When MA_Close0 including "AliceCloseTx0" is triggered, the first client device can obtain a fund quota a0 of the first client device in the first state when a time lock (TL) is reached, and the second client device can immediately obtain a fund quota b0 of the second client device in the first state.

Herein, MB_Close0 including "BobCloseTx0" may be triggered by the second client device. The second client device may trigger, by using SigBB0 and SigBA0, MB_Close0 including "BobCloseTx0". When MB_Close0 including "BobCloseTx0" is triggered, the second client device can obtain a fund quota of the second client device in the first state, that is, a fund quota b0 of Bob in the first state when a time lock (TL) is reached, and the first client device can immediately obtain a fund quota of the first client device in the first state, that is, a fund quota a0 of Alice in the first state.

Figure 9A:
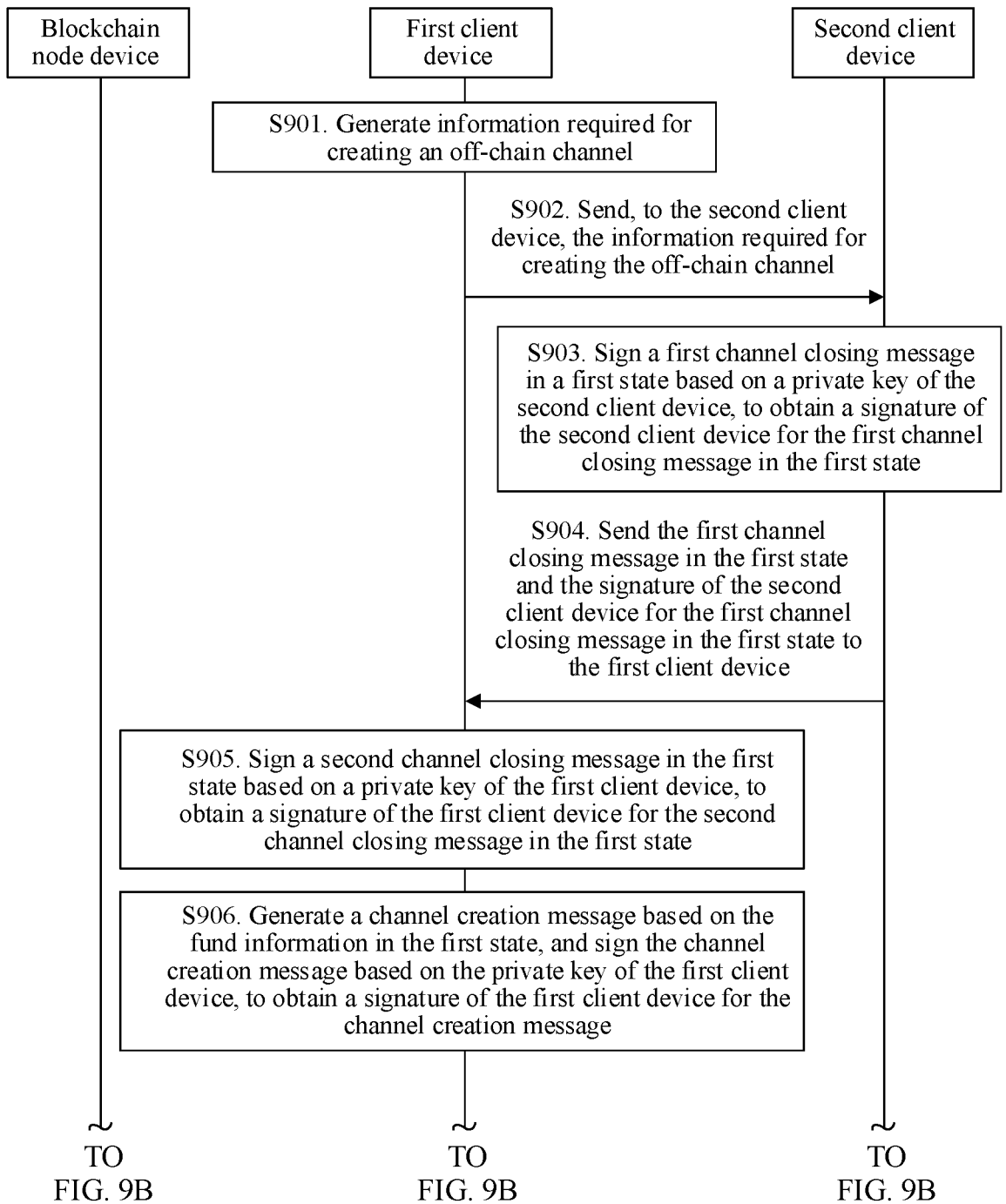
FIG. 9A and FIG. 9B are a fourth flowchart of a method for creating an off-chain channel in a blockchain-based data processing method according to an embodiment of this application.
Figure 9B:
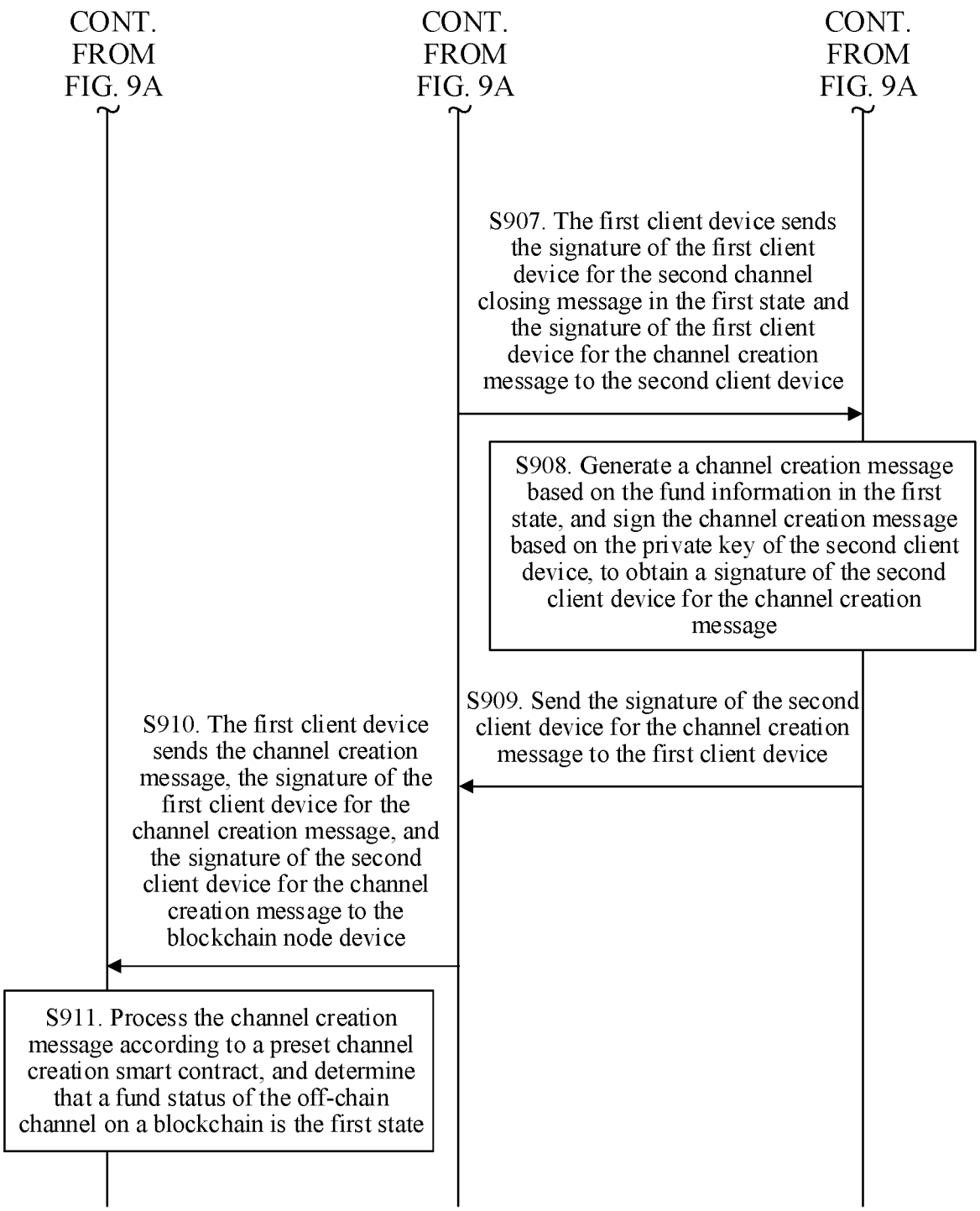

By using examples, the following describes in detail the process in which the first client device and the second client device create the off-chain channel. This embodiment is described by using an example in which the first client device is Alice and the second client device is Bob. FIG. 9A and FIG. 9B are a fourth flowchart of a method for creating an off-chain channel in a blockchain-based data processing method according to an embodiment of this application. As shown in FIG. 9A and FIG. 9B, the method may include the following steps.

S901. A first client device generates information required for creating an off-chain channel.

The information required for creating the off-chain channel includes an index, fund information in a first state, a time lock, and a first hash lock in the first state. The fund information in the first state may include a fund quota a0 of the first client device in the first state, and a fund quota b0 of the second client device in the first state. The first hash lock in the first state is a hash lock hashlockA0 of the first client device in the first state.

S902. The first client device sends, to a second client device, the information required for creating the off-chain channel.

S903. The second client device signs a first channel closing message in a first state based on a private key of the second client device, to obtain a signature of the second client device for the first channel closing message in the first state.

When receiving the information that is required for creating the off-chain channel and that is sent by the first client device, the second client device performs S903.

The first channel closing message in the first state includes the fund information in the first state, a time lock, the first hash lock in the first state, and the second hash lock in the first state. The second hash lock in the first state is a hash lock of the second client device in the first state.

The first channel closing message in the first state may be MA_Close0, and the signature of the second client device for the first channel closing message in the first state may be SigAB0.

S904. The second client device sends the first channel closing message in the first state and the signature of the second client device for the first channel closing message in the first state to the first client device.

S905. The first client device signs a second channel closing message in the first state based on a private key of the first client device, to obtain a signature of the first client device for the second channel closing message in the first state.

The second channel closing message in the first state includes the fund information in the first state, a time lock, the first hash lock in the first state, and the second hash lock in the first state.

When receiving the first channel closing message that is in the first state and that is sent by the second client device, the first client device may obtain the first hash lock in the first state; generate the second channel closing message in the first state based on the fund information in the first state, the first hash lock in the first state, and the second hash lock in the first state; continue to perform S905 to obtain the signature of the first client device for the second channel closing message in the first state.

The second channel closing message of the second client device in the first state may be MB_Close0, and the signature of the first client device for the second channel closing message in the first state may be SigBA0.

S906. The first client device generates a channel creation message based on the fund information in the first state, and signs the channel creation message based on the private key of the first client device, to obtain a signature of the first client device for the channel creation message.

The channel creation message may be M_Create, and the signature of the first client device for the channel creation message may be SigA.

The first client device further generates the first channel closing message MA_Close0 in the first state based on the fund information in the first state, the first hash lock in the first state, and the second hash lock in the first state; and signs the first channel closing message in the first state based on the private key of the first client device, to obtain the signature Sig AA0 of the first client device for the first channel closing message in the first state.

S907. The first client device sends the signature of the first client device for the second channel closing message in the first state and the signature of the first client device for the channel creation message to the second client device.

In other words, the first client device sends SigBA0 and SigA to the second client device.

S908. The second client device generates a channel creation message based on the fund information in the first state, and signs the channel creation message based on the private key of the second client device, to obtain a signature of the second client device for the channel creation message.

The signature of the second client device for the channel creation message may be SigB.

The second client device further generates the second channel closing message MB_Close0 in the first state based on the fund information in the first state, the first hash lock in the first state, and the second hash lock in the first state; and signs the second channel closing message in the first state based on the private key of the second client device, to obtain the signature SigBB0 of the second client device for the second channel closing message in the first state.

S909. The second client device sends the signature of the second client device for the channel creation message to the first client device.

In other words, the second client device sends SigB to the first client device.

S910. The first client device sends the channel creation message, the signature of the first client device for the channel creation message, and the signature of the second client device for the channel creation message to a blockchain node device.

The first client device may send the channel creation message M_Create, the signature SigA of the first client device for the channel creation message, and the signature SigB of the second client device for the channel creation message to the blockchain node device.

S911. The blockchain node device processes the channel creation message according to a preset channel creation smart contract, and determines that a fund status of the off-chain channel on a blockchain is the first state.

In the method provided in this embodiment, in the process of creating the off-chain channel, the blockchain node device may verify identities of the first client device and the second client device according to the preset channel creation smart contract, thereby ensuring security of the off-chain channel and further ensuring transaction security on the off-chain channel. In addition, in the process of creating the off-chain channel, each of the first client device and the second client device exchanges, with the other client device, the signature of the client device in the first state for the channel closing message of the other client device, thereby ensuring transaction security of the two parties.

In addition, in the method, in the process of creating the off-chain channel, signatures of only three transactions are required for each client device, for example, the signature SigAA0 of the first client device for the first channel closing message in the first state, the signature SigAB0 of the first client device for the second channel closing message in the first state, and the signature SigA of the first client device for the channel creation message. In the method, only few signatures are required for client devices of two transaction parities, thereby reducing a calculation amount of the client devices. In addition, a large quantity of private keys do not need to be generated and stored, thereby reducing storage costs of the client devices.

Based on the blockchain-based data processing method, the embodiments of this application may further provide a blockchain-based data processing method. By using examples, the embodiments may describe a transaction process on an off-chain channel in the foregoing method. Optionally, based on the foregoing method shown above, the method may further include:

signing, by the first client device, a second channel closing message in a second state based on the private key of the first client device, to obtain a signature of the first client device for the second channel closing message in the second state.

The second channel closing message in the second state includes fund information in the second state, a first hash lock in the second state, and a second hash lock in the second state.

The first client device may generate the second channel closing message in the second state based on the fund information in the second state, the first hash lock in the second state, and the second hash lock in the second state; and sign the second channel closing message in the second state based on the private key of the first client device, to obtain the signature of the first client device for the second channel closing message in the second state.

The first client device is Alice. The signature of the first client device for the second channel closing message in the second state is SigAA1 and may be represented as Sign (SKA, (HA1, Counter+1)). Herein, SKA is the private key of the first client device; HA1 is a hash value of the second channel closing message MA_Close1 in the second state, and HA1 may be represented as Hash(MA_Close1); and Counter is a preset count value. For detailed description of the second channel closing message MA_Close1 in the second state, refer to the description of S304. Details are not described herein again.

Based on the foregoing method shown above, the method may further include:

signing, by the second client device, a third channel closing message in the second state based on the private key of the second client device, to obtain a signature of the first client device for the third channel closing message in the second state.

The third channel closing message in the second state includes the fund information in the second state, the first hash lock in the second state, and the second hash lock in the second state.

The second client device may generate the third channel closing message in the second state based on the fund information in the second state, the first hash lock in the second state, and the second hash lock in the second state; and sign the third channel closing message in the second state based on the private key of the second client device, to obtain the signature of the second client device for the third channel closing message in the second state.

The second client device is Bob. The signature for the third channel closing message in the second state is SigBB1 and may be represented as Sign(SKB, (HB1, Counter+1)). Herein, SKB is the private key of the second client device; HB1 is a hash value of the third channel closing message MB_Close1 in the second state, and HB1 may be represented as Hash(MB_Close1); and Counter is a preset count value. For detailed description of the third channel closing message MB_Close1 in the second state, refer to the description of S307. Details are not described herein again.

Figure 10:
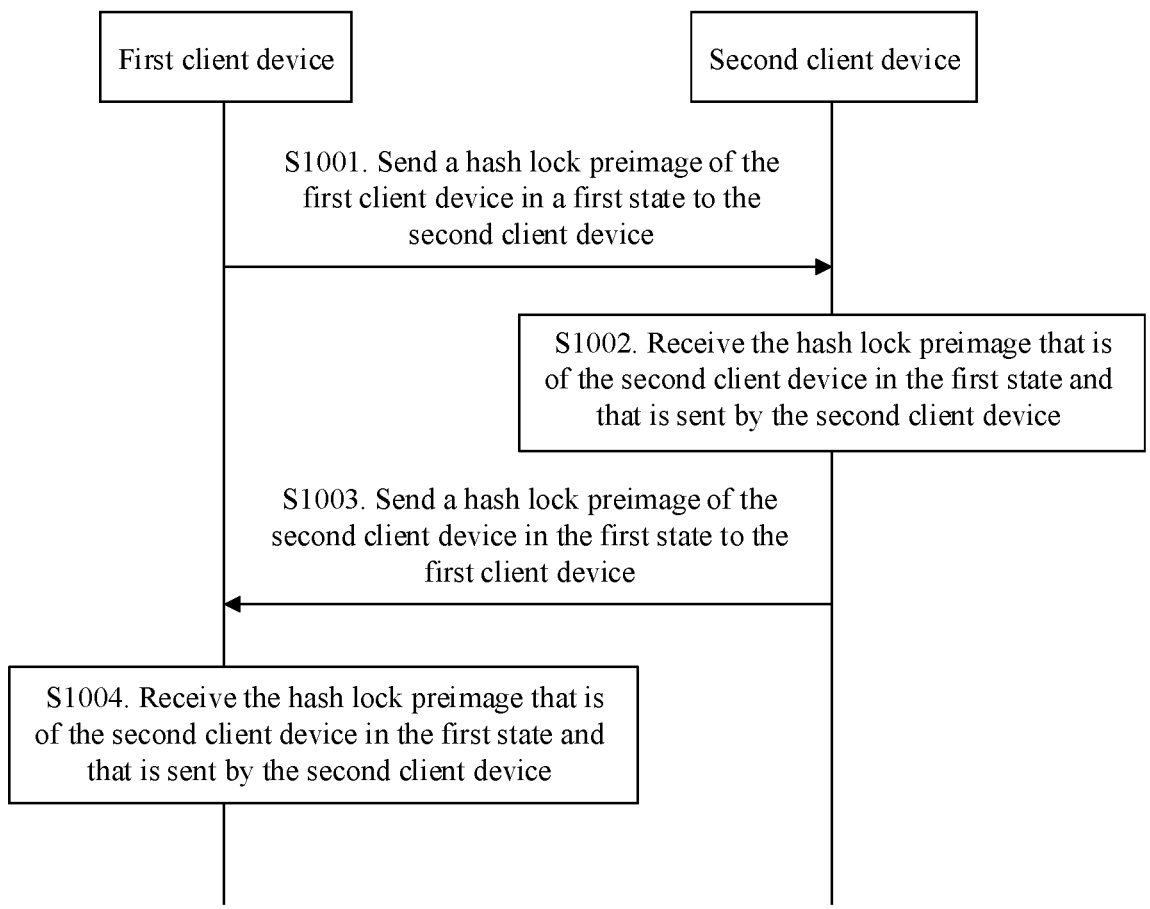
FIG. 10 is a first flowchart of a method for performing transaction on an off-chain channel in a blockchain-based data processing method according to an embodiment of this application.

Based on the method shown above, the embodiments of this application may further provide a blockchain-based data processing method. FIG. 10 is a first flowchart of a method for performing transaction on an off-chain channel in a blockchain-based data processing method according to an embodiment of this application. As shown in FIG. 10, the blockchain-based data processing method may further include the following steps.

S1001. The first client device sends a hash lock preimage of the first client device in the first state to the second client device.

The first client device sends the hash lock preimage of the first client device in the first state to the second client device, to indicate that the first client device has abandoned the first state.

S1002. The second client device receives the hash lock preimage that is of the first client device in the first state and that is sent by the first client device.

The second client device may save the hash lock preimage of the first client device in the first state after receiving the hash lock preimage of the first client device in the first state.

When the first client device sends a first channel closing message in the first state to a blockchain node device, the second client device may use the hash lock preimage of the first client in the first state as evidence and send the hash lock preimage to the blockchain node device; and trigger an incentive transaction of the second client device within a time lock, so that the second client device obtains a fund quota of the first client device in the first state, thereby punishing the first client device.

S1003. The second client device sends a hash lock preimage of the second client device in the first state to the first client device.

The second client device sends the hash lock preimage of the second client device in the first state to the first client device, to indicate that the second client device also has abandoned the first state.

S1004. The first client device receives the hash lock preimage that is of the second client device in the first state and that is sent by the second client device.

The first client device may save the hash lock preimage of the second client device in the first state after receiving the hash lock preimage of the second client device in the first state.

When the second client device sends a second channel closing message in the first state to a blockchain node device, the first client device may use the hash lock preimage of the second client in the first state as evidence and send the hash lock preimage to the blockchain node device; and trigger an incentive transaction of the first client device within a time lock, so that the first client device obtains a fund quota of the second client device in the first state, thereby punishing the second client device.

In the method provided in this embodiment, in a process in which the first client device and the second client device perform transaction on the off-chain channel, each of the first client device and the second client device exchanges the hash lock preimage of the client device in an old state with the other client device, to indicate that the old state is abandoned. Once one party sends the channel closing message in the old state, to punish the initiator of the channel closing message of the old state, a fund quota of the initiator in the first state is transferred to a fund address of the other party on the blockchain. In this way, the two parties can initiate the channel closing messages in a new state as much as possible, which avoids abnormal exit and ensures transaction security of the two parties. Therefore, in the method, a large-scale transaction processing capability can be effectively improved while transaction security is ensured.

Figure 11A:
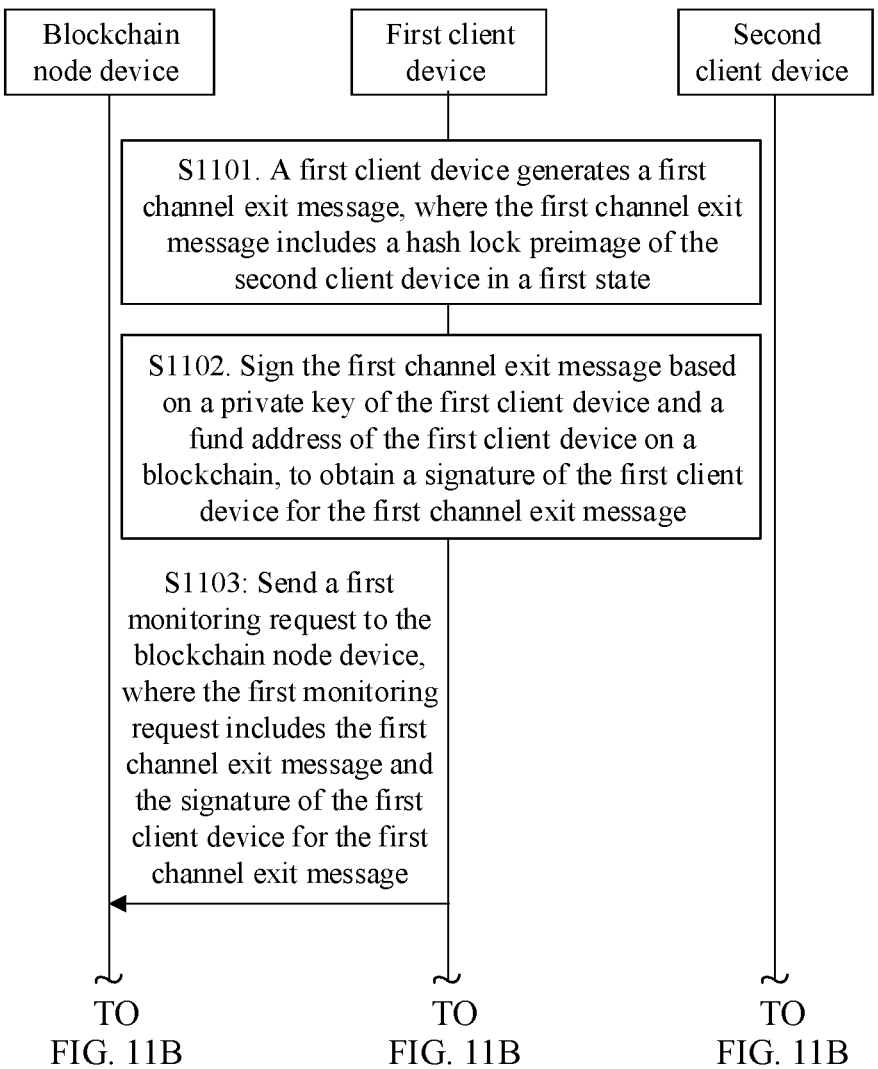
FIG. 11A and FIG. 11B are a second flowchart of a method for performing transaction on an off-chain channel in a blockchain-based data processing method according to an embodiment of this application.
Figure 11B:
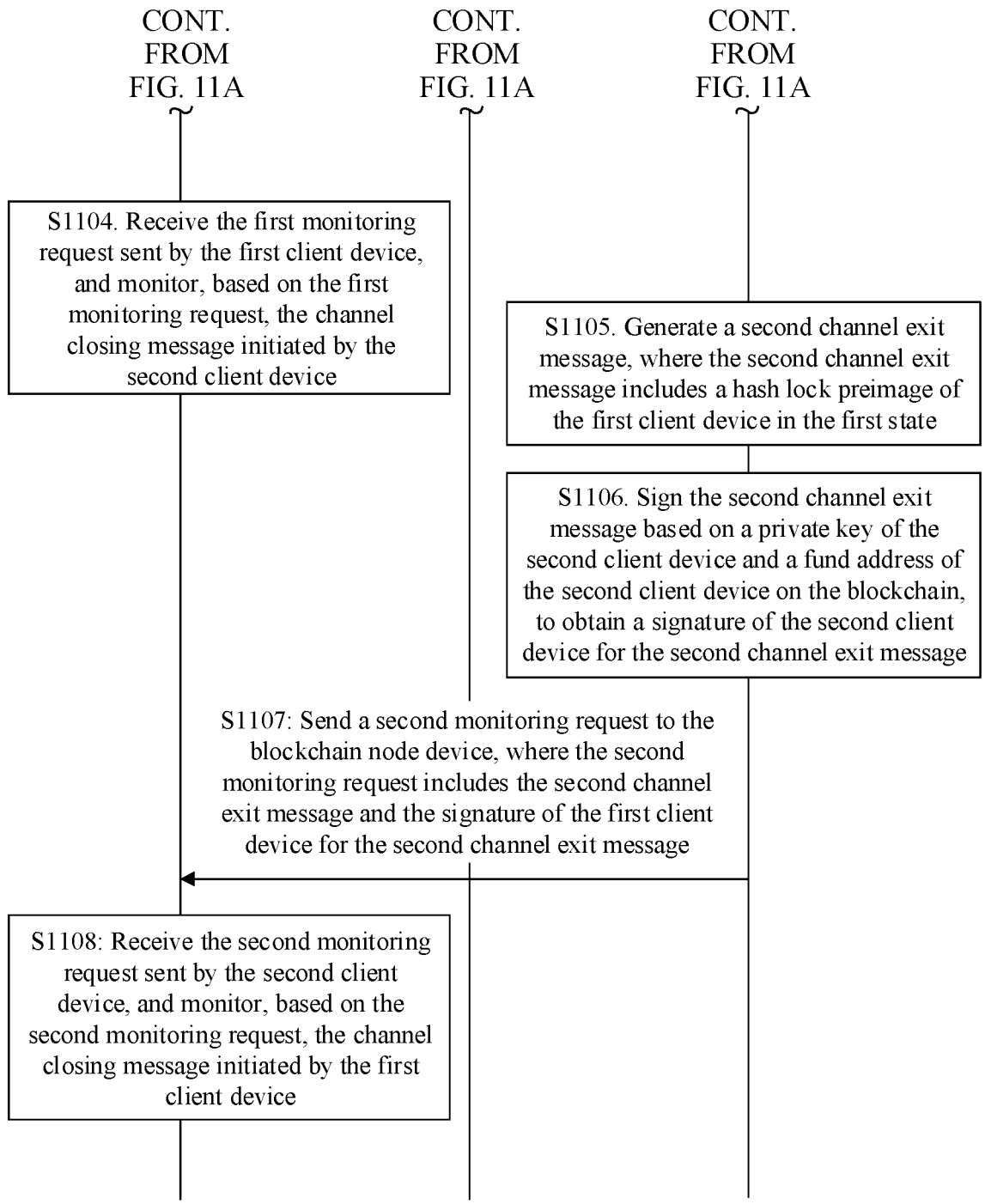

Based on the method shown above, the embodiments of this application may further provide a blockchain-based data processing method. FIG. 11A and FIG. 11B are a second flowchart of a method for performing transaction on an off-chain channel in a blockchain-based data processing method according to an embodiment of this application. As shown in FIG. 11A and FIG. 11B, the blockchain-based data processing method may further include the following steps.

S1101. The first client device generates a first channel exit message, where the first channel exit message includes a hash lock preimage of the second client device in the first state.

The first client device performs S1101 to generate the channel exit message of the first client device, that is, the first channel exit message. The first channel exit message is MA_Moniter and may be represented as Msg("Exit", channel1, 0, RB).

The first channel exit message includes a preset exit character string "Exit", a preset channel identifier channel1, an identifier 0 of the first channel exit message, and the hash lock primitive RB of the second client device in the first state. The preset channel identifier channel1 is used to indicate the off-chain channel, and the identifier 0 of the first channel exit message is used to indicate that the first channel exit message is a message generated by the first client device.

S1102. The first client device signs the first channel exit message based on the private key of the first client device and a fund address of the first client device on the blockchain, to obtain a signature of the first client device for the first channel exit message.

The first client device performs S1102 to obtain the signature of the first client device for the first channel exit message. The signature of the first client device for the first channel exit message is SigMAM and may be represented as Sig(SKA, Hash(MA_Moniter), addrA, counter+1). Herein, SKA is the private key of the first client device; Hash (MA_Moniter) is a hash value of the first channel exit message; addrA is the fund address of the first client device on the blockchain; and counter is a preset count value.

S1103. The first client device sends a first monitoring request to the blockchain node device, where the first monitoring request includes the first channel exit message and the signature of the first client device for the first channel exit message.

The first monitoring request is used by the blockchain node device to monitor a channel closing message initiated by the second client device.

The first client device and the second client device may perform transaction on the off-chain channel. After the fund status is switched from the first state to the second state, the first client device sends the first monitoring request to the blockchain node.

Herein, the blockchain node device may be a miner node device, an agent miner node device, or a monitoring device that can access or be connected to the blockchain. The first client device sends the first monitoring request to the blockchain node device, to register a monitoring service. Therefore, the blockchain node device monitors, based on the monitoring service registered by the first client device, the channel closing message initiated by the second client device.

The method may further include the following steps.

S1104. The blockchain node device receives the first monitoring request sent by the first client device, and monitors, based on the first monitoring request, the channel closing message initiated by the second client device.

Optionally, to ensure transaction fairness, the second client device may also register a monitoring service to monitor a channel closing message initiated by the first client device. The method may include the following steps.

S1105. The second client device generates a second channel exit message, where the second channel exit message includes a hash lock preimage of the first client device in the first state.

The second client device performs S1105 to generate the channel exit message of the second client device, that is, the second channel exit message. The second channel exit message is MB_Moniter and may be represented as Msg ("Exit", channel1, 1, RA).

The second channel exit message includes a preset exit character string "Exit", a preset channel identifier channel1, an identifier 1 of the second channel exit message, and the hash lock primitive RA of the first client device in the first state. The preset channel identifier channel1 is used to indicate the off-chain channel, and the identifier 1 of the second channel exit message is used to indicate that the second channel exit message is a message generated by the second client device.

S1106. The second client device signs the second channel exit message based on the private key of the second client device and a fund address of the second client device on the blockchain, to obtain a signature of the second client device for the second channel exit message.

The second client device performs S1106 to obtain the signature of the second client device for the second channel exit message. The signature of the second client device for the second channel exit message is SigMAM and may be represented as Sig(SKB, Hash(MB_Moniter), addrB, counter+1). Herein, SKB is the private key of the second client device; Hash(MB_Moniter) is a hash value of the second channel exit message; addrB is the fund address of the second client device on the blockchain; and counter is a preset count value.

S1107. The second client device sends a second monitoring request to the blockchain node device, where the second monitoring request includes the second channel exit message and the signature of the first client device for the second channel exit message.

The first client device and the second client device may perform transaction on the off-chain channel. After the fund status is switched from the first state to the second state, the first client device sends the first monitoring request to the blockchain node.

The second monitoring request is used by the blockchain node device to monitor a channel closing message initiated by the first client device.

Herein, the blockchain node device may be a miner node device, an agent miner node device, or a monitoring device that can access or be connected to the blockchain. The second client device sends the second monitoring request to the blockchain node device, to register a monitoring service. Therefore, the blockchain node device monitors, based on the monitoring service registered by the first client device, the channel closing message initiated by the second client device.

S1108. The blockchain node device receives the second monitoring request sent by the second client device, and monitors, based on the second monitoring request, the channel closing message initiated by the first client device.

In the method provided in this embodiment, each of the first client device and the second client device may send the monitoring request to the blockchain node device, to monitor a channel closing message initiated by the other client device, thereby ensuring transaction security on the off-chain channel.

In any foregoing method, the client devices of the two parties that perform transaction on the off-chain channel may initiate the channel closing messages in the first state, and may also initiate the channel closing messages in the second state. The two parties may initiate the fast channel closing message after negotiation. For channel closing messages initiated in different scenarios, different smart contracts may be deployed on the blockchain node device to process the channel closing messages initiated in different scenarios. An example in which the first client device initiates channel closing messages in various scenarios is used for description in the following. Specific implementation of initiating a channel closing message by the second client device is similar to specific implementation of initiating a channel closing message by the first client device. Details are not described herein.

Figure 12:
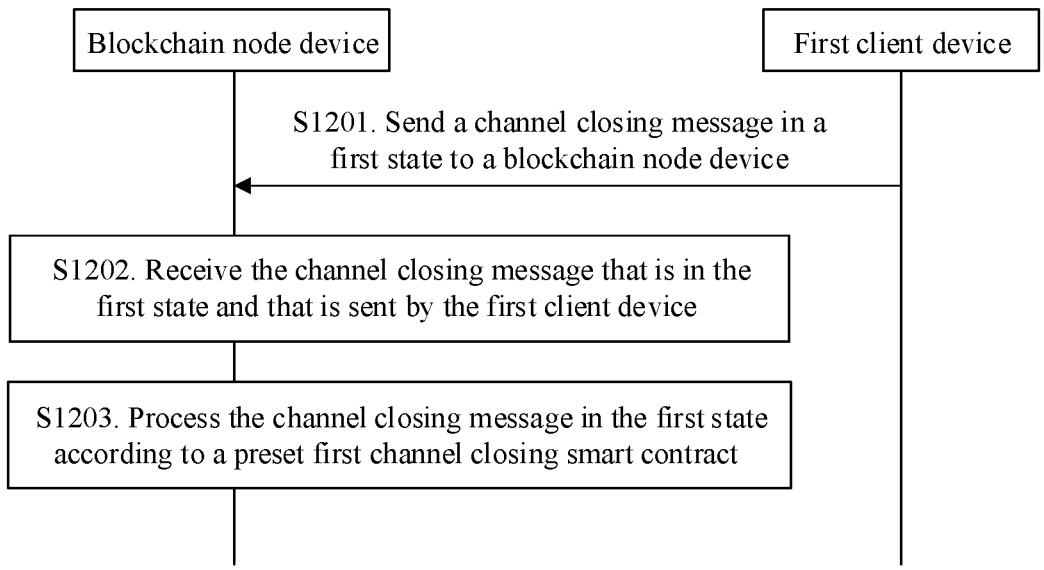
FIG. 12 is a first flowchart of a method in which a first client device sends a channel closing message in a first state in a blockchain-based data processing method according to an embodiment of this application.

FIG. 12 is a first flowchart of a method in which a first client device sends a channel closing message in a first state in a blockchain-based data processing method according to an embodiment of this application. As shown in FIG. 12, the method may include the following steps.

S1201. A first client device sends a channel closing message in a first state to a blockchain node device.

The first client device may send the channel closing message in the first state, that is, the first channel closing message in the first state to the blockchain node device. When sending the channel closing message in the first state, the first client device further sends, to the blockchain node device, a signature of the first client device for the channel closing message in the first state and a signature that is of the second client device for a channel closing message in the first state and that is received by the first client device.

The channel closing message that is in the first state and that is sent by the first client device is MA_Close0 and may include a character string "AliceCloseTx0". The signature of the first client device for the channel closing message in the first state is SigAA0, and the signature that is of the second client device for the channel closing message in the first state and that is received by the first client device is SigAB0.

S1202. The blockchain node device receives the channel closing message that is in the first state and that is sent by the first client device.

S1203. The blockchain node device processes the channel closing message in the first state according to a preset first channel closing smart contract.

The first channel closing smart contract may be a preset smart contract for closing a channel in an old state. After receiving the channel closing message that is in the first state and that is sent by the first client device, the blockchain node device may verify the signature of the first client device for the channel closing message in the first state and the signature of the second client device for the channel closing message in the first state; and if the verification succeeds, process the channel closing message in the first state according to the first channel closing smart contract, to perform fund allocation.

After the blockchain node device processes the channel closing message in the first state according to the preset first channel closing smart contract, an off-chain channel may be closed.

After the fund allocation, the blockchain node device may further update a ledger of the blockchain. After updating the ledger of the blockchain, the blockchain node device may further synchronize an update result to another blockchain node device.

In this embodiment, the blockchain node device may process the channel closing message that is in the first state and that is sent by the first client device, to perform fund allocation, thereby ensuring transaction security in a scenario in which the first client device exits the first state.

Figure 13:
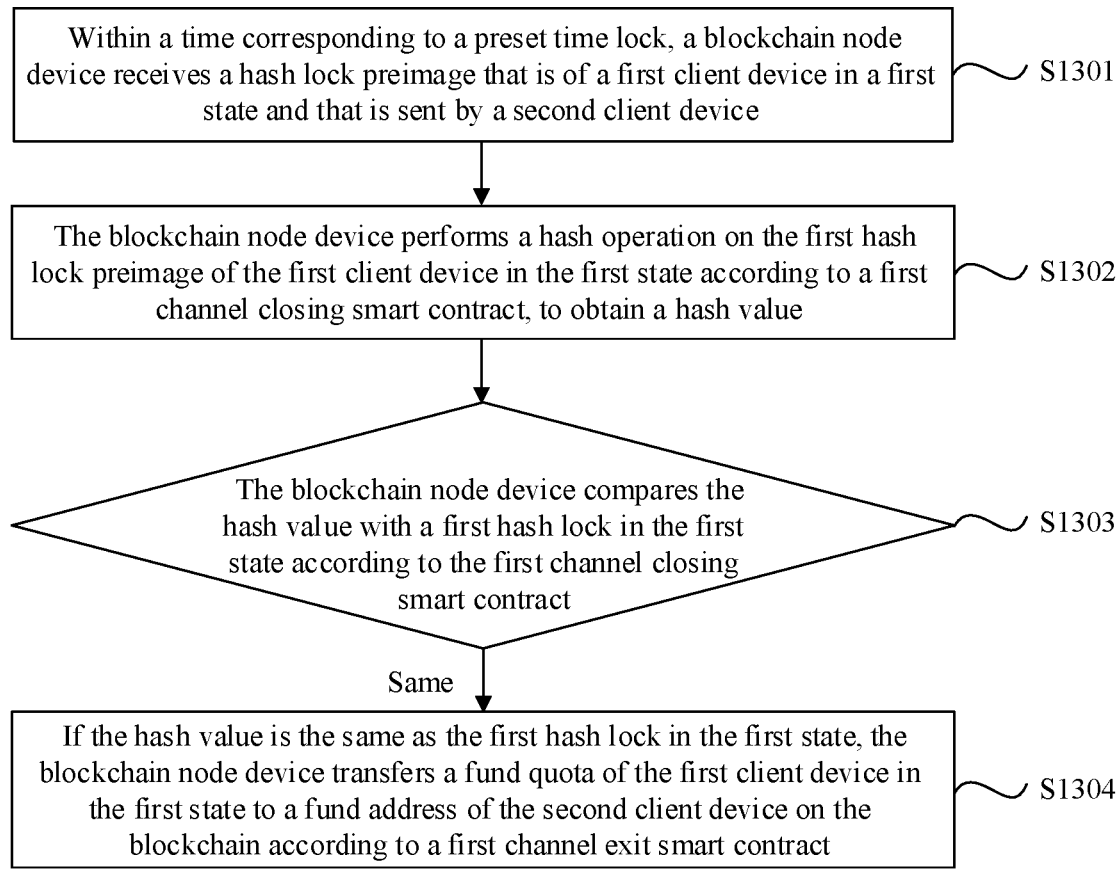
FIG. 13 is a second flowchart of a method in which a first client device sends a channel closing message in a first state in a blockchain-based data processing method according to an embodiment of this application.

Based on FIG. 12, for the channel closing message that is in the first state and that is initiated by the first client device, the embodiments of this application may further provide a blockchain-based data processing method. FIG. 13 is a second flowchart of a method in which a first client device sends a channel closing message in a first state in a blockchain-based data processing method according to an embodiment of this application. As shown in FIG. 13, S1203 in the foregoing method in which the blockchain node device processes the channel closing message in the first state according to the preset first channel exit smart contract may include the following steps.

S1301. Within a time corresponding to a preset time lock, the blockchain node device receives a hash lock preimage that is of the first client device in the first state and that is sent by the second client device.

S1302. The blockchain node device performs a hash operation on the first hash lock preimage of the first client device in the first state according to a first channel closing smart contract, to obtain a hash value.

S1303. The blockchain node device compares the hash value with a first hash lock in the first state according to the first channel closing smart contract.

S1304. If the hash value is the same as the first hash lock in the first state, the blockchain node device transfers a fund quota of the first client device in the first state to a fund address of the second client device on the blockchain according to the first channel exit smart contract.

If the hash value is the same as the first hash lock in the first state, that is, verification for the hash lock preimage in the first state succeeds, it may be determined that the hash lock preimage that is in the first state and that is sent by the second client device is a preimage of the first hash lock in the first state. Otherwise, if the hash value is different from the first hash lock in the first state, that is, verification for the hash lock preimage in the first state fails, it may be determined that the hash lock preimage that is in the first state and that is sent by the second client device is not the hash lock preimage of the first client device in the first state. In this case, a fund quota of the first client device in the first state may be transferred to a fund address of the first client device on the blockchain.

If the first client device sends the channel closing message in the first state, the blockchain node device may transfer a fund quota of the second client device in the first state to a fund address of the second client device on the blockchain once the blockchain node device receives the channel closing message in the first state. If the blockchain node device has received, within the time corresponding to the preset time lock, the hash lock preimage that is of the first client device in the first state and that is sent by the second client device and the verification succeeds, the blockchain node device may transfer the fund quota of the first client device in the first state to the fund address of the second client device on the blockchain.

The blockchain node device transfers the fund quota of the first client device in the first state to the fund address of the second client device on the blockchain according to the first channel exit smart contract. Then, the off-chain channel can be closed.

In the method provided in this embodiment, when the first client device sends the channel closing message in an old state, the blockchain node device transfers the fund quota of the first client device in the first state to the fund address of the second client device on the blockchain after verification for the hash lock preimage that is in the old state and that is sent by the second client device succeeds, thereby punishing the first client device for abnormal exit. In this way, transaction security is ensured.

Based on FIG. 12, for the channel closing message that is in the first state and that is initiated by the first client device, the embodiments of this application may further provide a blockchain-based data processing method. Optionally, S1203 in the foregoing method in which the blockchain node device processes the channel closing message in the first state according to the preset first channel exit smart contract may include the following content:

If the blockchain node has not received, within the time corresponding to the preset time lock, the first hash lock preimage that is of the first client device in the first state and that is sent by the second client device, the blockchain node device transfers the fund quota of the first client device in the first state to the fund address of the first client device on the blockchain according to the first channel exit smart contract.

In this embodiment, if the first client device sends the channel closing message in the first state, the blockchain node device may transfer the fund quota of the second client device in the first state to the fund address of the second client device on the blockchain once the blockchain node device receives the channel closing message in the first state. If the blockchain node device has not received, within the time corresponding to the preset time lock, the hash lock preimage that is of the first client device in the first state and that is sent by the second client device, the blockchain node device may transfer the fund quota of the first client device in the first state to the fund address of the first client device on the blockchain.

In the method provided in this embodiment, when the first client device sends the channel closing message in the old state but the second client device cannot submit the hash lock preimage of the first client device in the old state, the blockchain node device transfers the fund quota of the first client device in the first state to the fund address of the first client device on the blockchain, to ensure that the transaction is normally performed.

Figure 14:
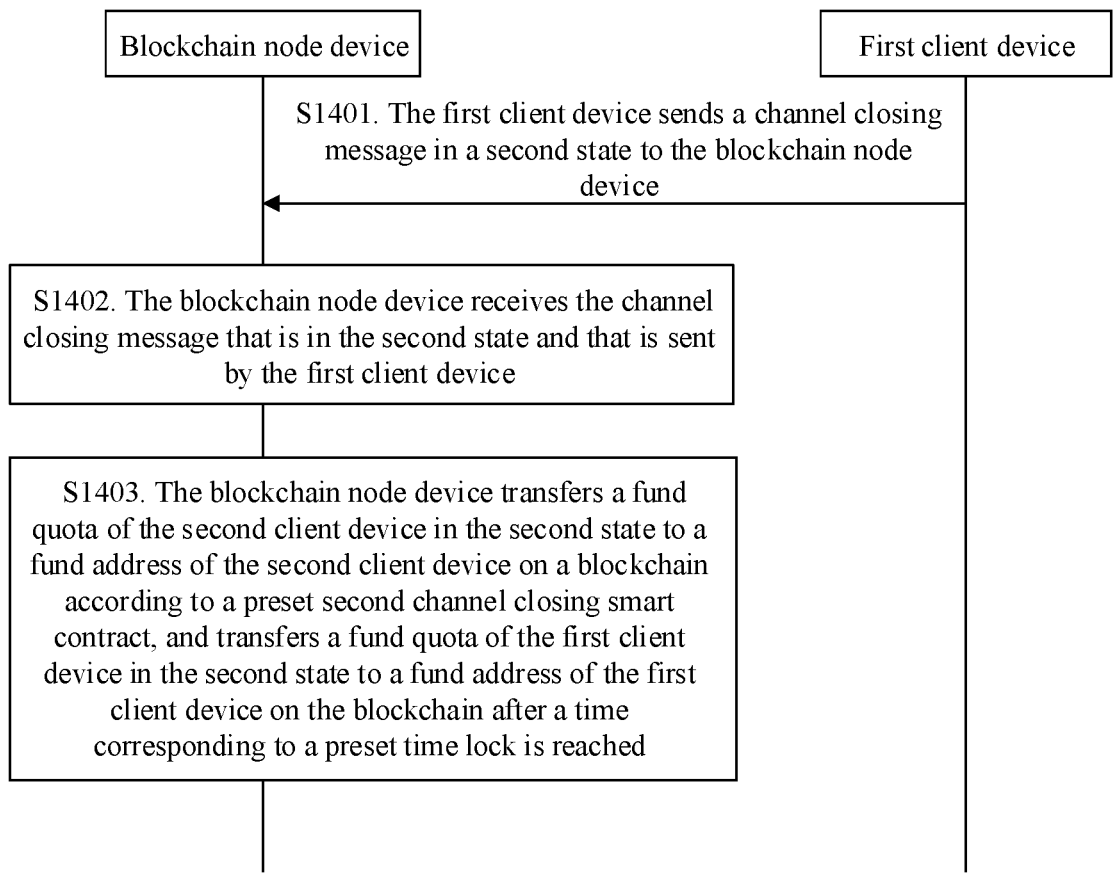
FIG. 14 is a flowchart of a method in which a first client device sends a channel closing message in a second state in a blockchain-based data processing method according to an embodiment of this application.

FIG. 14 is a flowchart of a method in which a first client device sends a channel closing message in a second state in a blockchain-based data processing method according to an embodiment of this application. As shown in FIG. 14, the method may include the following steps.

S1401. The first client device sends a channel closing message in a second state to a blockchain node device.

The first client device may send the channel closing message in the second state, that is, the second channel closing message in the second state to the blockchain node device. When sending the channel closing message in the second state, the first client device further sends, to the blockchain node device, a signature of the first client device for the channel closing message in the second state and a signature that is of the second client device for the channel closing message in the second state and that is received by the first client device.

The channel closing message that is in the second state and that is sent by the first client device is MA_Close1 and may include a character string "AliceCloseTx1". The signature of the first client device for the channel closing message in the second state is SigAA1, and the signature that is of the second client device for the channel closing message in the second state and that is received by the first client device is SigAB1.

S1402. The blockchain node device receives the channel closing message that is in the second state and that is sent by the first client device.

S1403. The blockchain node device transfers a fund quota of the second client device in the second state to a fund address of the second client device on the blockchain according to a preset second channel closing smart contract, and transfers a fund quota of the first client device in the second state to a fund address of the first client device on the blockchain after a time corresponding to a preset time lock is reached.

The second channel closing smart contract may be a preset smart contract for closing a channel in a new state.

The blockchain node device may transfer the fund quota of the second client device in the second state to the fund address of the second client device on the blockchain, and transfer the fund quota of the first client device in the second state to the fund address of the first client device on the blockchain after the time corresponding to the preset time lock is reached. Then, the off-chain channel is closed.

For the channel closing message that is in the second state and that is sent by the first client device, the blockchain node device may directly transfer the fund quota of the second client device in the second state to the fund address of the second client device on the blockchain according to the preset second channel closing smart contract, and transfer the fund quota of the first client device in the second state to the fund address of the first client device on the blockchain after the time corresponding to the preset time lock is reached, thereby ensuring transaction security.

Figure 15:
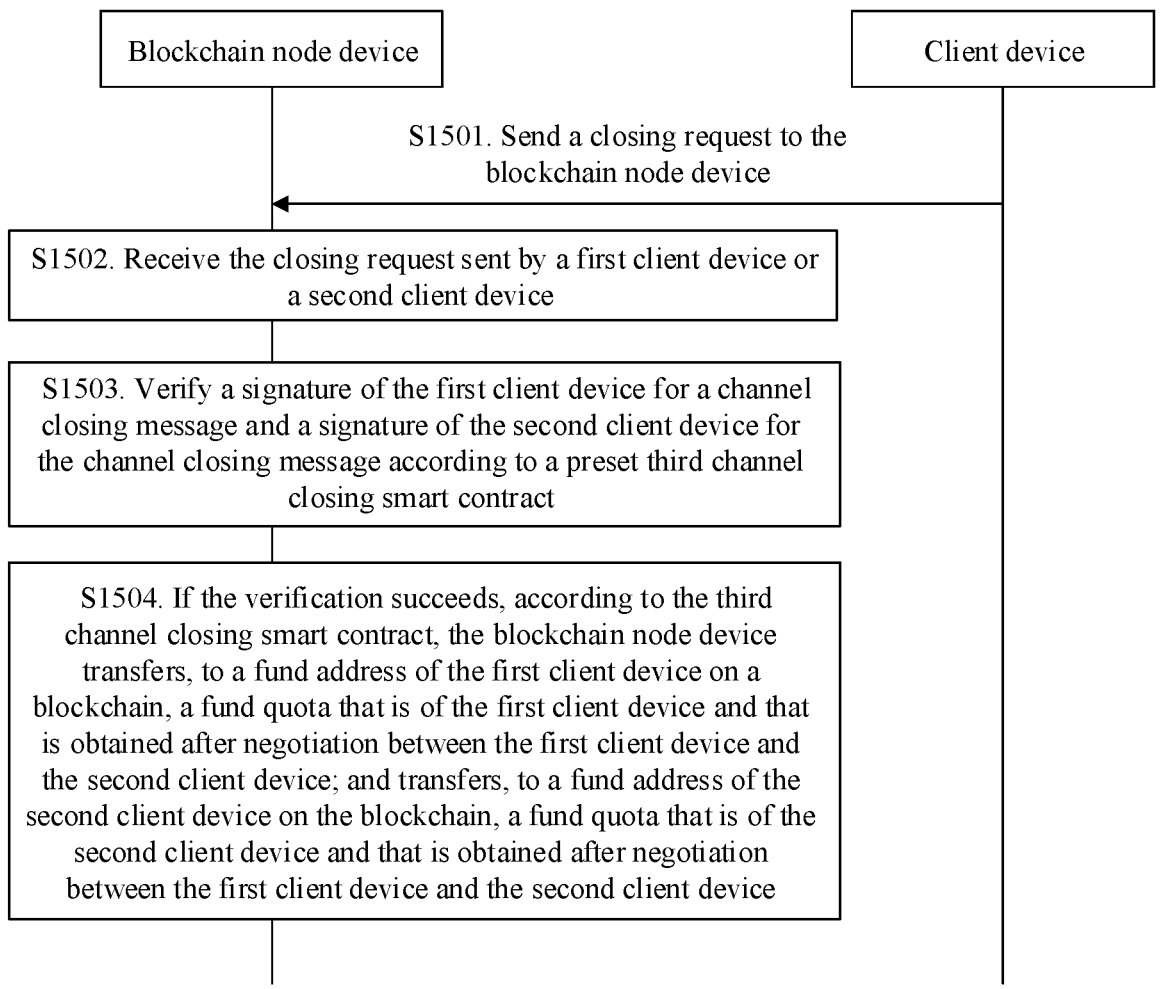
FIG. 15 is a flowchart of a method for initiating a fast channel closing message after negotiation between the first client device and the second client device in a blockchain-based data processing method according to an embodiment of this application.

FIG. 15 is a flowchart of a method in which a first client device and a second client device initiate a fast channel closing message after negotiation in a blockchain-based data processing method according to an embodiment of this application. As shown in FIG. 15, the method may include the following steps.

S1501. The first client device or the second client device sends a closing request to a blockchain node device.

The closing request is a request sent after negotiation between the first client device and the second client device. The closing request may be referred to as a fast closing request.

The closing request may include a channel closing message, a signature of the first client device for the channel closing message, and a signature of the second client device for the fast channel closing message.

The channel closing message may be referred to as a fast channel closing message. The channel closing message may be a channel closing message MInst_Close generated after negotiation between the first client device and the second client device. The channel closing message includes a fund quota obtained after negotiation between the first client device and the second client device and a preset character string "InstCloseTx". The signature of the first client device for the channel closing message may be obtained by signing the channel closing message by the first client device based on a private key of the first client device. The signature of the first client device for the channel closing message may be SigCA. The signature of the second client device for the channel closing message may be obtained by signing the channel closing message by the second client device based on a private key of the second client device. The signature of the second client device for the channel closing message may be SigCB.

S1502. The blockchain node device receives the closing request sent by the first client device or the second client device.

S1503. The blockchain node device verifies the signature of the first client device for the channel closing message and the signature of the second client device for the channel closing message according to a preset third channel closing smart contract.

The third channel closing smart contract may be a preset fast channel closing smart contract.

S1504. If the verification succeeds, according to the third channel closing smart contract, the blockchain node device transfers, to a fund address of the first client device on a blockchain, a fund quota that is of the first client device and that is obtained after negotiation between the first client device and the second client device; and transfers, to a fund address of the second client device on the blockchain, a fund quota that is of the second client device and that is obtained after negotiation between the first client device and the second client device.

If the verification succeeds, the blockchain node device may determine that the closing request is a request sent after the negotiation between the first client device and the second client device.

In the method provided in this embodiment, after receiving the closing request sent by the first client device or the second client device after the negotiation between the first client device and the second client device, the blockchain node device transfers, to the fund address of the first client device on the blockchain, the fund quota that is of the first client device and that is obtained after the negotiation between the first client device and the second client device;

and transfers, to the fund address of the second client device on the blockchain, the fund quota that is of the second client device and that is obtained after the negotiation between the first client device and the second client device. In this way, the off-chain channel is fast closed.

To fast close the off-chain channel, each client device needs to sign a signature for one transaction, for example, a signature SigCA of a channel closing message generated by the first client device. In this method, only few signatures are required for client devices of two transaction parities, thereby reducing a calculation amount of the client devices. In addition, a large quantity of private keys do not need to be generated and stored, thereby reducing storage costs of the client devices.

In the method provided in this embodiment of this application, a smart contract may be supported. Based on channel closing messages initiated in different scenarios, different channel exit smart contracts are used for processing, thereby unlocking fund quotas in a plurality of scenarios. In this way, implementation is more convenient and more flexible.

In a process in which the first client device and the second client device perform a transaction on the off-chain channel to switch a fund status, the first client device generates a channel closing message MA_Close1 of the first client device in the second state, and the second client device generates a channel closing message MB_Close1 of the second client device in the second state. Any one of the channel closing message MA_Close1 of the first client device in the second state and the channel closing message MB_Close1 of the second client device in the second state is sent to the blockchain node device, so that the blockchain node device can trigger closing of the off-chain channel according to a blockchain smart contract. The channel closing message MA_Close1 of the first client device in the second state may be triggered by the first client device, and the channel closing message MB_Close1 of the second client device in the second state may be triggered by the second client device.

In the first state, the first client device further generates a channel closing message MA_Close0 of the first client device in the first state, and the second client device further generates a channel closing message MB_Close0 of the second client device in the first state. Therefore, the first client device and the second client device may separately send the channel closing messages in the two states.

Figure 16:
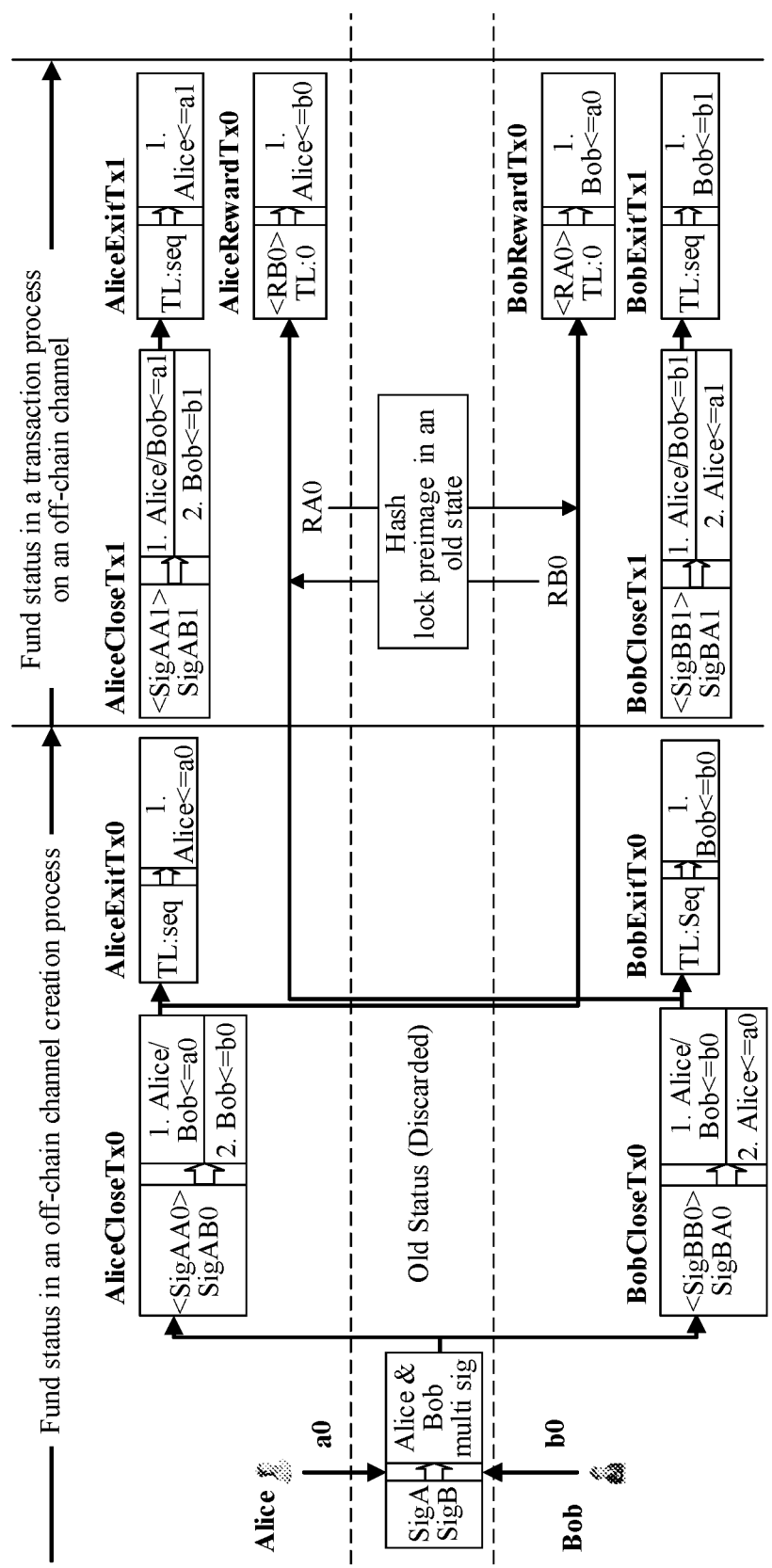
FIG. 16 is a schematic diagram of a fund status when a first client device and a second client device perform transaction on an off-chain channel in a method according to an embodiment of this application.

FIG. 16 is a schematic diagram of a fund status when a first client device and a second client device perform transaction on an off-chain channel in a method according to an embodiment of this application. For example, the first client device is Alice, and the second client device is Bob. In this case, in a process of performing a transaction on the off-chain channel, the first client device may generate a signature SigAA1 of the first client device for a second channel closing message MA_Close1 in a second state, and further receive a signature SigAB1 that is of the second client device for a second channel closing message MA_Close1 in the second state and that is sent by the second client device. The second client device further generates a signature SigBB1 of the second client device for a third channel closing message MB_Close1 in the second state, and further receives a signature SigBA1 that is of the first client device for a third channel closing message MB_Close0 in the second state and that is sent by the first client device.

In this way, in the second state, the first client device can have SigAA1 and SigAB1 for MA_Close1, and the second client device can have SigBB1 and SigBA1 for MB_Close1.

Herein, MA_Close1 includes a character string "AliceCloseTx1", and MB_Close1 includes a character string "BobCloseTx1".

Herein, any one of MA_Close1 including "AliceCloseTx1" and MB_Close1 including "BobCloseTx1" may be triggered. Herein, MA_Close1 including "AliceCloseTx1" may be triggered by the first client device. The first client device may trigger, by using SigAA1 and SigAB1, MA_Close1 including "AliceCloseTx1". When MA_Close1 including "AliceCloseTx1" is triggered, the first client device can obtain a fund quota a1 of the first client device in the second state when a time lock (TL) is reached, and the second client device can immediately obtain a fund quota b1 of the second client device in the second state.

Herein, MB_Close1 including "BobCloseTx1" may be triggered by the second client device. The second client device may trigger, by using SigBB1 and SigBA1, MB_Close1 including "BobCloseTx1". When MB_Close1 including "BobCloseTx1" is triggered, the second client device can obtain a fund quota b1 of the second client device in the second state when a time lock (TL) is reached, and the first client device can immediately obtain a fund quota a1 of the first client device in the second state.

The first client device further has MA_Close0 of the first client device in the first state, SigAA0, and SigAB0. For example, if the first client device triggers, by using SigAA0 and SigAB0, MA_Close0 including "AliceCloseTx0", the second client device may trigger, by using a hash lock preimage RA0 of the first client device in the first state, the second client device to obtain a transaction BobRewardTx0, so that the second client device can obtain a fund quota a0 of the first client device in the first state.

The second client device further has MB_Close0 of the second client device in the first state, SigBB0, and SigBA0. For example, if the second client device triggers, by using SigBB0 and SigBA0, MA_Close0 including "BobCloseTx0", the first client device may trigger, by using a hash lock preimage RB0 of the second client device in the first state, the first client device to obtain a transaction AliceRewardTx0, so that the first client device can obtain a fund quota b0 of the second client device in the first state.

A fast channel closing message MInst_Close is generated in a negotiation process of the first client device and the second client device. The signature of the first client device for the fast channel closing message may be SigCA; and the signature of the second client device for the fast channel closing message may be SigCB. The fast channel closing message MInst_Close including "InstCloseTx" may be triggered by any one of the first client device and the second client device.

Figure 17:
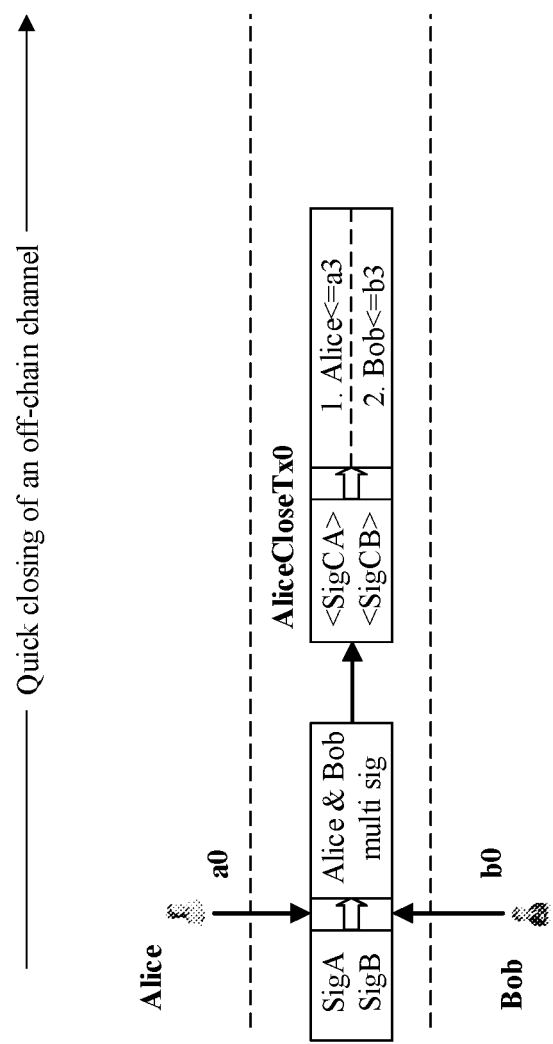
FIG. 17 is a schematic diagram of a fund status when a first client device and a second client device perform interaction on an off-chain channel in a method according to an embodiment of this application.

FIG. 17 is a schematic diagram of a fund status when a first client device and a second client device perform transaction on an off-chain channel in a method according to an embodiment of this application. For example, the first client device is Alice, and the second client device is Bob. In this case, each of the first client device and the second client device may generate a fast channel closing message MInstClose in a process of negotiation between the two client devices for exit. The first client device generates a signature SigCA of the first client device for the fast channel closing message, and further receives a signature SigCB that is of the second client device for the fast channel closing message and that is sent by the second client device. After the negotiation between the first client device and the second client device, a fund quota of the first client device may be a3, and a fund quota of the second client device may be b3. If the first client device or the second client device sends the fast channel closing message by using SigCA and SigCB, the fund quota of the first client device that is obtained by the first client device after the negotiation may be a3, and the fund quota of the second client device that is obtained by the second client device after the negotiation may be b3.

Figure 18:
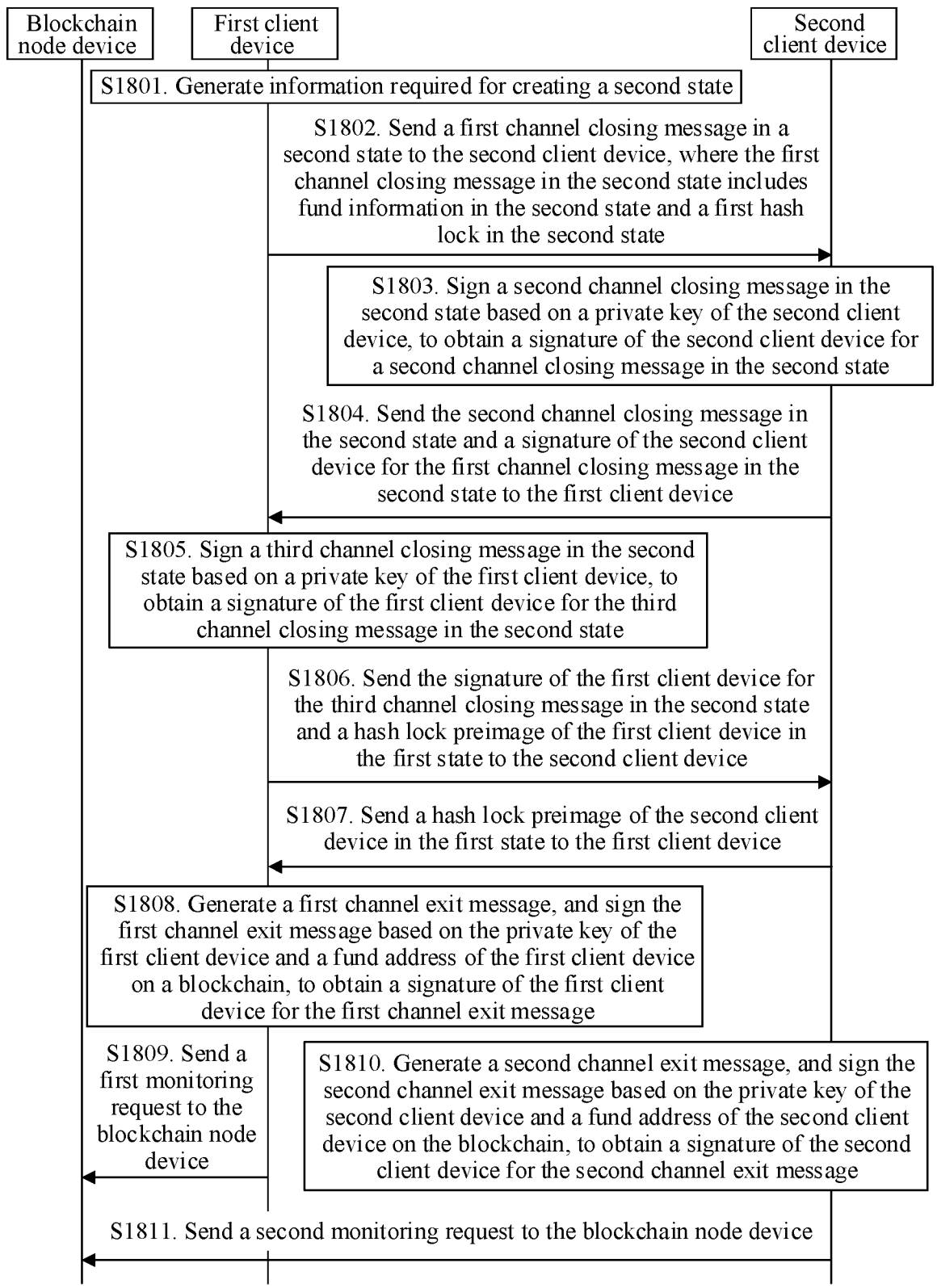
FIG. 18 is a third flowchart of a method for performing transaction on an off-chain channel in a blockchain-based data processing method according to an embodiment of this application.

By using examples, the following describes in detail the process in which the first client device and the second client device perform transaction on an off-chain channel. This embodiment is described by using an example in which the first client device is Alice and the second client device is Bob. FIG. 18 is a third flowchart of a method for performing transaction on an off-chain channel in a blockchain-based data processing method according to an embodiment of this application. As shown in FIG. 18, the method may include the following steps.

S1801. A first client device generates information required for creating a second state.

The information required for creating the second state includes an index, fund information in the second state, a time lock, and a first hash lock in the second state. The fund information in the second state may include fund information a1 of the first client device in the second state, and fund information b1 of the second client device in the second state. The first hash lock in the second state is a hash lock hashlockA1 of the first client device in the second state.

S1802. The first client device sends a first channel closing message in the second state to a second client device, where the first channel closing message in the second state includes fund information in the second state and a first hash lock in the second state.

S1803. The second client device signs a second channel closing message in the second state based on a private key of the second client device, to obtain a signature of the second client device for the second channel closing message in the second state.

The second channel closing message in the second state includes fund information in the second state, a first hash lock in the second state, and a second hash lock in the second state. The second hash lock in the second state is a hash lock of the second client device in the second state. Optionally, the second channel closing message in the second state may further include a time lock.

When receiving the first channel closing message that is in the second state and that is sent by the first client device, the second client device performs S1803.

The second channel closing message of the first client device in the second state may be MA_Close1, and the signature of the second client device for the second channel closing message in the second state may be SigAB1.

S1804. The second client device sends the second channel closing message in the second state and a signature of the second client device for the first channel closing message in the second state to the first client device.

S1805. The first client device signs a third channel closing message in the second state based on a private key of the first client device, to obtain a signature of the first client device for the third channel closing message in the second state.

The third channel closing message in the second state includes the fund information in the second state, the first hash lock in the second state, and the second hash lock in the second state. Optionally, the third channel closing message in the second state may further include a time lock.

The third channel closing message of the second client device in the second state may be MB_Close1, and the signature of the first client device for the third channel closing message in the second state may be SigBA1.

The first client device further signs the second channel closing message in the second state based on the private key of the first client device, to obtain the signature SigAA1 of the first client device for the second channel closing message in the second state.

S1806. The first client device sends the signature of the first client device for the third channel closing message in the second state and a hash lock preimage of the first client device in the first state to the second client device.

In other words, the first client device sends SigBA1 and RA0 to the second client device.

The second client device further signs the third channel closing message in the second state based on the private key of the second client device, to obtain a signature SigBB1 of the second client device for the third channel closing message in the second state.

S1807. The second client device sends a hash lock preimage of the second client device in the first state to the first client device.

In other words, the second client device sends RB0 to the first client device.

S1808. The first client device generates a first channel exit message, and signs the first channel exit message based on the private key of the first client device and a fund address of the first client device on a blockchain, to obtain a signature of the first client device for the first channel exit message.

The first channel exit message includes the hash lock preimage of the second client device in the first state.

The signature of the first client device for the first channel exit message may be SigMAM.

S1809. The first client device sends a first monitoring request to a blockchain node device.

The first monitoring request includes the first channel exit message and the signature of the first client device for the first channel exit message. The first channel exit message may be MA_Moniter. In other words, the first client device sends MA_Moniter and SigMAM to the blockchain node device.

The first monitoring request is used by the blockchain node device to monitor a channel closing message initiated by the second client device.

S1810. The second client device generates a second channel exit message, and signs the second channel exit message based on the private key of the second client device and a fund address of the second client device on the blockchain, to obtain a signature of the second client device for the second channel exit message.

The second channel exit message includes the hash lock preimage of the first client device in the first state.

The signature of the second client device for the second channel exit message may be SigMBM.

S1811. The second client device sends a second monitoring request to the blockchain node device.

The second monitoring request includes the second channel exit message and the signature of the first client device for the second channel exit message. The second channel exit message may be MB_Moniter. In other words, the second client device sends MB_Moniter and SigMBM to the blockchain node device.

The second monitoring request is used by the blockchain node device to monitor a channel closing message initiated by the first client device.

In the method provided in this embodiment, in a process in which the blockchain node device performs transaction on the off-chain channel, one client device may exchange, with the other client device, a signature of the client device for a channel closing message in the second state; and may further send a monitoring request to the blockchain node device, so that the blockchain node device monitors the channel closing message initiated by the other client device, thereby ensuring transaction security of the two parties.

Figure 19:
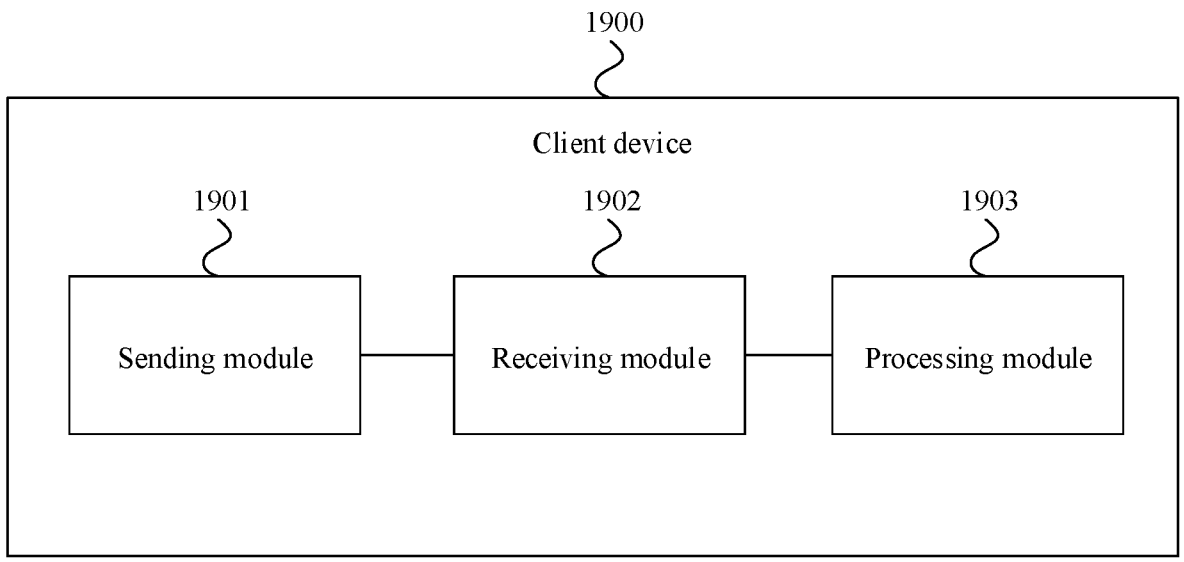
FIG. 19 is a first schematic structural diagram of a client device according to an embodiment of this application.

An embodiment of this application may further provide a client device. The client device may perform the blockchain-based data processing method performed by the first client device in any one of FIG. 3 to FIG. 18. FIG. 19 is a first schematic structural diagram of a client device according to an embodiment of this application. As shown in FIG. 19, the client device 1900 may be a first client device, and may include:

- a sending module 1901, configured to send a first channel closing message in a second state to a second client device on an off-chain channel, where the first channel closing message in the second state includes fund information in the second state and a first hash lock in the second state, the first channel closing message in the second state is used by the second client device to switch a fund status from a first state to the second state based on the fund information in the second state, and the first hash lock in the second state is a hash lock of the first client device in the second state;
- a receiving module 1902, configured to receive a second signature in the second state and a second channel closing message in the second state that are sent by the second client device on the off-chain channel, where the second signature in the second state is obtained by signing the second channel closing message in the second state by the second client device based on a private key of the second client device, the second channel closing message in the second state includes the fund information in the second state, the first hash lock in the second state, and a second hash lock in the second state, and the second hash lock in the second state is a hash lock of the second client device in the second state; and
- a processing module 1903, configured to sign a third channel closing message in the second state based on a private key of the first client device, to obtain a first signature in the second state, where the third channel closing message in the second state includes the fund information in the second state, the first hash lock in the second state, and the second hash lock in the second state.

The sending module 1901 is further configured to send the first signature in the second state to the second client device.

It should be understood that the client device 1900 has any function of the first client device in the method described in any one of FIG. 3 to FIG. 18. For the any function, refer to the method described in any one of FIG. 3 to FIG. 18. Details are not described herein again.

The client device provided in the foregoing embodiment of this application may be implemented in a plurality of product forms. For example, the client device may be configured as a universal processing system. For example, the client device may be implemented by a general bus architecture. For example, the client device may be implemented by an application-specific integrated circuit (ASIC). The following provides several possible product forms of the client device in the embodiments of this application. It should be understood that the following is merely an example, and the possible product forms in the embodiments of this application are not limited thereto.

Figure 20:
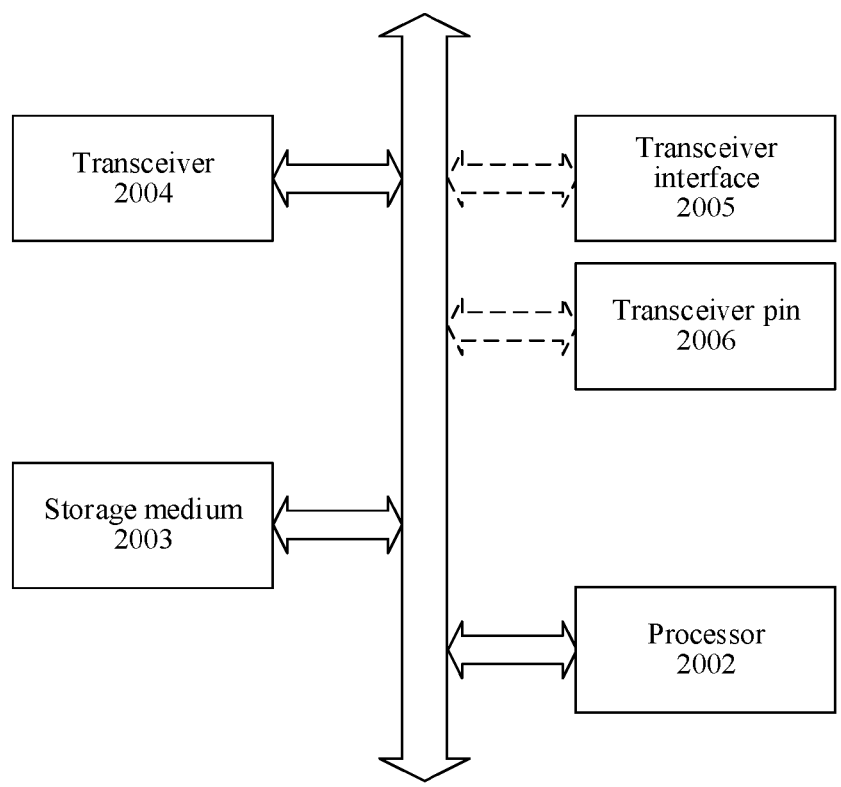
FIG. 20 is a first structural diagram of a possible product form of a client device according to an embodiment of this application.

FIG. 20 is a first structural diagram of a possible product form of a client device according to an embodiment of this application.

In a possible product form, the client device may be implemented by a device, and the client device includes a processor 2002 and a transceiver 2004. Optionally, the client device may further include a storage medium 2003.

Alternatively, in another possible product form, the client device is implemented by a general-purpose processor, that is, a chip. The general-purpose processor includes a processor 2002 and a transceiver interface 2005/transceiver pin 2006. Optionally, the general-purpose processor may further include a storage medium 2003.

Alternatively, in another possible product form, the client device may be implemented by using the following: one or more field-programmable gate arrays (FPGA), a programmable logic device (PLD), a controller, a state machine, gate logic, a discrete hardware component, any other suitable circuit, or any combination of circuits that can perform various functions described throughout this application.

Optionally, an embodiment of this application further provides a computer readable storage medium. The computer readable storage medium may include an instruction. When the instruction is run on a computer, the computer is enabled to perform the blockchain-based data processing method performed by the first client device in any one of FIG. 3 to FIG. 18 in the foregoing embodiments.

Optionally, an embodiment of this application further provides a computer program product including an instruction. When the computer program product is run on a computer, the computer is enabled to perform the blockchain-based data processing method performed by the first client device in any one of FIG. 3 to FIG. 18 in the foregoing embodiments.

Functions of the computer program product may be implemented by using hardware or software. When the functions are implemented by using software, the functions may be stored in a computer readable medium or transmitted as one or more instructions or code in the computer readable storage medium.

The client device, the computer readable storage medium, and the computer program product in the embodiments of this application may perform the blockchain-based data processing method performed by the first client device in any one of FIG. 3 to FIG. 18. For specific implementation processes and beneficial effects of the client device, the computer readable storage medium, and the computer program product, refer to the foregoing descriptions. Details are not described herein again.

Figure 21:
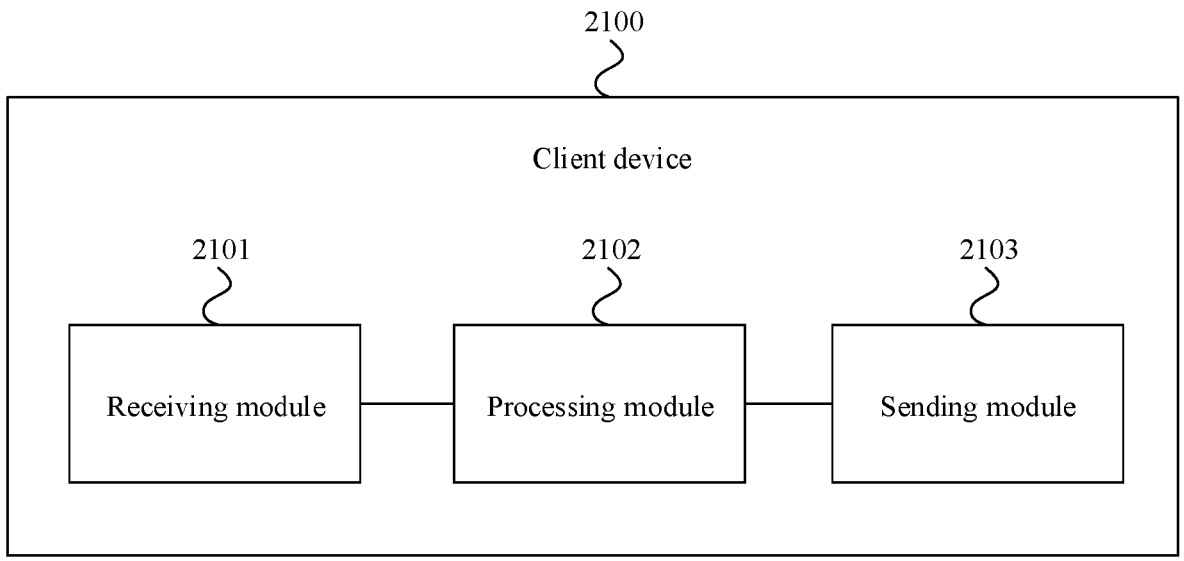
FIG. 21 is a second schematic structural diagram of a client device according to an embodiment of this application.

An embodiment of this application may further provide a client device. The client device may perform the blockchain-based data processing method performed by the second client device in any one of FIG. 3 to FIG. 18. FIG. 21 is a second schematic structural diagram of a client device according to an embodiment of this application. As shown in FIG. 21, the client device 2100 may be a second client device, and may include:

- a receiving module 2101, configured to receive, on an off-chain channel, a first channel closing message that is in a second state and that is sent by a first client device, where the first channel closing message in the second state includes fund information in the second state and a first hash lock in the second state, and the first hash lock in the second state is a hash lock of the first client device in the second state;
- a processing module 2102, configured to: switch a fund status from a first state to the second state based on fund information in the second state; and sign a second channel closing message in the second state based on a private key of the second client device, to obtain a second signature in the second state, where the second channel closing message in the second state includes the fund information in the second state, the first hash lock in the second state, and a second hash lock in the second state, and the second hash lock in the second state is a hash lock of the second client device in the second state; and a sending module 2103, configured to send the second signature in the second state and the second channel closing message in the second state to the first client device on the off-chain channel.

The receiving module 2101 is further configured to receive, on the off-chain channel, a first signature that is in the second state and that is sent by the first client device, where the first signature in the second state is a signature obtained by signing a third channel closing message in the second state by the first client device based on a private key of the first client device, and the third channel closing message in the second state includes the fund information in the second state, the first hash lock in the second state, and the second hash lock in the second state.

It should be understood that the client device 2100 has any function of the second client device in the method described in any one of FIG. 3 to FIG. 18. For the any function, refer to the method described in any one of FIG. 3 to FIG. 18. Details are not described herein again.

The client device provided in the foregoing embodiment of this application may be implemented in a plurality of product forms. For example, the client device may be configured as a universal processing system. For example, the client device may be implemented by a general bus architecture. For example, the client device may be implemented by an application-specific integrated circuit (ASIC). The following provides several possible product forms of the client device in the embodiments of this application. It should be understood that the following is merely an example, and the possible product forms in the embodiments of this application are not limited thereto.

Figure 22:
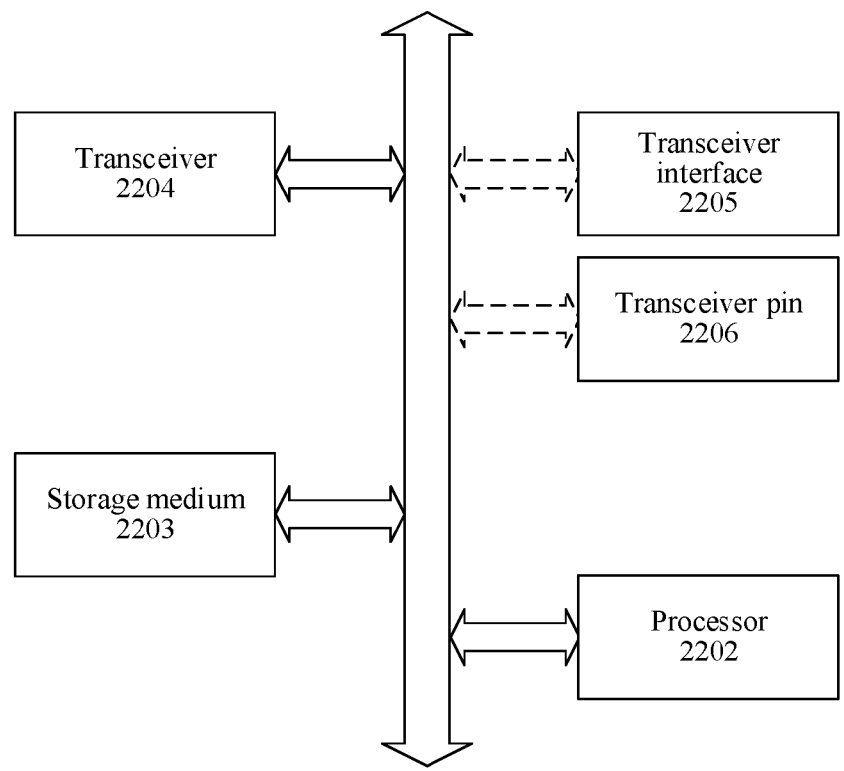
FIG. 22 is a second structural diagram of a possible product form of a client device according to an embodiment of this application.

FIG. 22 is a second structural diagram of a possible product form of a client device according to an embodiment of this application.

In a possible product form, the client device may be implemented by a device, and the client device includes a processor 2202 and a transceiver 2204. Optionally, the client device may further include a storage medium 2203.

Alternatively, in another possible product form, the client device is implemented by a general-purpose processor, that is, a chip. The general-purpose processor includes a processor 2202 and a transceiver interface 2205/transceiver pin 2206. Optionally, the general-purpose processor may further include a storage medium 2203.

Alternatively, in another possible product form, the client device may be implemented by using the following: one or more FPGAs, a PLD, a controller, a state machine, gate logic, a discrete hardware component, any other suitable circuit, or any combination of circuits that can perform various functions described in this application.

Optionally, an embodiment of this application further provides a computer readable storage medium. The computer readable storage medium may include an instruction. When the instruction is run on a computer, the computer is enabled to perform the blockchain-based data processing method performed by the second client device in any one of FIG. 3 to FIG. 18 in the foregoing embodiments.

Optionally, an embodiment of this application further provides a computer program product including an instruction. When the computer program product is run on a computer, the computer is enabled to perform the blockchain-based data processing method performed by the second client device in any of FIG. 3 to FIG. 18 in the foregoing embodiments.

Functions of the computer program product may be implemented by using hardware or software. When the functions are implemented by using software, the functions may be stored in a computer readable medium or transmitted as one or more instructions or code in the computer readable storage medium.

The client device, the computer readable storage medium, and the computer program product in the embodiments of this application may perform the blockchain-based data processing method performed by the second client device in any one of FIG. 3 to FIG. 18. For specific implementation processes and beneficial effects of the client device, the computer readable storage medium, and the computer program product, refer to the foregoing descriptions. Details are not described herein again.

Figure 23:
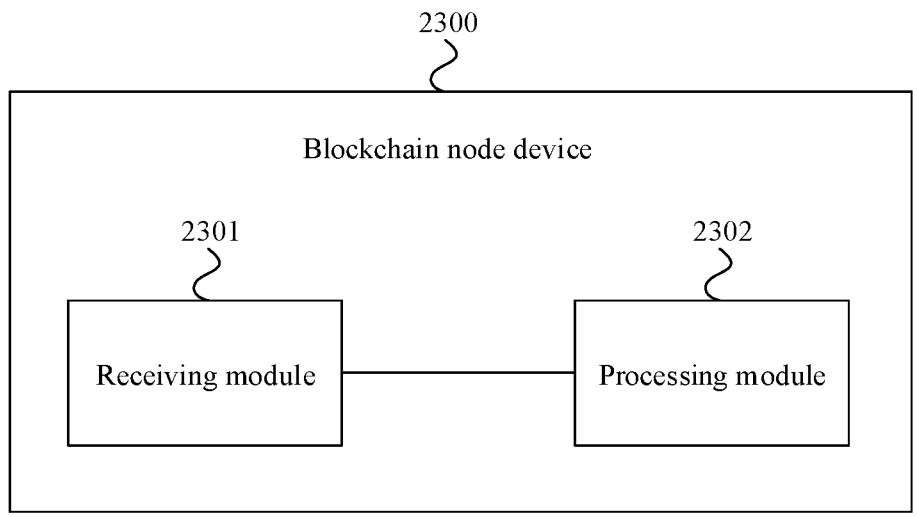
FIG. 23 is a schematic structural diagram of a blockchain node device according to an embodiment of this application.

An embodiment of this application may further provide a blockchain node device. The blockchain node device may perform the blockchain-based data processing method performed by the blockchain node device described in any one of FIG. 3 to FIG. 18. FIG. 23 is a schematic structural diagram of a blockchain node device according to an embodiment of this application. As shown in FIG. 23, the blockchain node device 2300 may include:

a receiving module 2301, configured to: receive a first monitoring request sent by a first client device, where the first monitoring request is a monitoring request sent by the the first client device after the first client device performs a transaction with a second client device on an off-chain channel to switch a fund status from a first state to a second state; and receive a second monitoring request sent by the second client device, where the second monitoring request is a monitoring request sent by the second client device after the second client device performs a transaction with the first client device on the off-chain channel to switch a fund status from the first status to the second status; and a processing module 2302, configured to: monitor, based on the first monitoring request, a channel closing message sent by the second client device; and monitor, based on the second monitoring request, the channel closing message sent by the first client device.

It should be understood that the blockchain node device 2300 has any function of the blockchain node device in the method described in any one of FIG. 3 to FIG. 18. For the any function, refer to the method described in any one of FIG. 3 to FIG. 18. Details are not described herein again.

The blockchain node device provided in the foregoing embodiment of this application may be implemented in a plurality of product forms. For example, the blockchain node device may be configured as a universal processing system. For example, the blockchain node device may be implemented by using a general bus architecture. For example, the blockchain node device may be implemented by an application-specific integrated circuit (ASIC). The following provides several possible product forms of the blockchain node device in the embodiments of this application. It should be understood that the following is merely an example, and the possible product forms in the embodiments of this application are not limited thereto.

Figure 24:
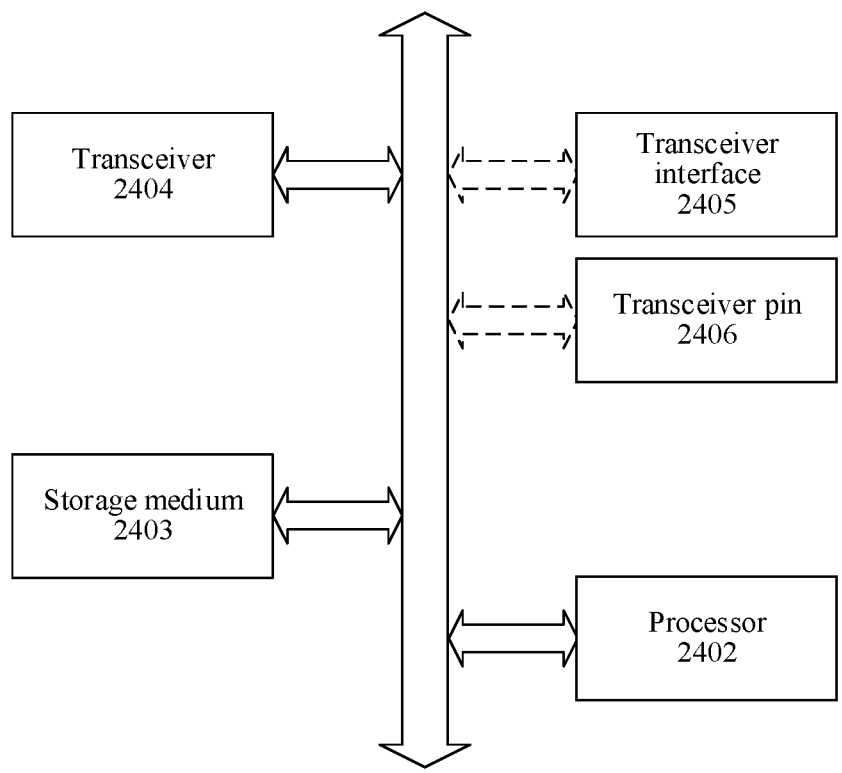
FIG. 24 is a structural diagram of a possible product form of a blockchain node device according to an embodiment of this application.

FIG. 24 is a structural diagram of a possible product form of a blockchain node device according to an embodiment of this application.

In a possible product form, the blockchain node device may be implemented by a device, and the blockchain node device includes a processor 2402 and a transceiver 2404. Optionally, the blockchain node device may further include a storage medium 2403.

Alternatively, in another possible product form, the blockchain node device is implemented by a general-purpose processor, that is, a chip. The general-purpose processor includes a processor 2402 and a transceiver interface 2405/transceiver pin 2406. Optionally, the general-purpose processor may further include a storage medium 2403.

Alternatively, in another possible product form, the first network device may be implemented by using the following: one or more FPGAs, a PLD, a controller, a state machine, gate logic, a discrete hardware component, any other suitable circuit, or any combination of circuits that can perform various functions described in this application.

Optionally, an embodiment of this application further provides a computer readable storage medium. The computer readable storage medium may include an instruction. When the instruction is run on a computer, the computer is enabled to perform the blockchain-based data processing method performed by the blockchain node device in any one of FIG. 3 to FIG. 18 in the foregoing embodiments.

Optionally, an embodiment of this application further provides a computer program product including an instruction. When the computer program product is run on a computer, the computer is enabled to perform the blockchain-based data processing method performed by the blockchain node device in any one of FIG. 3 to FIG. 18 in the foregoing embodiments.

Functions of the computer program product may be implemented by using hardware or software. When the functions are implemented by using software, the functions may be stored in a computer readable medium or transmitted as one or more instructions or code in the computer readable storage medium.

The blockchain node device, the computer readable storage medium, and the computer program product in the embodiments of this application may perform the blockchain-based data processing method performed by the blockchain node device in any one of FIG. 3 to FIG. 18. For specific implementation processes and beneficial effects of the blockchain node device, the computer readable storage medium, and the computer program product, refer to the foregoing descriptions. Details are not described herein again.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, comprising:
    sending, by a first client device, a channel creation message to a blockchain node device, wherein the blockchain node device is a miner device that is part of a main chain of a blockchain, wherein the channel creation message causes the blockchain node device to create an off-chain channel between the first client device and a second client device according to a preset channel creation smart contract, and determine that a fund status of the off-chain channel is a first state, wherein the off-chain channel is a wireless bidirectional communication technology channel other than the main chain of the blockchain; and
    performing, by the first client device, a fund transferring transaction between the first client device and the second client device using the off-chain channel to update the fund status of the off-chain channel from the first state to a second state, wherein performing the fund transferring transaction comprises:
        sending, by the first client device, a first channel closing message in the second state to the second client device on the off-chain channel, wherein the first channel closing message in the second state comprises fund information in the second state and a first hash lock in the second state, wherein the first channel closing message in the second state causes the second client device to switch the fund status from the first state to the second state based on the fund information in the second state, and wherein the first hash lock in the second state is a hash lock of the first client device in the second state;
        receiving, by the first client device, a second signature in the second state and a second channel closing message in the second state from the second client device on the off-chain channel, wherein the second signature in the second state is obtained by signing the second channel closing message in the second state by the second client device based on a private key of the second client device, wherein the second channel closing message in the second state comprises the fund information in the second state, the first hash lock in the second state, and a second hash lock in the second state, and wherein the second hash lock in the second state is a hash lock of the second client device in the second state;
        signing, by the first client device, a third channel closing message in the second state based on a private key of the first client device, to obtain a first signature in the second state; and
        sending, by the first client device, the first signature in the second state to the second client device, wherein the third channel closing message in the second state comprises the fund information in the second state, the first hash lock in the second state, and the second hash lock in the second state;
    wherein the blockchain node device is configured to receive a hash lock preimage of the first client device in the first state within a time corresponding to a preset time lock, wherein the blockchain node device performs a hash operation on the first hash lock preimage of the first client device in the first state according to a first channel closing smart contract, to obtain a hash value, wherein the blockchain node device compares the hash value with a first hash lock in the first state according to the first channel closing smart contract, wherein the first hash lock in the first state is a hash lock of the first client device in the first state, and wherein based on the hash value being the same as the first hash lock in the first state, the blockchain node device transfers a fund quota of the first client device in the first state to a fund address of the second client device on the blockchain according to the first channel closing smart contract.

2. The method according to claim 1, further comprising:
generating, by the first client device, information required for creating the off-chain channel in the first state, wherein the information required for creating the off-chain channel comprises fund information in the first state;
generating, by the first client device, the channel creation message based on the fund information in the first state; and
sending, by the first client device to the second client device, the information required for creating the off-chain channel, wherein the information required for creating the off-chain channel causes the second client device to generate a second channel creation message based on the fund information in the first state.

3. The method according to claim 2, further comprising:
signing, by the first client device, the channel creation message based on the private key of the first client device, to obtain a signature of the first client device for the channel creation message;
sending, by the first client device, the signature of the first client device for the channel creation message to the second client device; and
receiving, by the first client device, a second signature that is of the second client device for the second channel creation message generated by the second client device and that is sent by the second client device.

4. The method according to claim 3, further comprising:
sending, by the first client device, the signature of the first client device for the channel creation message and the second signature of the second client device for the second channel creation message to the blockchain node device.

5. The method according to claim 2, wherein the information required for creating the off-chain channel further comprises a first hash lock in the first state, wherein the first hash lock in the first state is a hash lock of the first client in the first state, wherein the method further comprises:
receiving, by the first client device, a first channel closing message in the first state and a second signature of the second client device for the first channel closing message in the first state from the second client device, wherein the first channel closing message in the first state comprises the fund information in the first state, the first hash lock in the first state, and a second hash lock in the first state, and wherein the second hash lock in the first state is a hash lock of the second client device in the first state;
signing, by the first client device, a second channel closing message in the first state based on the private key of the first client device, to obtain a signature of the first client device for the second channel closing message in the first state, wherein the second channel closing message in the first state comprises the fund information in the first state, the first hash lock in the first state, and the second hash lock in the first state; and
sending, by the first client device, the signature of the first client device for the second channel closing message in the first state to the second client device.

6. The method according to claim 5, wherein the first channel closing message in the first state further comprises a time lock, and the second channel closing message in the first state further comprises a time lock.

7. The method according to claim 1, wherein before the sending, by the first client device, the first channel closing message to the second client device on the off-chain channel, the method further comprises:
generating, by the first client device, information required for creating the second state, wherein the information required for creating the second state comprises the fund information in the second state, a time lock in the second state, and the first hash lock in the second state.

8. The method according to claim 1, further comprising:
sending, by the first client device, a hash lock preimage of the first client device in the first state to the second client device; and
receiving, by the first client device from the second client device, a second hash lock preimage that is of the second client device in the first state.

9. The method according to claim 8, further comprising:
generating, by the first client device, a channel exit message, wherein the channel exit message comprises the second hash lock preimage of the second client device in the first state;
signing, by the first client device, the channel exit message based on the private key of the first client device and a fund address of the first client device on the blockchain; and
sending, by the first client device, a monitoring request to the blockchain node device, wherein the monitoring request comprises the channel exit message and a signature of the first client device for the channel exit message, and the monitoring request causes the blockchain node device to monitor a channel closing message sent by the second client device.

10. The method according to claim 1, wherein the off-chain channel between the first client device and the second client device is a wireless fidelity (WiFi) channel, a Bluetooth channel, or an infrared channel.

11. A client device, wherein the client device is a first client device, and the client device comprises a transmitter, a processor, and a receiver, and the transmitter and the receiver are connected to the processor;
wherein the transmitter is configured to send a channel creation message to a blockchain node device, wherein the blockchain node device is a miner device that is part of a main chain of a blockchain, wherein the channel creation message causes the blockchain node device to create an off-chain channel between the first client device and a second client device according to a preset channel creation smart contract, and determine that a fund status of the off-chain channel is a first state, wherein the off-chain channel is a wireless bidirectional communication technology channel other than the main chain of the blockchain;
wherein the first client device is configured to perform a fund transferring transaction between the first client device and the second client device using the off-chain channel to update the fund status of the off-chain channel from the first state to a second state, and wherein performing the fund transferring transaction comprises:
the transmitter being configured to send a first channel closing message in the second state to the second client device on the off-chain channel, wherein the first channel closing message in the second state comprises fund information in the second state and a first hash lock in the second state, wherein the first channel closing message in the second state causes the second client device to switch the fund status from the first state to the second state based on the fund information in the second state, and wherein the first hash lock in the second state is a hash lock of the first client device in the second state;

the receiver being configured to receive a second signature in the second state and a second channel closing message in the second state from the second client device on the off-chain channel, wherein the second signature in the second state is obtained by signing the second channel closing message in the second state by the second client device based on a private key of the second client device, wherein the second channel closing message in the second state comprises the fund information in the second state, the first hash lock in the second state, and a second hash lock in the second state, and wherein the second hash lock in the second state is a hash lock of the second client device in the second state;

the processor being configured to sign a third channel closing message in the second state based on a private key of the first client device, to obtain a first signature in the second state, wherein the third channel closing message in the second state comprises the fund information in the second state, the first hash lock in the second state, and the second hash lock in the second state; and the transmitter being further configured to send the first signature in the second state and a hash lock preimage of the first client device in the first state to the second client device;

wherein the transmitter sending the hash lock preimage of the first client device in the first state to the second client device causes the second client device to send the hash lock preimage of the first client device in the first state to the blockchain node device; and wherein the second client device sending the hash lock preimage of the first client device in the first state to the blockchain node device is configured to receive a within a time corresponding to a preset time lock causes the blockchain node device to perform a hash operation on the first hash lock preimage of the first client device in the first state according to a first channel closing smart contract, to obtain a hash value, wherein the blockchain node device compares the hash value with a first hash lock in the first state according to the first channel closing smart contract, wherein the first hash lock in the first state is a hash lock of the first client device in the first state, and wherein based on the hash value being the same as the first hash lock in the first state, the blockchain node device transfers a fund quota of the first client device in the first state to a fund address of the second client device on the blockchain according to the first channel closing smart contract.

12. The client device according to claim 11, wherein:
the processor is further configured to:
generate information required for creating the off-chain channel in the first state, wherein the information required for creating the off-chain channel comprises fund information in the first state; and
generate the channel creation message based on the fund information in the first state; and the transmitter is further configured to send, to the second client device, the information required for creating the off-chain channel; wherein the information required for creating the off-chain channel causes the second client device to generate the channel creation message based on the fund information in the first state.

13. The client device according to claim 11 wherein:
the transmitter is further configured to send a hash lock preimage of the first client device in the first state to the second client device; and
the receiver is further configured to receive, from the second client device, a second hash lock preimage that is of the second client device in the first state.

14. The client device according to claim 13, wherein:
the processor is further configured to generate a channel exit message, wherein the channel exit message comprises the hash lock preimage of the first client device in the first state;
the processor is further configured to sign the channel exit message based on the private key of the first client device and a fund address of the first client device on the blockchain; and
the transmitter is further configured to send a monitoring request to the blockchain node device, wherein the monitoring request comprises the channel exit message and a signature of the first client device for the channel exit message, and the monitoring request causes the blockchain node device to monitor a channel closing message sent by the second client device.

15. The client device according to claim 11, wherein the off-chain channel between the first client device and the second client device is a wireless fidelity (WiFi) channel, a Bluetooth channel, or an infrared channel.

16. A client device, wherein the client device is a second client device, the client device comprises a receiver, a processor, and a transmitter, and the transmitter and the receiver are connected to the processor;

wherein the second client device is configured to perform a fund transferring transaction between the second client device and a first client device using an off-chain channel to update a fund status of the off-chain channel from a first state to a second state;

wherein the off-chain channel is created based on the first client device sending a channel creation message to a blockchain node device, wherein the blockchain node device is a miner device that is part of a main chain of a blockchain, wherein the channel creation message causes the blockchain node device to create the off-chain channel between the first client device and the second client device according to a preset channel creation smart contract, and determine that the fund status of the off-chain channel is the first state, wherein the off-chain channel is a wireless bidirectional communication technology channel other than the main chain of the blockchain; and wherein performing the fund transferring transaction comprises:
the receiver being configured to receive, on the off-chain channel, a first channel closing message in the second state, wherein the first channel closing message is received from the first client device, wherein the first channel closing message in the second state comprises fund information in the second state and a first hash lock in the second state, and wherein the first hash lock in the second state is a hash lock of the first client device in the second state;
the processor being configured to switch the fund status from the first state to the second state based on fund information in the second state;
the processor being further configured to sign a second channel closing message in the second state based on a private key of the second client device, to obtain a second signature in the second state, wherein the second channel closing message in the second state comprises the fund information in the second state, the first hash lock in the second state, and a second hash lock in the second state, and wherein the second hash lock in the second state is a hash lock of the second client device in the second state;

the transmitter being configured to send the second signature in the second state and the second channel closing message in the second state to the first client device on the off-chain channel;

the receiver being further configured to receive, on the off-chain channel, a first signature in the second state and a hash lock preimage of the first client device in the first state from the first client device, wherein the first signature in the second state is a signature obtained by signing a third channel closing message in the second state by the first client device based on a private key of the first client device, and the third channel closing message in the second state comprises the fund information in the second state, the first hash lock in the second state, and the second hash lock in the second state; and the transmitter being configured to send the hash lock preimage of the first client device in the first state to the blockchain node device within a time corresponding to a preset time lock, which causes the blockchain node device to perform a hash operation on the first hash lock preimage of the first client device in the first state according to a first channel closing smart contract, to obtain a hash value, wherein the blockchain node device compares the hash value with a first hash lock in the first state according to the first channel closing smart contract, wherein the first hash lock in the first state is a hash lock of the first client device in the first state, and wherein based on the hash value being the same as the first hash lock in the first state, the blockchain node device transfers a fund quota of the first client device in the first state to a fund address of the second client device on the blockchain according to the first channel closing smart contract.

17. The client device according to claim 16, wherein:
the receiver is further configured to receive, from the first client device, information required for creating the off-chain channel, wherein the information required for creating the off-chain channel comprises the fund information in the first state;

the processor is further configured to generate a second channel creation message based on the fund information in the first state;

the processor is further configured to sign the second channel creation message based on the private key of the second client device, to obtain a signature of the second client device for the second channel creation message; and the transmitter is further configured to send the signature of the second client device for the second channel creation message to the first client device.

18. The client device according to claim 16, wherein:
the receiver is further configured to receive, from the first client device, a hash lock preimage that is of the first client device in the first state; and the transmitter is further configured to send a second hash lock preimage of the second client device in the first state to the first client device.

19. The client device according to claim 16, wherein:
the processor is further configured to generate a second channel exit message, wherein the channel exit message comprises the hash lock preimage of the second client device in the first state;

the processor is further configured to sign the second channel exit message based on the private key of the second client device and a fund address of the second client device on the blockchain; and the transmitter is further configured to send a second monitoring request to the blockchain node device, wherein the monitoring request comprises the second channel exit message and a signature of the second client device for the second channel exit message, and the second monitoring request causes the blockchain node device to monitor a channel closing message sent by the first client device.

20. The client device according to claim 16, wherein the off- chain channel between the first client device and the second client device is a wireless fidelity (WiFi) channel, a Bluetooth channel, or an infrared channel.

* * * * *

UNITED STATES PATENT AND TRADEMARK OFFICE
CERTIFICATE OF CORRECTION

PATENT NO. : 12,141,796 B2
APPLICATION NO. : 17/366969
DATED : November 12, 2024
INVENTOR(S) : He et al.

Page 1 of 1

It is certified that error appears in the above-identified patent and that said Letters Patent is hereby corrected as shown below:

In the Claims

Claim 11: Column 55, Line 38: "blockchain node device is configured to receive a" should read as -- blockchain node device --.

Signed and Sealed this
Third Day of June, 2025

Coke Morgan Stewart
*Acting Director of the United States Patent and Trademark Office*